(12) United States Patent
Earl et al.

(10) Patent No.: US 6,532,394 B1
(45) Date of Patent: Mar. 11, 2003

(54) METHOD AND APPARATUS FOR DATA MANIPULATION AND SYSTEM CONTROL IN A SELECTIVE DEPOSITION MODELING SYSTEM

(75) Inventors: Jocelyn M. Earl, Old Headington (GB); Chris R. Manners, Moorpark, CA (US); Thomas A. Kerekes, Calabasas, CA (US); Paul H. Marygold, Monrovia, CA (US); Jeffrey S. Thayer, Montara, CA (US)

(73) Assignee: 3D Systems, Inc.

( * ) Notice: Subject to any disclaimer, the term of this patent is extended or adjusted under 35 U.S.C. 154(b) by 0 days.

(21) Appl. No.: 09/305,094

(22) Filed: May 4, 1999

Related U.S. Application Data

(63) Continuation of application No. 08/722,326, filed on Sep. 27, 1996, now Pat. No. 5,943,235, which is a continuation-in-part of application No. 08/534,447, filed on Sep. 27, 1995, now abandoned.

(51) Int. Cl.[7] ............................................. G06F 19/00
(52) U.S. Cl. ................... 700/119; 700/98; 700/118; 700/120; 700/182; 700/183; 425/174.4; 425/375; 219/121.62; 219/121.8; 264/308; 264/401; 264/497; 264/406
(58) Field of Search ........................... 700/98, 118, 119, 700/120, 182, 183; 425/174.4, 375; 219/121.62, 121.8; 264/308, 401, 497, 406

(56) References Cited

U.S. PATENT DOCUMENTS

| | | | |
|---|---|---|---|
| 4,567,570 A | 1/1986 | Peer | 364/900 |
| 4,741,930 A | 5/1988 | Howard et al. | 627/265 |
| 4,775,945 A | 10/1988 | Cavill et al. | 364/519 |
| 4,857,904 A | 8/1989 | Schoon | 340/730 |
| 4,992,806 A | 2/1991 | Peer | 347/54 |
| 5,134,569 A | 7/1992 | Masters | 364/474.24 |
| 5,149,548 A | 9/1992 | Yamane et al. | 425/174.4 |
| 5,198,159 A | 3/1993 | Nakamura et al. | 264/22 |
| 5,282,140 A | 1/1994 | Tazawa et al. | 364/468 |
| 5,313,232 A | 5/1994 | Peer | 347/20 |
| 5,340,656 A | 8/1994 | Sachs et al. | 428/546 |

(List continued on next page.)

FOREIGN PATENT DOCUMENTS

| | | |
|---|---|---|
| DE | 195 07 881 | 9/1995 |
| EP | 388 129 A2 | 9/1990 |
| EP | 426 363 A2 | 5/1991 |
| EP | 431 924 A2 | 6/1991 |
| EP | 590 957 A1 | 4/1994 |
| EP | 655 317 A1 | 5/1995 |
| EP | 666 163 A2 | 8/1995 |
| FR | 2 643 735 A1 | 8/1990 |
| JP | 63-139729 | 6/1988 |
| JP | 1-61230 | 3/1989 |
| JP | 2-22035 | 1/1990 |
| JP | 8001794 | 1/1996 |
| WO | WO 89 10801 | 11/1989 |
| WO | WO 91 12120 | 8/1991 |
| WO | WO 92 00820 | 1/1992 |
| WO | WO 94 19112 | 9/1994 |
| WO | WO 95 05935 | 3/1995 |
| WO | WO 95 05943 | 3/1995 |
| WO | WO 95 12485 | 5/1995 |

*Primary Examiner*—Ramesh Patel
(74) *Attorney, Agent, or Firm*—Ralph D'Alessandro

(57) ABSTRACT

A method of manipulating data in a method for forming a three-dimensional object layer by layer from an ink jettable, solidifiable material by providing data corresponding to a plurality of polygons defining the outer surfaces of a plurality of three-demiensional objects and providing sets of x, y, and z coordinates corresponding to each layer and identifying x and y coordinates with each z coordinate such that directional values and counter values are determined for each y coordinate in a first set of coordinates generated. A second set of y coordinates are generated according to a formula that permits the determined layers to be processed to form a three-dimensional object.

11 Claims, 35 Drawing Sheets

U.S. PATENT DOCUMENTS

| | | | |
|---|---|---|---|
| 5,398,193 A | 3/1995 | deAngelis | 364/468 |
| 5,510,066 A | 4/1996 | Fink et al. | 264/40.1 |
| 5,555,176 A * | 9/1996 | Menhennett et al. | 264/308 |
| 5,597,520 A * | 1/1997 | Smalley et al. | 118/429 |
| 5,717,599 A * | 2/1998 | Menhennett et al. | 156/578 |
| 5,870,307 A * | 2/1999 | Hull et al. | 700/182 |
| 5,943,235 A * | 8/1999 | Earl et al. | 700/98 |
| 5,969,971 A * | 10/1999 | Brown et al. | 700/119 |
| 6,193,923 B1 * | 2/2001 | Leyden et al. | 264/401 |
| 6,270,335 B2 * | 8/2001 | Leyden et al. | 425/375 |

* cited by examiner

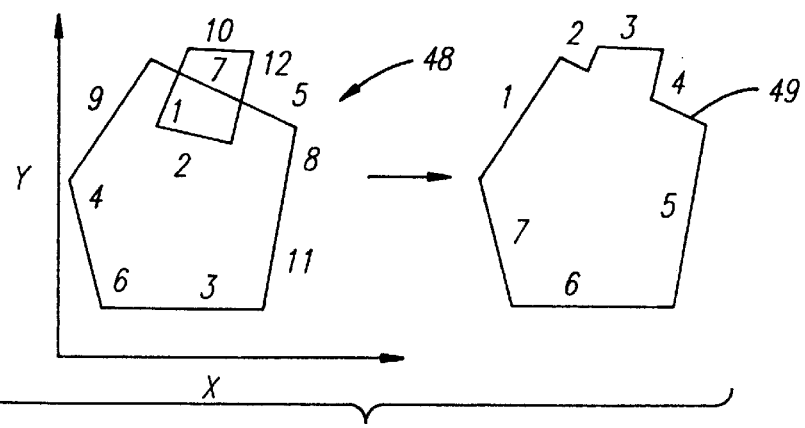
FIG. 9
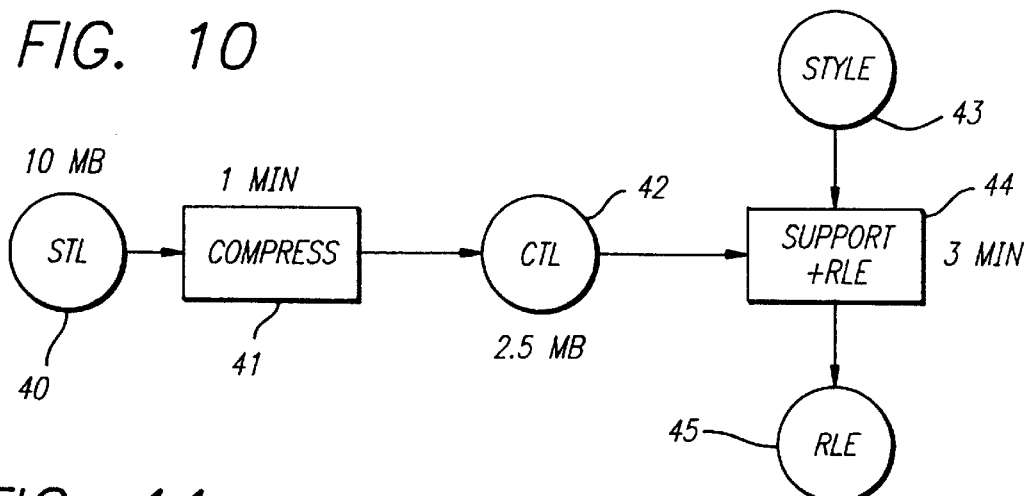
FIG. 10
FIG. 11a
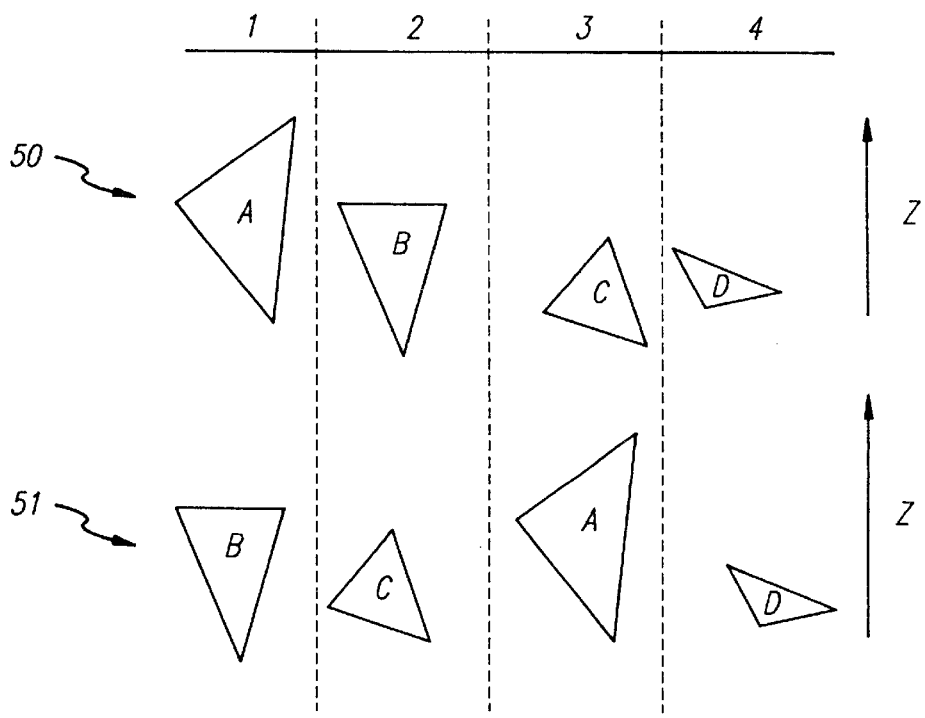

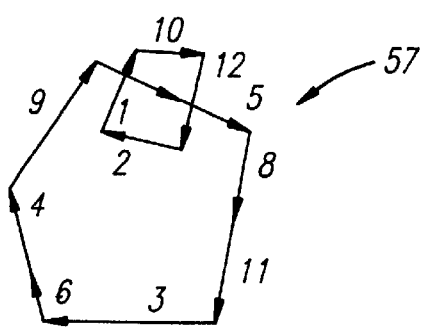
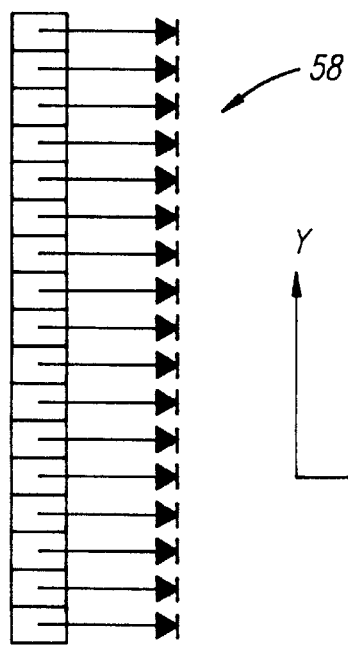
FIG. 13a
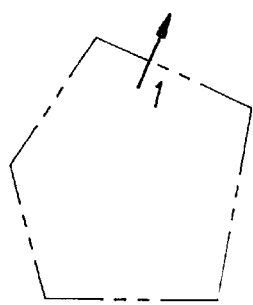
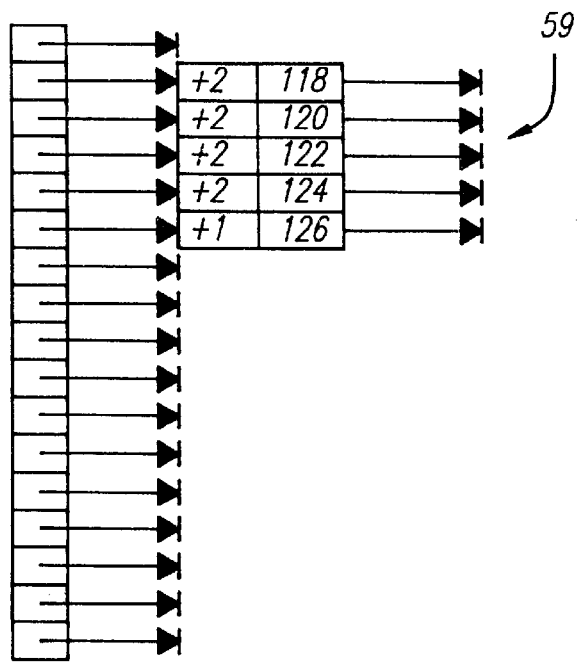
FIG. 13b

FIG. 13c
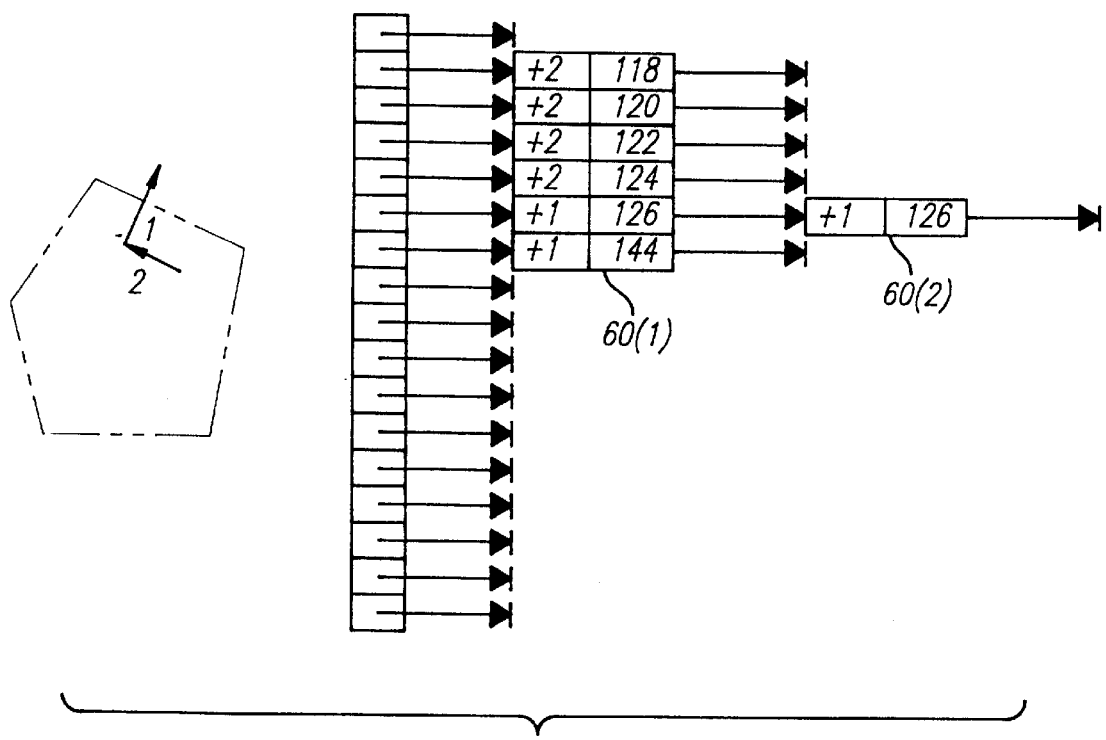
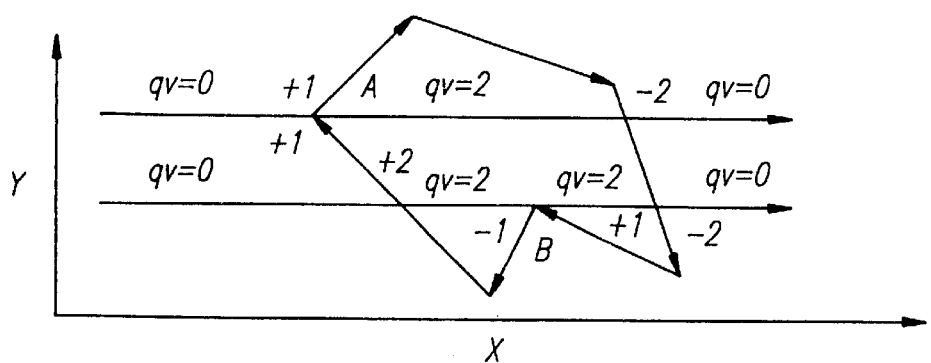
FIG. 14

FIG. 15

61 70→ ORIGINAL = [ (START 20), (START 37), (STOP 48), (START 60), (STOP 78), (STOP 89) ]
   70→ KEPT = [ ], qv = 0                                                            68

62 70→ ORIGINAL = [ (START 20), (START 37), (STOP 48), (START 60), (STOP 78), (STOP 89) ]
   70→ KEPT = [ (START 20) ], qv = 2

63 70→ ORIGINAL = [ (START 20), (START 37), (STOP 48), (START 60), (STOP 78), (STOP 89) ]
   70→ KEPT = [ (START 20) ], qv = 4                    68

64 70→ ORIGINAL = [ (START 20), (START 37), (STOP 48), (START 60), (STOP 78), (STOP 89) ]
   70→ KEPT = [ (START 20) ], qv = 2       68

65 70→ ORIGINAL = [ (START 20), (START 37), (STOP 48), (START 60), (STOP 78), (STOP 89) ]
   70→ KEPT = [ (START 20) ], qv = 4
                              68

66 70→ ORIGINAL = [ (START 20), (START 37), (STOP 48), (START 60), (STOP 78), (STOP 89) ]
   70→ KEPT = [ (START 20) ], qv = 2                                    68

67 70→ ORIGINAL = [ (START 20), (START 37), (STOP 48), (START 60), (STOP 78), (STOP 89) ]
   70→ KEPT = [ (START 20), (STOP 89) ], qv = 0

FIG. 18

```
CURRENT_TOTAL = EMPTY_LAYER;
FOR (LEVEL = TOP; LEVEL >= BOTTOM; LEVEL-= SLICE_THICKNESS)
  {
    PART_FOR_LAYER = GET_PART(LEVEL);
    SUPPORT_FOR_LAYER =
              BOOLEAN_SUBTRACT(CURRENT_TOTAL, PART_FOR_LAYER);
    CURRENT_TOTAL = BOOLEAN_ADD(CURRENT_TOTAL, PART_FOR_LAYER);
  }
```

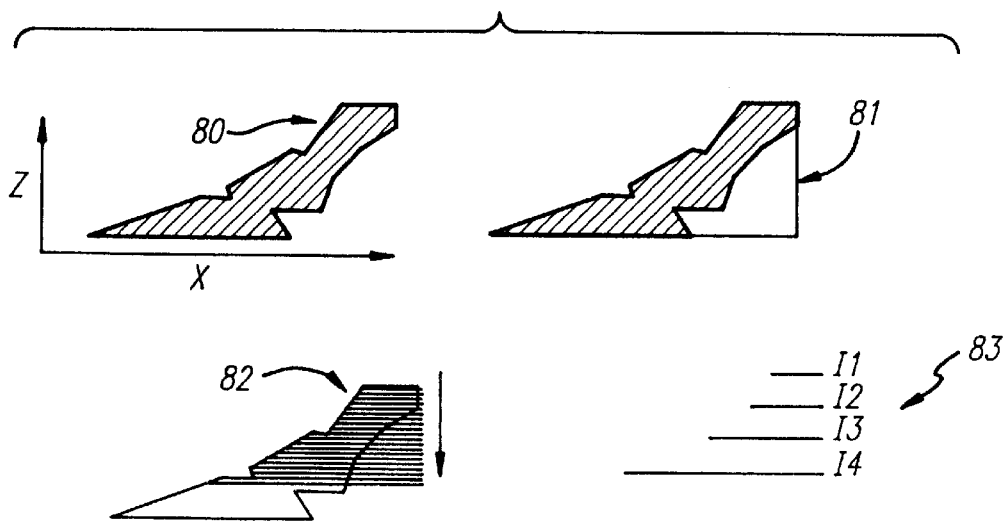

FIG. 19

```
CURRENT_TOTAL = EMPTY_LAYER;
FOR (i = num_LAYERS; i >= 0 ;i--)
  {
    Z_LEVEL = MIN_Z + SLICE_THICKNESS * i;
    PART_FOR_LAYER = GET_PART (Z_LEVEL);
    CURRENT_TOTAL = BOOLEAN_ADD (CURRENT_TOTAL, PART_FOR_LAYER);
    IF ((i mod N) == 0)
      SAVED_TOTALS [i mod N] = CURRENT_TOTAL;
    i++;
  }
```

FIG. 20

FIG. 23
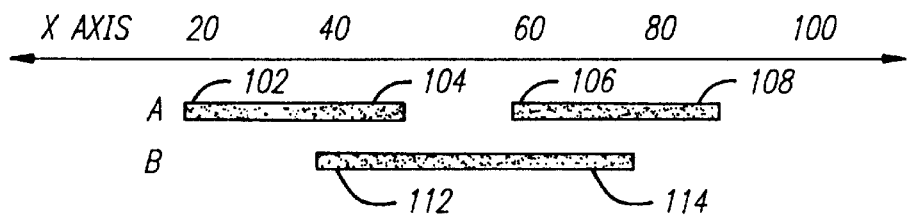
FIG. 24
```
struct RLE_ITEM
{
    short x_location;
    enum type; // START |STOP
    RLE_ITEM *next;
};
```
FIG. 25
```
STRUCT START_STOP
{
    UNSIGNED START: 15;
    UNSIGNED USED: 1;
    UNSIGNED STOP: 15;
    UNSIGNED LAST: 1;
}
```
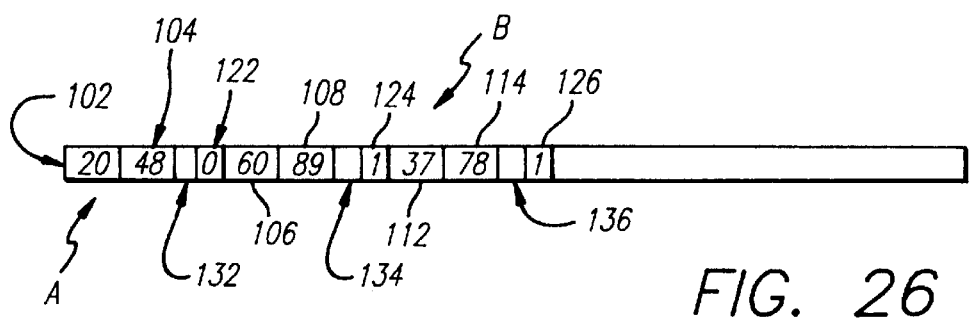
FIG. 26

*BEFORE* FIG. 30A
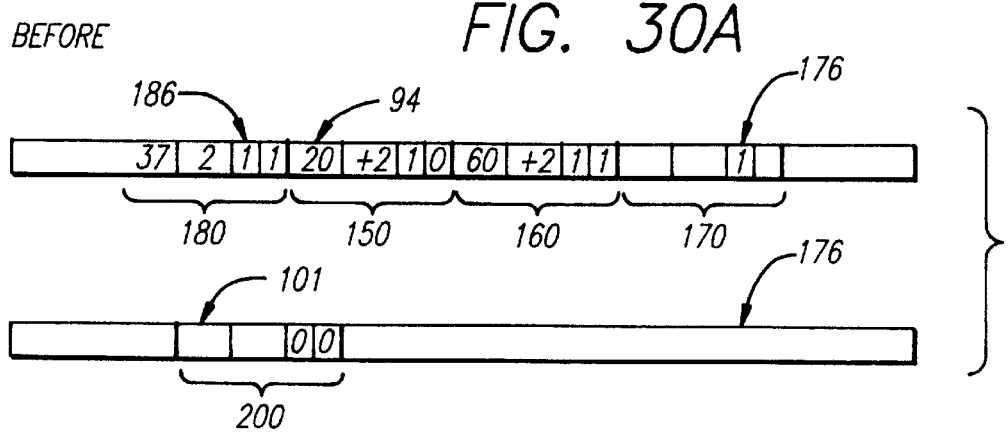
*AFTER* FIG. 30B
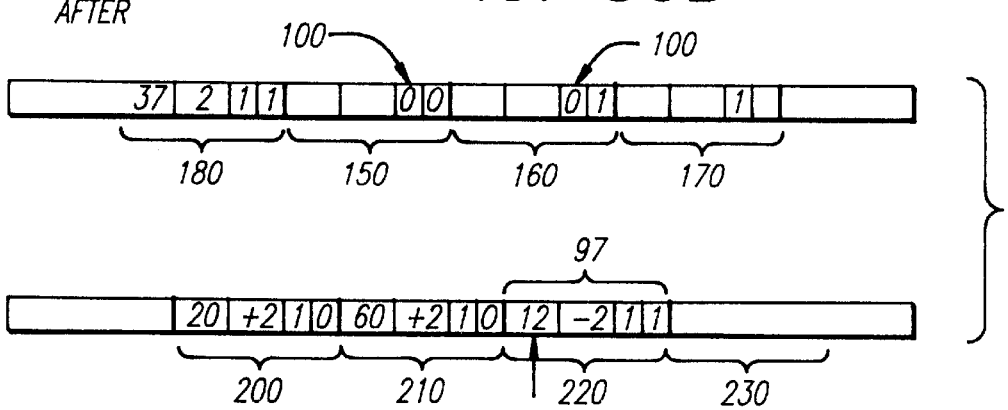
FIG. 31
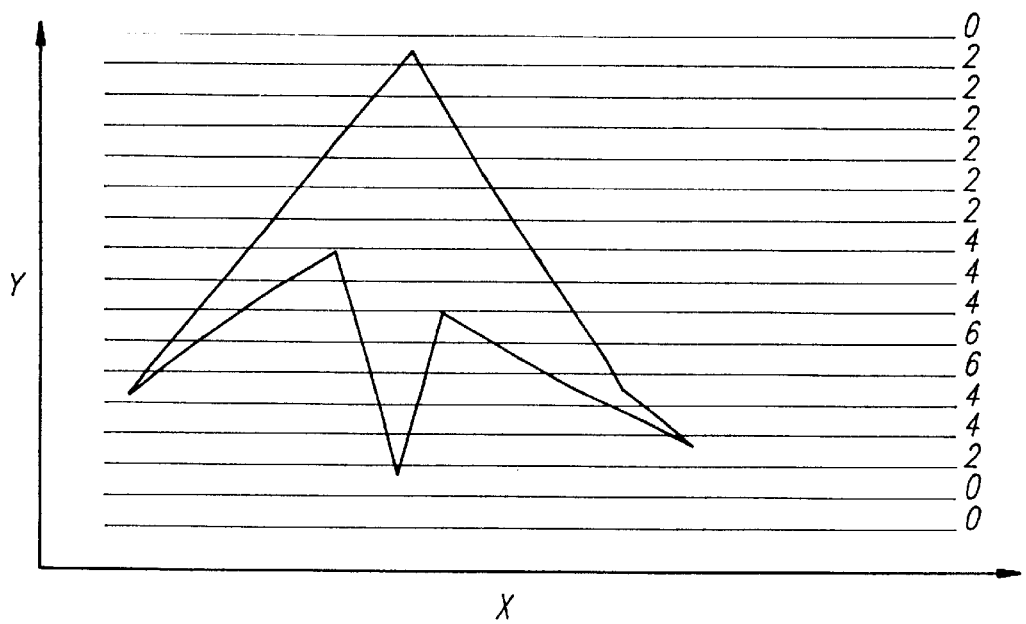

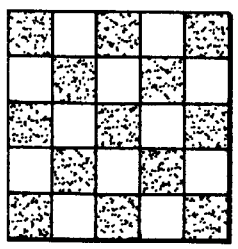
FIG. 41a
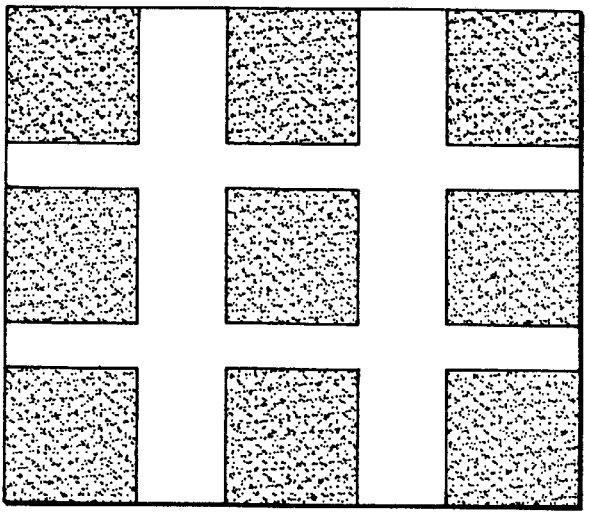
FIG. 41b
FIG. 41c
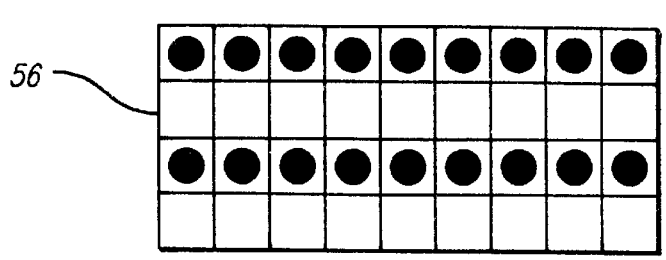
FIG. 41d
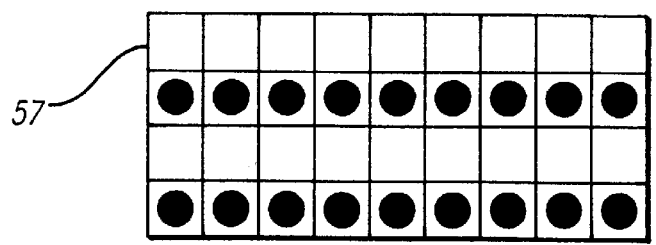

FIG. 47

```
LAYER #1 HEADER
        BUILD PATTERN #1
                TRANSITION #1
                TRANSITION #2
                    .
                    .
                    .
                TRANSITION #M
    .
    .
    .
        BUILD PATTERN #N
                TRANSITION #1
                TRANSITION #2
                    .
                    .
                    .
                TRANSITION #P

LAYER #V HEADER
        BUILD PATTERN #1
                TRANSITION #1
                TRANSITION #2
                    .
                    .
                    .
                TRANSITION #W

BUILD PATTERN #Y
                TRANSITION #1
                TRANSITION #2
                    .
                    .
                    .
                TRANSITION #Z
```

METHOD AND APPARATUS FOR DATA MANIPULATION AND SYSTEM CONTROL IN A SELECTIVE DEPOSITION MODELING SYSTEM

This application is a Continuation of application Ser. No. 08/722,326, filed Sep. 27, 1996, now U.S. Pat. No. 5,943,235, which is a continuation-in-part of U.S. patent application Ser. No. 08/534,447, filed Sep. 27, 1995, now abandoned.

1. FIELD OF THE INVENTION

This invention relates to techniques for data manipulation and building control for forming three-dimensional (3D) objects, more particularly it relates to techniques for use in Rapid Prototyping and Manufacturing (RP&M) Systems and most particularly to data manipulation and building control methods and apparatus for use in a Thermal Stereolithography (TSL) system, Fused Deposition Modeling (FDM) system, or other Selective Deposition Modeling (SDM) system.

2. BACKGROUND INFORMATION

Various approaches to automated or semi-automated three-dimensional object production or Rapid Prototyping & Manufacturing have become available in recent years, characterized in that each proceeds by building up 3D objects from 3D computer data descriptive of the objects in an additive manner from a plurality of formed and adhered laminae. These laminae are sometimes called object cross-sections, layers of structure, object layers, layers of the object or simply layers (if the context makes it clear that solidified structure of appropriate shape is being referred to). Each lamina represents a cross-section of the three-dimensional object. Typically lamina are formed and adhered to a stack of previously formed and adhered laminae. In some RP&M technologies, techniques have been proposed which deviate from a strict layer-by-layer build up process wherein only a portion of an initial lamina is formed and prior to the remaining portion(s) of the initial lamina at least one subsequent lamina is at least partially formed.

According to one such approach, a three-dimensional object is built up by applying successive layers of unsolidified, flowable material to a working surface, and then selectively exposing the layers to synergistic stimulation in desired patterns, causing the layers to selectively harden into object laminae which adhere to previously-formed object laminae. In this approach, material is applied to the working surface both to areas which will not become part of an object lamina, and to areas which will become part of an object lamina. Typical of this approach is Stereolithography (SL), as described in U.S. Pat. No. 4,575,330, to Hull. According to one embodiment of Stereolithography, the synergistic stimulation is radiation from a UV laser, and the material is a photopolymer. Another example of this approach is Selective Laser Sintering (SLS), as described in U.S. Pat. No. 4,863,538, to Deckard, in which the synergistic stimulation is IR radiation from a $CO_2$ laser and the material is a sinterable powder. A third example is Three-dimensional Printing (3DP) and Direct Shell Production Casting (DSPC), as described in U.S. Pat. Nos. 5,340,656 and 5,204,055, to Sachs, et al., in which the synergistic stimulation is a chemical binder, and the material is a powder consisting of particles which bind together upon selective application of a chemical binder.

According to a second such approach, an object is formed by successively cutting object cross-sections having desired shapes and sizes out of sheets of material to form object lamina. Typically in practice, the sheets of paper are stacked and adhered to previously cut sheets prior to their being cut, but cutting prior to stacking and adhesion is possible. Typical of this approach is Laminated Object Manufacturing (LOM), as described in U.S. Pat. No. 4,752,352, to Feygin in which the material is paper, and the means for cutting the sheets into the desired shapes and sizes is a $CO_2$ laser. U.S. Pat. No. 5,015,312 to Kinzie also addresses LOM.

According to a third such approach, object laminae are formed by selectively depositing an unsolidified, flowable material onto a working surface in desired patterns in areas which will become part of an object laminae. After or during selective deposition, the selectively deposited material is solidified to form a subsequent object lamina which is adhered to the previously-formed and stacked object laminae. These steos are then repeated to successively build up the object lamina-by-lamina. This object formation technique may be generically called Selective Deposition Modeling (SDM). The main difference between this approach and the first approach is that the material is selectively deposited only in those areas which will become part of an object lamina. Typical of this approach is Fused Deposition Modeling (FDM), as described in U.S. Pat. Nos. 5,121,329 and 5,340,433, to Crump, in which the material is dispensed while in a flowable state into an environment which is at a temperature below the flowable temperature of the material, and which then hardens after being allowed to cool. A second example is the technology described in U.S. Pat. No. 5,260,009, to Penn. A third is Ballistic Particle Manufacturing (BPM), as described in U.S. Pat. Nos. 4,665,492; 5,134,569; and 5,216,616, to Masters, in which particles are directed to specific locations to form object cross-sections. A fourth example is Thermal Stereolithography (TSL) as described in U.S. Pat. No. 5,141,680, to Almquist et. al.

When using SDM (as well as other RP&M building techniques), the appropriateness of various methods and apparatus for production of useful objects depends on a number of factors. As these factors cannot typically be optimized simultaneously, a selection of an appropriate building technique and associated method and apparatus involve trade offs depending on specific needs and circumstances. Some factors to be considered may include 1) equipment cost, 2) operation cost, 3) production speed, 4) object accuracy, 5) object surface finish, 6) material properties of formed objects, 7) anticipated use of objects, 8) availability of secondary processes for obtaining different material properties, 9) ease of use and operator constraints, 10) required or desired operation environment, 11) safety, and 12) post processing time and effort.

In this regard there has been a long existing need to simultaneously optimize as many of these parameters as possible to more effectively build three-dimensional objects. As a first example, there has been a need to enhance object production speed and lower set up time and file preparation time when building objects using a Selective Deposition Modeling technique (SDM) as described above (e.g. Thermal Stereolithography) while simultaneously maintaining or reducing the equipment cost. A critical problem in this regard has been the need for an efficient technique for generating and handling build data. Another critical problem involves the need for an efficient technique for generating support data appropriate for supporting an object during formation. Additional problems involve the existence of control software which is capable of manipulating the massive amounts of data involved in real time, of compensating for jet misfiring or malfunctioning, of adjusting data so it is accessible in the order needed, and for efficiently providing geometry sensitive build styles and deposition techniques. Appropriate build styles and support structures for use in SDM for which a data generation technique is needed are described in U.S. patent application Ser. No. 08/534,813, now abandoned.

Accordingly, there is a long-felt but unmet need for methods and apparatus to derive data and control an SDM system to overcome the disadvantages of the prior art.

All patents referred to in this section of the specification are hereby incorporated by reference as if set forth in full.

3. RELATED PATENTS APPLICATIONS

The following applications are hereby incorporated herein by reference as if set forth in full herein:

| Filing Date | Application No. | Title | Status |
|---|---|---|---|
| 9/27/95 | 08/534,813 | Selective Deposition Modeling Method and Apparatus for Forming Three-dimensional Objects and Supports | Abandoned |
| 9/27/95 | 08/534,447 | Method and Apparatus for Data Manipulation and System Control in a Selective Deposition Modeling System | Abandoned |
| 9/27/95 | 08/535,772 | Selective Deposition Modeling Materials and Method | Abandoned |
| 9/27/95 | 08/534,477 | Selective Deposition Modeling Method and System | Abandoned |

The assignee of the subject application, 3D Systems, Inc., is filing this application concurrently with the following related application, which is incorporated by reference herein as though set forth in full:

| Docket No. | Filing Date | Application No. | Title | Status |
|---|---|---|---|---|
| USA.142 | Concurrently herewith | Unknown | Selective Deposition Modeling Method and Apparatus for Forming Three-dimensional Objects and Supports | Abandoned |

According to Thermal Stereolithography and some Fused Deposition Modeling techniques, a three-dimensional object is built up layer by layer from a material which is heated until it is flowable, and which is then dispensed with a dispenser. The material may be dispensed as a semi-continuous flow of material from the dispenser or it may alternatively be dispensed as individual droplets. In the case where the material is dispensed as a semi-continuous flow it is conceivable that less stringent working surface criteria may be acceptable. An early embodiment of Thermal Stereolithography is described in U.S. Pat. No. 5,141,680, which is hereby incorporated by reference. Thermal Stereolithography is particularly suitable for use in an office environment because of its ability to use non-reactive, non-toxic materials. Moreover, the process of forming objects using these materials need not involve the use of radiations (e.g. UV radiation, IR radiation, visible light and/or laser radiation), heating materials to combustible temperatures (e.g. burning the material along cross-section boundaries as in some LOM techniques), reactive chemicals (e.g. monomers, photopolymers) or toxic chemicals (e.g. solvents), complicated cutting machinery, and the like, which can be noisy or pose significant risks if mishandled. Instead, object formation is achieved by heating the material to a flowable temperature then selectively dispensing the material and allowing it to cool.

U.S. patent application Ser. No. 08/534,813, now abandoned, is directed primarily to Build and Support styles and structures which can be used in a preferred Selective Deposition Modeling (SDM) system based on TSL principles Alternative build and support styles and structures are also described for use in other SDM systems as well as for use in other RP&M systems.

U.S. patent application Ser. No. 08/535,772, now abandoned, is directed to the preferred material used by the preferred SDM/TSL system described hereinafter. Some alternative materials and methods am also described.

U.S. patent application Ser. No. 08/534,447, now abandoned, is a parent application for the instant application and is directed to data transformation techniques for use in converting 3D object data into support and object data for use in a preferred Selective Deposition Modeling (SDM) system based on TSL (thermal stereolithography) principles. This referenced application is also directed to various data handling, data control, and system control techniques for controlling the preferred SDM/TSL system described hereinafter. Alternative data manipulation techniques and control techniques are also described for use in SDM systems as well as for use in other RP&M systems.

The assignee of the instant application, 3D Systems, Inc., is also the owner of a number of other U.S. patent applications and U.S. patents in RP&M field and particularly in the Stereolithography portion of that field. The following commonly owned U.S. patent applications and U.S. patents are hereby incorporated by reference as if set forth in full herein.

| App No. | Topic | Status and/or Patent No. |
|---|---|---|
| 08/148,544 | Fundamental elements of Thermal Stereolithography are described. | 5,501,824 |
| 08/484,582 | Fundamental elements of Stereolithography are taught. | 5,573,722 |
| 08/475,715 | Various recoating techniques for use in SL are described including a material dispenser that allows for selective deposition from a plurality of orifices | 5,667,820 |
| 08/479,875 | Various LOM type building techniques are described. | 5,637,169 |
| 08/486,098 | A description of curl distortion is provide along with various techniques for reducing this distortion. | Abandoned |
| 08/475,730 | A description of a 3D data slicing technique for obtaining cross-sectional data is described which utilizes boolean layer comparisons to define down-facing, up-facing and continuing regions. Techniques for performing cure-width compensation and for producing various object configurations relative to an initial CAD design are also described | 5,854,748 |
| 08/480,670 | A description of an early SL Slicing technique is described including vector generation and cure width compensation. | 5,870,307 |
| 08/428,950 | Various building techniques for use in SL are described including various build styles involving alternate sequencing, vector interlacing and vector offsetting for forming semi-solid and solid objects | Abandoned |

-continued

| App No. | Topic | Status and/or Patent No. |
|---|---|---|
| 08/428,951 | Simultaneously multiple layer curing techniques for SL are taught including techniques for vertically comparing regions and correcting errors due to over curing in the z-direction. In additional horizontal comparison techniques are discussed for defining horizontally distinct regions including the use of erosion routines. | 5,999,184 |
| 08/405,812 | SL recoating techniques using vibrational energy are described | 5,688,464 |
| 08/402,553 | SL recoating techniques using a doctor blade and liquid level control techniques are described. | 5,651,934 |
| 08/382,268 | Several SL recoating techniques are described including techniques involving the use of ink jets to selectively dispense material for forming a next layer of unsolidified material. | 5,058,988 |
| 07/182,801 | Support structures for SL are described. | 4,999,143 |
| 07/183,015 | Placement of holes in objects for reducing stress in SL objects are described. | 5,015,424 |
| 07/365,444 | Integrated SL building, cleaning and post curing techniques are described. | 5,143,663 |
| 07/824,819 | Various aspects of a large SL apparatus are described. | 5,182,715 |
| 07/605,979 | Techniques for enhancing surface finish of SL objects are described including the use of thin fill layers in combination with thicker structural layers and meniscus smoothing. | 5,209,878 |
| 07/929,463 | Powder coating techniques are described for enhancing surface finish. | 5,234,636 |
| 07/939,549 | Building techniques for reducing curl distortion in SL by balancing regions of stress and shrinkage. | 5,238,639 |

SUMMARY OF THE INVENTION

The instant invention embodies a number of techniques (methods and apparatus) that can be used alone or in combination to address a number of problems associated with data generation, data handling and system control for use in forming 3D objects by Selective Deposition Modeling. Though primarily directed to SDM techniques, the techniques described hereinafter can be applied in a variety of ways to the other RP&M technologies as described above to enhance system throughput by providing enhanced data manipulation and generation techniques. Furthermore, the techniques described herein can be applied to SDM systems that use one or more building and/or support materials wherein one or more of the materials are selectively dispensed, wherein others may be dispensed non-selectively, and wherein elevated temperatures may or may not be used for all or part of the materials to aid in their selectively deposition.

The techniques can be applied to SDM systems wherein the building material (e.g. paint or ink) is made flowable for dispensing purposes by adding to it a solvent (e.g. water, alcohol, acetone, paint thinner, or other solvents appropriate for specific building materials), which material can be made to solidify after dispensing by causing the removal of the solvent (e.g. by heating the dispensed material, by dispensing the material into a partially evacuated (i.e. vacuum) building chamber, or by simply allowing sufficient time for the solvent to evaporate). Alternatively and/or additionally, the building material (e.g. paint) may be thixotropic in nature wherein an increase in shear force on the material could be used to aid its dispensing or the thixotropic property may simply be used to aid the material in holding its shape after being dispensed. Alternatively and/or additionally, the material may be reactive in nature (e.g. a photopolymer, a thermal polymer, a one or two-part epoxy material, a combination material such as one of the previously mentioned materials in a combination with a wax or thermal plastic material) or at least solidifiable when combined with another material (e.g. plaster of paris & water) wherein after dispensing the material is reacted by appropriate application of prescribed stimulation (e.g. heat, EM radiation (visible, IR, UV, x-rays, etc.), a reactive chemical, the second part of a two part epoxy, the second or multiple part of a combination) wherein the building material and/or combination of materials become solidified. Of course, Thermal Stereolithographic materials and dispensing techniques may be used alone or in combination with the above alternatives. Furthermore, various dispensing techniques may be used such as dispensing by single or multiple ink jet devices including hot melt ink jets, bubble jets, etc. and continuous or semi-continuous flow, single or multiple orifice extrusion nozzles or heads.

A first object of the invention to provide a method and apparatus for converting three-dimensional object data into cross-sectional data.

A second object of the invention is to provide a method and apparatus for production of objects including a method and apparatus for converting three-dimensional object data into cross-sectional data.

A third object of the invention to provide a method and apparatus for obtaining support data from three-dimensional object data.

A fourth object of the invention is to provide a method and apparatus for production of objects including a method and apparatus for obtaining support data and using the support data during object formation.

It is intended that the above objects can be achieved separately by different aspects of the invention and that additional objects of the invention will involve various combinations of the above independent objects such that synergistic benefits may be obtained from combined techniques.

Other objects of the invention will be apparent from the description herein.

BRIEF DESCRIPTION OF THE DRAWINGS

FIG. 9 illustrates the effect of the boolean extraction operation;

FIG. 10 illustrates a second embodiment of the subject invention;

FIG. 11a illustrates the ordering of triangles in the z-direction;

FIGS. 13a, 13b, and 13c illustrate the placement of transitional data into lists associated with different scan lines;

FIGS. 14–15 illustrate in more detail the boolean extraction operation;

FIGS. 18–21 illustrate a two-stage process for generating supports using intermediate layers;

FIGS. 23–26 illustrate a method of storing start/stop data into contiguous words;

FIGS. 27a–27b, 28a–28b, 29a–29b, and 30a–30b illustrate a method of allocating memory to list data representing start/stop transitions;

FIG. 31 illustrates the property in which successive scan lines are represented by similar numbers of transitions;

FIG. 35b illustrates a part with a different part slope than that illustrated by the part shown in FIG. 35a.

FIGS. 41a–41f represent additional style types;

FIG. 47 depicts the conceptual format of an .RLE file.

DESCRIPTION OF THE PREFERRED EMBODIMENTS

As previously discussed, the subject application is directed to data manipulation techniques and system control techniques for implementing support techniques and building techniques appropriate for use in a Selective Deposition Modeling (SDM) system. In particular the preferred SDM system is a Thermal Stereolithography (TSL) system. The detailed description of a preferred embodiment of the invention will begin with a description of the preferred TSL system wherein embodiment details will be described as appropriate. A more detailed description of preferred building and supporting techniques, preferred material formulations and properties, preferred system and various alternatives are described in previously incorporated U.S patent applications Ser. No. 08/534,447, now abandoned; Ser. No. 08/535,772, now abandoned; and Ser. No. 08/534,477, now abandoned. Further alternative systems are discussed in a number of the previously incorporated applications and patents especially those referenced as being directly related to or applicable to Selective Deposition Modeling, Thermal Stereolithography or Fused Deposition Modeling. As such, the data manipulation techniques and system control techniques hereinafter should be construed as applicable to a variety of SDM, TSL and FDM systems and not inappropriately limited by the examples described herein.

Figure 1:
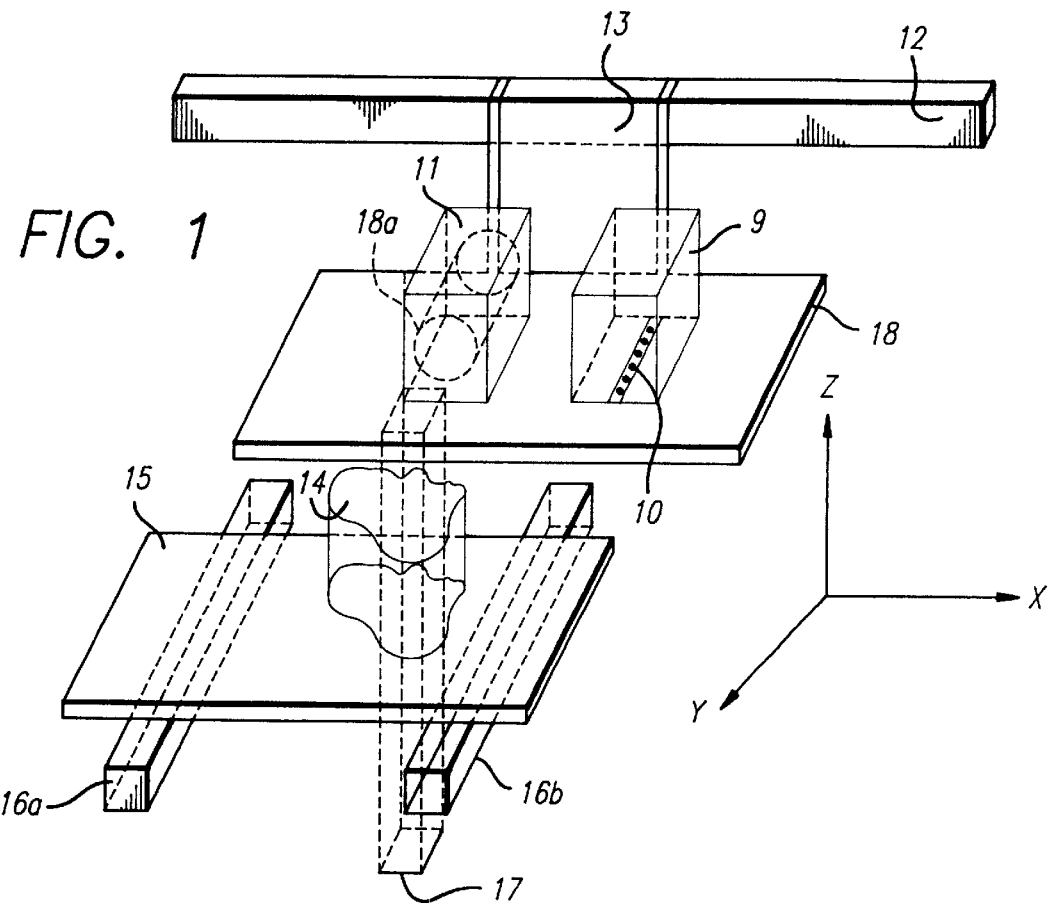
FIG. 1 is a diagram of a preferred Thermal Stereolithography system.

A preferred apparatus for performing SDM/TSL is illustrated in FIG. 1. The apparatus comprises a dispensing platform 18 on which is situated dispensing head 9 (e.g. multi orifice ink jet head) and planarizer 11. The dispensing platform is slidably coupled to X-stage 12 through member 13. The X-stage 12 controllably moves the dispensing platform 18 back and forth in the X-direction, also known as the main scanning direction. The motion of the X-stage is under the control of a control computer or microprocessor (not shown). Furthermore, at either side of the platform 18 and/or between the planarizer 11 and dispensing head 9, fans (not shown) for blowing air vertically down are mounted to help cool the dispensed material and substrate such that the desired building temperature is maintained. Of course other mounting schemes for the fans and/or other cooling systems are possible including the use of misting devices for directing vaporizable liquids (e.g. water, alcohol, or solvents) onto the surface of the object. Cooling systems might involve active or passive techniques for removing heat and may be computer controlled in combination with temperature sensing devices to maintain the dispensed material within the desired building temperature range.

The dispensing head (or print head) 9 is a commercial print head configured for jetting hot melt inks (e.g. thermal plastics or wax-like materials), and modified for use in a three-dimensional modeling system wherein the printhead undergoes back and forth movements and accelerations. The printhead modifications involve configuring any on board reservoir such that the accelerations result in minimal misplacement of material in the reservoir. In one preferred embodiment, the head is a 96 jet commercial print head, Model No. HDS 96i, sold by Spectra Corporation, of Nashua, N.H. including reservoir modifications. The print head 9 is supplied material in a flowable state from a Material Packaging & Handling Subsystem (not shown). The material packaging and handling subsystem is described in previously referenced U.S. patent application Ser. No. 08/534,477, now abandoned. In a preferred implementation, all 96 jets on the head are computer controlled to selectively fire droplets through orifice plate 10 when each orifice (i.e. jet) is appropriately located to dispense droplets onto desired locations. In practice, preferably approximately 12,000 to 16,000 commands per second are sent to each jet selectively commanding each one to fire (dispense a droplet) or not to fire (not to dispense a droplet) depending on jet position and desired locations for material deposition. Also, in practice, firing commands are preferrably sent simultaneously to all jets. Thus, in a preferred embodiment, the head is computer controlled so as selectively fire the jets so as to simultaneously emit droplets of the molten material through one or more orifices in orifice plate 10. Of course it will be appreciated that in alternative embodiments, heads with a different numbers of jets can be used, different firing frequencies are possible and, in appropriate circumstances, non-simultaneous firing of the jets is possible.

Figure 2A:
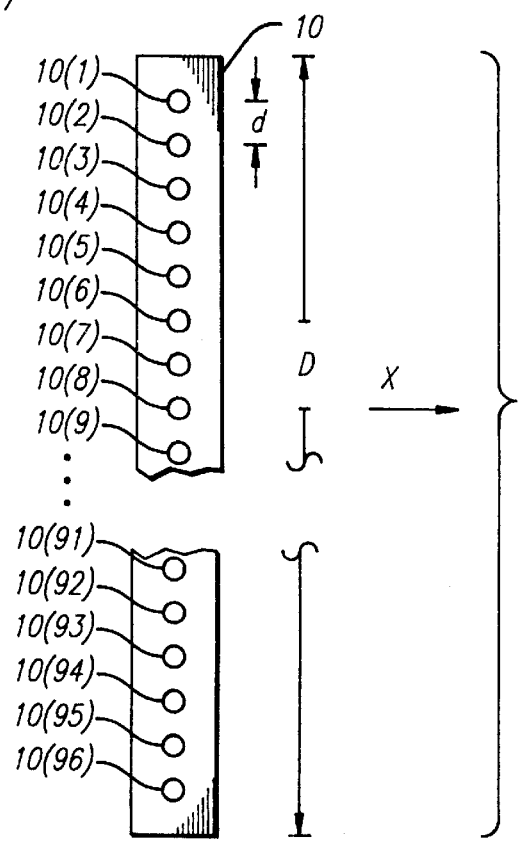
FIGS. 2a and 2b illustrate the orifice plate of the print head of FIG. 1 at two different angles.
Figure 2B:
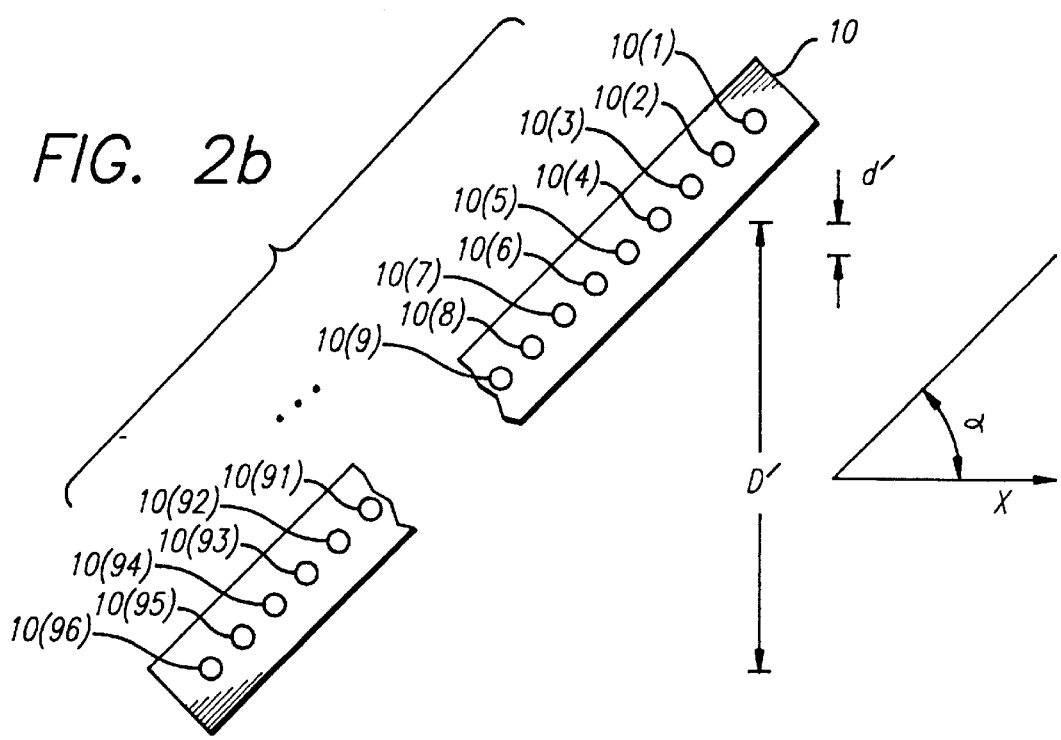

The orifice plate 10 is mounted on the dispensing platform 18 such that droplets of material are allowed to emit from the underside of the dispensing platform. The orifice plate 10 is illustrated in FIGS. 2*a* and 2*b*. In a preferred embodiment, and as depicted in FIG. 2*a*, the orifice plate (i.e. the line of orifices) is mounted approximately perpendicular to the main scanning direction (e.g. X-direction) and is configured with N=96 individually controllable orifices (labeled 10(1), 10(2), 10(3) ... 10(96)). Each dispenser (e.g. jet) is equipped with a piezoelectric element which causes a pressure wave to propagate through the material when an electric firing pulse is applied to the element. The pressure wave causes a drop of material to be emitted from orifice. The 96 dispensers are controlled by the control computer which controls the rate and timing of the firing pulses applied to the individual dispenser and therefore the rate and timing of droplets being emitted from the orifices. With reference to FIG. 2*a*, the distance "d" between the orifices in a preferred embodiment is about $8/300$ inches (about 26.67 mils or 0.677 mm). Thus, with 96 orifices, the effective length "D" of the orifice plate is about (N×$8/300$ inch)=(96×$8/300$ inches)=2.56 inches (65.02 mm). One preferred embodiment uses raster scanning to position the print head and orifices to dispense material at desired drop locations. The printing process for each layer is accomplished by a series of relative movements between the head and the desired drop locations. Printing typically occurs as the head relatively moves in a main scanning direction. This is followed by a typically smaller increment of movement in a secondary scanning direction while no dispensing occurs, which in turn is followed by a reverse scan in the main scanning direction in which dispensing again occurs. The process of alternating main scans and secondary scans occurs repeatedly until the lamina is completely deposited. Alternative embodiments may perform small secondary scanning movements while main scanning occurs. Because of the typically large difference in net scanning speed along the main and secondary directions such alternatives still result in deposition along nearly perpendicular main scanning lines (i.e the main scanning and secondary scanning directions remain substantially perpendicular. Other alternative embodiments may utilize vector scanning techniques or a combination of vector scanning and raster scanning. Other alternative embodiments may use substantially non-perpendicular main and secondary scanning directions along with algorithms that result in proper placement of droplets.

In alternative embodiments the print head may be mounted at a non-perpendicular angle to the main scanning direction. This situation is depicted in FIG. 4*b* wherein the print head is mounted at an angle "α" to the main scanning direction. In this alternative situation the separation between the orifices is reduced from d to d'=(d×sin α) and the effective length of the print head is reduced to D'=(D×sin α). When the spacing d' is equal to the desired print resolution in the secondary scanning direction (direction approximately perpendicular to the main scanning direction), the angle α is considered to be the "saber angle".

If the spacing d (as when using a preferred embodiment) or d' (as when using some preferred alternative embodiments) is not at the desired secondary print resolution (i.e. the print head is not at the saber angle) then for optimal efficiency in printing a layer, the desired resolution must be selected such as to make d or d' an integer multiple of the desired resolution. Similarly, when printing with α≠90°, a spacing exists between adjacent jets in the main scanning direction as well as the secondary scanning direction. This spacing is defined by d"=d×cos α. This spacing in the main scanning direction d", in turn, dictates that optimization of printing efficiency will occur when the desired main print resolution is selected to be an integer multiple of d" (assuming that firing locations are located in a rectangular grid). This may be alternatively worded by saying that the angle a is selected such that d'and/or d" (preferably both) when divided by appropriate integers M and P yield the desired main and secondary scanning resolutions. An advantage to using the preferred print head orientation (α=90°) is that it allows any desired printing resolution in the main scanning direction while still maintaining optimal efficiency.

In other alternative embodiments multiple heads may be used which lay end to end (extend in the secondary scanning direction) and/or which are stacked back to back (stacked in the main scanning direction). When stacked back to back the print heads may have orifices aligned in the main scanning direction so that they print over the same lines or alternatively they may be offset from one another so as dispense material along different main scanning lines. In particular it may be desirable to have the back to back printheads offset from each other in the secondary scanning direction by the desired raster line spacing to minimize the number of main scanning passes that must occur. In other alternative embodiments the data defining deposition locations may not be located by pixels defining a rectangular grid but instead may be located by pixels laid out in some other pattern (e.g. offset or staggered pattern). More particularly, the deposition locations may be fully or partially varied from layer to layer in order to perform partial pixel drop location offsetting for an entire layer or for a portion of a layer based on the particulars of a region to be jetted.

Presently preferred printing techniques involve deposition of 300, 600 and 1200 drops per inch in the main scanning direction and 300 drops per inch in the secondary scanning direction.

Figure 3:
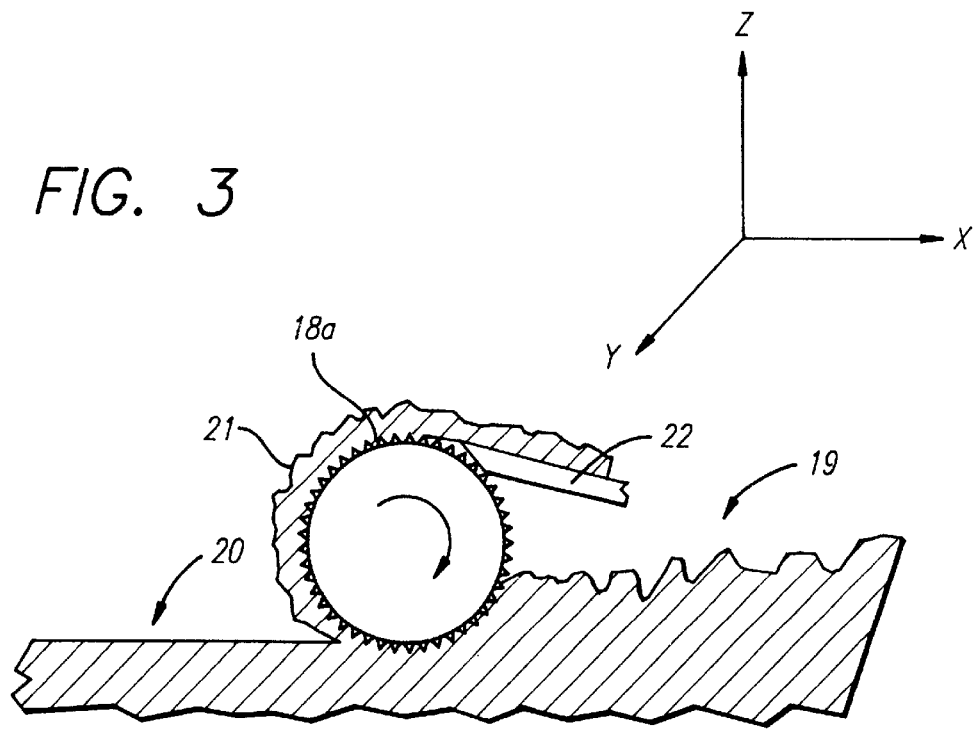
FIG. 3 is a more detailed drawing of the planarizer of FIG. 1.

With reference to FIGS. 1 and 3, planarizer 11 is a heated rotating cylinder 18*a* with a textured (e.g. knurled) surface. Its function is to melt, transfer and remove portions of the previously dispensed layer of material in order to smooth it out, to set a desired thickness for the last formed layer, and to set the net upper surface of the last formed layer to a desired level (i.e. the desired working surface or working level for forming a next lamina of the object). Numeral 19 identifies a layer of material which has just been deposited by the print head. The rotating cylinder 18*a* is mounted to the dispensing platform such that it is allowed to project from the underside of the platform by a sufficient amount in the Z-direction such that it contacts material 19 at a desired level below the orifice plate. In a preferred embodiment, this amount is set in the range of 0.5 mm to 1.0 mm. The rotation of the cylinder 18*a* sweeps material from the just-deposited layer, identified in the figure with numeral 21, leaving in its wake smooth surface 20. The material 21 adheres to the knurled surface of the cylinder and is displaced until it contacts wiper 22. As shown, wiper 22 is disposed to effectively "scrape" the material 21 from the surface of the cylinder. This material, because it is still flowable, is then taken up by the Material Packaging & Handling Subsystem, described in U.S. patent application Ser. No. 08/534,477, now abandoned, (not shown), whence it is either disposed of or recycled.

With reference to FIG. 1, part-building platform 15 is also provided. On this platform 15 is built the three-dimensional object or part, identified in the figure with reference numeral 14. This platform 15 is slidably coupled to Y-stage 16a and 16b which controllably moves the platform 15 back and forth in the Y-direction (i.e. index direction or secondary scanning direction) under computer control. The platform is also coupled to Z-stage 17 which controllably moves the platform up and down (typically progressively downward during the build process) in the Z-direction under computer control.

To build a cross-section of a part, the Z-stage is directed to move the part-building platform 15 relative to the print head 9 such that the last-built (i.e. dispensed and possibly planed) cross-section of the part 14 is situated an appropriate amount below the orifice plate 10 of the print head. The print head in combination with the Y-stage is then caused to sweep one or more times over the XY build region (the head sweeps back and forth in the X direction, while the Y-stage translates the partially formed object in the Y-direction). The combination of the last formed layer of the object and any supports associated therewith define the working surface for deposition of the next lamina and any supports associated therewith. During translation in the XY directions, the jets of the print head are fired in a registered manner with previously dispensed layers to deposit material in a desired pattern and sequence for the building of the next lamina of the object. During the dispensing process, a portion of the dispensed material is removed by the planarizer in the manner discussed above. The X, Y and Z movements, dispensing, and planarizing are repeated to build up the object from a plurality of selectively dispensed and adhered layers. In an alternative embodiment the step of planarization could be performed independently of the dispensing steps. In other alternative embodiments the planarizer may not be used on all layers but instead may be used on selected or periodic layers.

Figure 4:
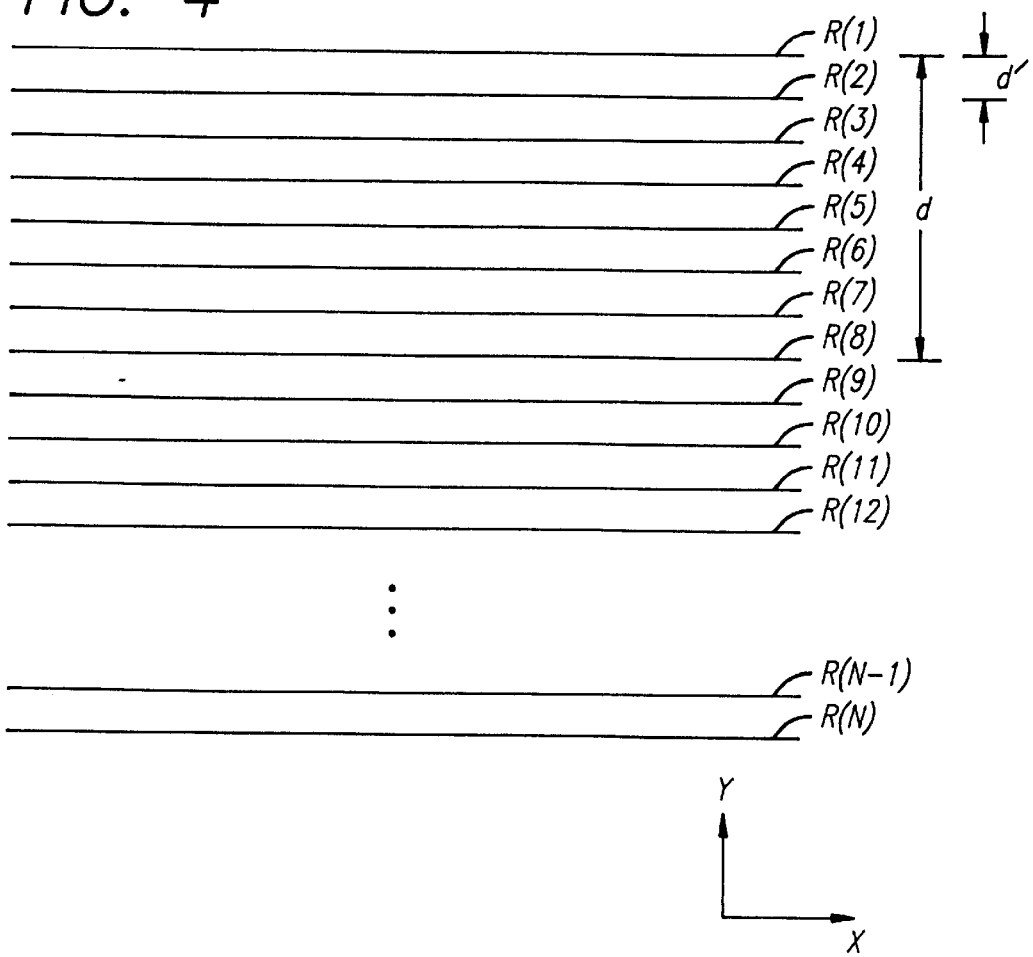
FIG. 4 illustrates the relative spacing between adjacent nozzles on the orifice plate and adjacent raster lines.

As noted previously, in a preferred embodiment, the print head is directed to trace a raster pattern. An example of this is depicted in FIG. 4. As shown, the raster pattern consists of a series of raster lines, R(1), R(2), . . . , R(N), running in the X-direction or main scanning direction and arrayed along the Y-direction (i.e. index direction or secondary scanning direction). The raster lines are spaced from one another by a distance $d_r$, which, in a preferred embodiment, is $\frac{1}{300}$ inches (about 3.3 mils or about 83.8 $\mu$m). Since the orifices of the print head are spaced by the distance d, which as discussed is about 26.67 mils (0.6774 $\mu$m), and since the desired number of raster lines may extend in the index direction by a distance greater than the length of the orifice plate, about 2.56 inches (65.02 mm), the print head must be swept over the working surface through multiple passes in order to trace out all desired raster lines.

This is accomplished by following a two-step process. In the first step, the print head is passed 8 times over the working surface, with the Y-stage being indexed by the amount $d_r$ after each pass in the main scanning direction. In the second step, the Y-stage is indexed by a distance equal to the length of the orifice plate (2.5600 inches+$d_r$ (0.0267 inches)=2.5867 inches (65.70 mm). This two-step process is then repeated until all of the desired raster lines have been traced. In other words, a preferred two step process involves a first step of alternating main scanning direction passes with secondary scanning direction movements of an amount equal to the desired raster line resolution until all raster lines between initial lines dispensed by two adjacent jets are scanned. Thereafter, a second step including a large index direction increment is made. This large index direction increment is equal to the spacing between first and last orifices of the printhead plus one raster line spacing. The first and second steps are repeated until the indexing direction increments, and lines scanned, are sufficient to deposit material on all raster lines required to form the object cross-section (including any necessary supports for forming subsequent cross-sections).

In a first pass, for example, the print head might be directed to trace raster lines R(1) (via orifice 10(1) in FIG. 4), R(9) (via orifice 10(2)), R(17) (via orifice 10(3)), etc. The Y-stage would then be directed to move the building platform the distance $d_r$ (one raster line) in the index direction. On the next pass, the print head might be directed to trace R(2) (via 10(1)), R(10) (via 10(2)), R(17) (via 10(3)), etc. Six more passes would then be performed with the Y-stage being indexed by the distance $d_r$ after each pass, until a total of 8 sweeps have been performed.

At this time, if there are more raster lines to be traced, the Y-stage would be directed to move the building platform by an amount equal to the full length of the orifice plate+$d_r$, 2.5867 inches (65.70 mm). The two-step process described above would then be repeated until all raster lines have been traced out. In alternative embodiments, other Y increments could be made including increments involving both negative and positive movements along the Y-axis. This might be done in order to scan raster lines that were initially skipped. This will be described further in association with a technique called "interlacing".

The firing of the ink jet orifices is controlled by a rectangular bit map maintained in the control computer or other memory device. The bit map consists of a grid of memory cells, in which each memory cell corresponds to a pixel of the working surface, and in which the rows of the grid extend in the main scanning direction (X-direction) and the columns of the grid extend in the secondary scanning direction (Y-direction). The width of (or distance between) the rows (spacing along the Y-direction) may be different from the width (or length of or distance between) of the columns (spacing along the X-direction) dictating that different data resolutions may exist along the X and Y directions. In alternative embodiments, non-uniform pixel size is possible within a layer or between layers wherein one or both of the pixel width or length is varied by pixel position. In other alternatives, other pixel alignment patterns are possible. For example, pixels on adjacent rows may be offset in the main scanning direction by a fractional amount of the spacing between pixels in the main scanning direction so that their center points do not align with the center points of the pixels in the neighboring rows. This fractional amount may be ½ so that their center points are aligned with the pixel boundaries of adjacent rows. It may be ⅓ or some other amount such that two or more intermediate rows of pixels are located between rows where pixels are realigned in the main scanning direction. In further alternatives, pixel alignment might be dependent on the geometry of the object or support structure being dispensed. For example, it might be desirable to shift pixel alignment when forming a portion of a support pattern that is supposed to bridge a gap between support columns. These and other alternative pixel alignment schemes can be implemented by modifying the pixel configuration or alternatively defining a higher resolution pixel arrangement (in X and/or Y) and using pixel firing patterns that do not fire on every pixel location but instead fire on selected spaced pixel locations which may vary according to a desired random, predetermined or object basis pattern.

We may define the data resolution in the main scanning direction in terms of Main Direction Pixels (MDPs). MDPs may be described in terms of pixel length or in terms of number of pixels per unit length. In a preferred embodiment MDP=300 pixels per inch (26.67 mils/pixel or 677.4 $\mu$m/pixel). In other prefered embodiments MDP=1200 pixels per inch. Similarly the data resolution in the secondary scanning direction may be defined in terms of Secondary Direction Pixels (SDPs) and the SDPs may be described in terms of pixel width or in terms of number of pixels per unit length. In a preferred embodiment SDP=MDP=300 pixels per inch (26.67 mils/pixel or 677.4 $\mu$m/pixel). The SDP may or may not be equivalent to spacing between raster lines and the MDP may or may not be equivalent to the spacing between successive drop locations along each raster line. The spacing between successive raster lines may be defined as Secondary Drop Locations (SDLs), while spacing between successive drop locations along each raster line may be defined as Main Drop Locations (MDLs). Similar to SDPs and MDPs, SDLs and MDLs may be defined in terms of drops per unit length or drop spacing.

If SDP=SDL there is a one to one correspondence between data and drop locations along the secondary scanning direction and the pixel spacing is equal to that of the raster line spacing. If MDP=MDL there is a one to one correspondence between data and drop locations along the main scanning direction.

Figure 6A:
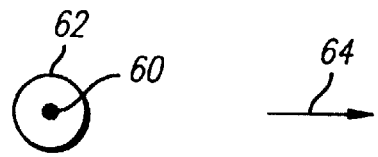
FIGS. 6a–6d illustrates several overprinting schemes.
Figure 6B:
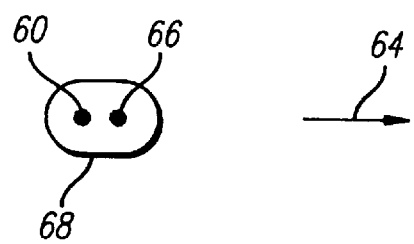
Figure 6C:
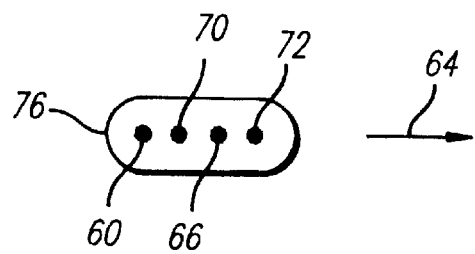
Figure 6D:
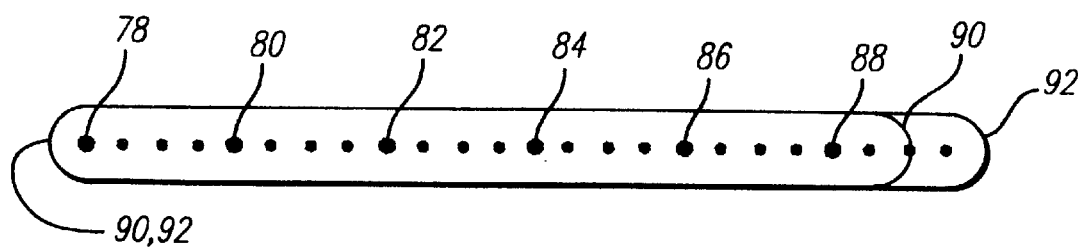

If SDL and/or MDL is larger than SDP and MDP, respectively, more drops will need to be fired than that for which data exists, thus each pixel will need to be used in causing more than one droplet to be dispensed. The dispensing of these extra droplets can be done in one of two ways either by dispensing the droplets at intermediate points between the centers of successive pixels (i.e. intermediate dropping, "ID") or alternatively directly on top of pixel centers (i.e. direct dropping, "DD"). In either case this technique is called "overprinting" and results in faster build up of material and eases mechanical design constraints involving maximum scan speeds and acceleration rates since the same Z-build up can occur while moving the printhead and/or object more slowly. The difference in ID overprinting versus non-overprinting or DD overprinting is depicted in FIGS. 6a to 6d. FIG. 6a depicts a single drop 60 being deposited and an associated solidified region 62 surrounding it when the print head is moving in direction 64. On the other hand, FIG. 6b depicts the same region being cured but using the ID overprinting technique where two drops 60 and 66 are deposited in association with the single data point when the head is moving in direction 64. The deposition zone filled by the two drops is depicted by region 68. FIG. 6c shows a similar situation for a four drop ID overprinting scheme wherein the drops are indicated by numerals 60, 70, 66 and 72 and the deposition zone is depicted by 76 and wherein the scanning direction is still depicted by numeral 64. FIG. 6d depicts a similar situation for a line of pixels 78, 80, 82, 84, 86 and 88, wherein numeral 90 depicts the length of the deposition zone without overprinting and the numeral 92 depicts the length of the deposition zone when using a four drop ID overprinting technique. The above can be generalized by saying that ID overprinting adds from approximately ½ to just under 1 additional pixel length to any region wherein it is used. Of course, the more overprinting drops that are used, the more vertical growth a pixel region will have.

If SDL and/or MDL is less than SDP and/or MDP, respectfully, drops will be fired at fewer locations than those for which data exists, at least for a given pass of the print head. This data situation may be used to implement the offset pixel and/or non-uniform sized pixel techniques discussed above.

Figure 5:
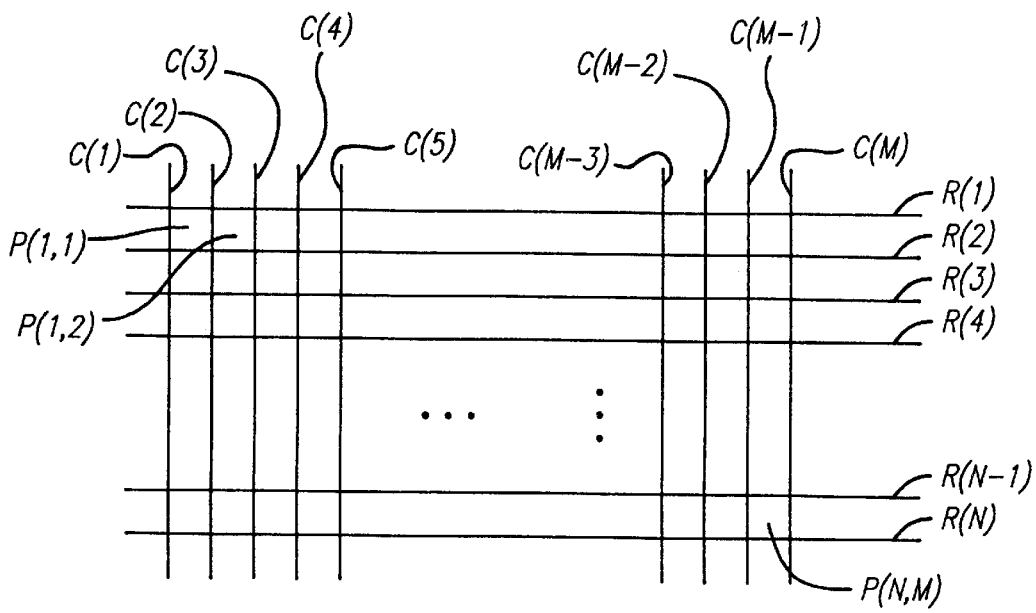
FIG. 5 illustrates the grid of pixels which defines the data resolution of the system.

An N row by M column grid is depicted in FIG. 5. As shown, the rows in the grid are labeled as R(1), R(2), . . . , R(N), while the columns in the grid are labeled as C(1), C(2), . . . , C(M). Also shown are the pixels making up the grid. These are labeled as P(1,1), P(1,2), . . . ,P(M,N).

To build a cross-section, the bit map is first loaded with data representative of the desired cross-section (as well as any supports which are desired to be built). Assuming, as with the preferred embodiment, a single build and support material is being used, if it is desired to deposit material at a given pixel location, then the memory cell corresponding to that location is appropriately flagged (e.g. loaded with a binary "1") and if no material is to be deposited an opposite flag is used (e.g. a binary "0"). If multiple materials are used, cells corresponding to deposition sites are flagged appropriately to indicate not only drop location sites but also the material type to be deposited. For ease of data handling, compressed data defining an object or support region (e.g. on-off location points along each raster line) can be booleaned with a fill pattern description to be used for the particular region to derive a final bit map representation used for firing the dispensing jets. The raster lines making up the grid are then assigned to individual orifices in the manner described earlier. Then, a particular orifice is directed to fire or not over a pixel depending on how the corresponding cell in the bit map is flagged.

As discussed above, the print head is capable of depositing droplets at many different resolutions. In the preferred embodiments of the present invention SDP=SDL=300 pixels and drops per inch. However, MDP is allowed to take on three values in the preferred embodiment 1) MDL=300 drops per inch and MDP=300 pixels per inch, 2) MDL=600 drops per inch, and MDP=300 pixels per inch or 3) MDL= 1200 drops per inch and MDP=300 pixels perinch. When the MDL to MDP ratio is greater than one, the extra drops per pixel are made to occur at intermediate locations (ID overprinting) between the centers of the pixels. With the currently preferred print head and material, the volume per drop is about 100 picoliters which yields drops roughly having a 2 mil (50.8 $\mu$m) diameter. With the currently preferred print head, the maximum frequency of firing is about 20 Khz. By way of comparison, a firing rate of 1200 dpi at 13 ips involves a frequency of 16 Khz, which is within the permissible limit.

Figure 7:
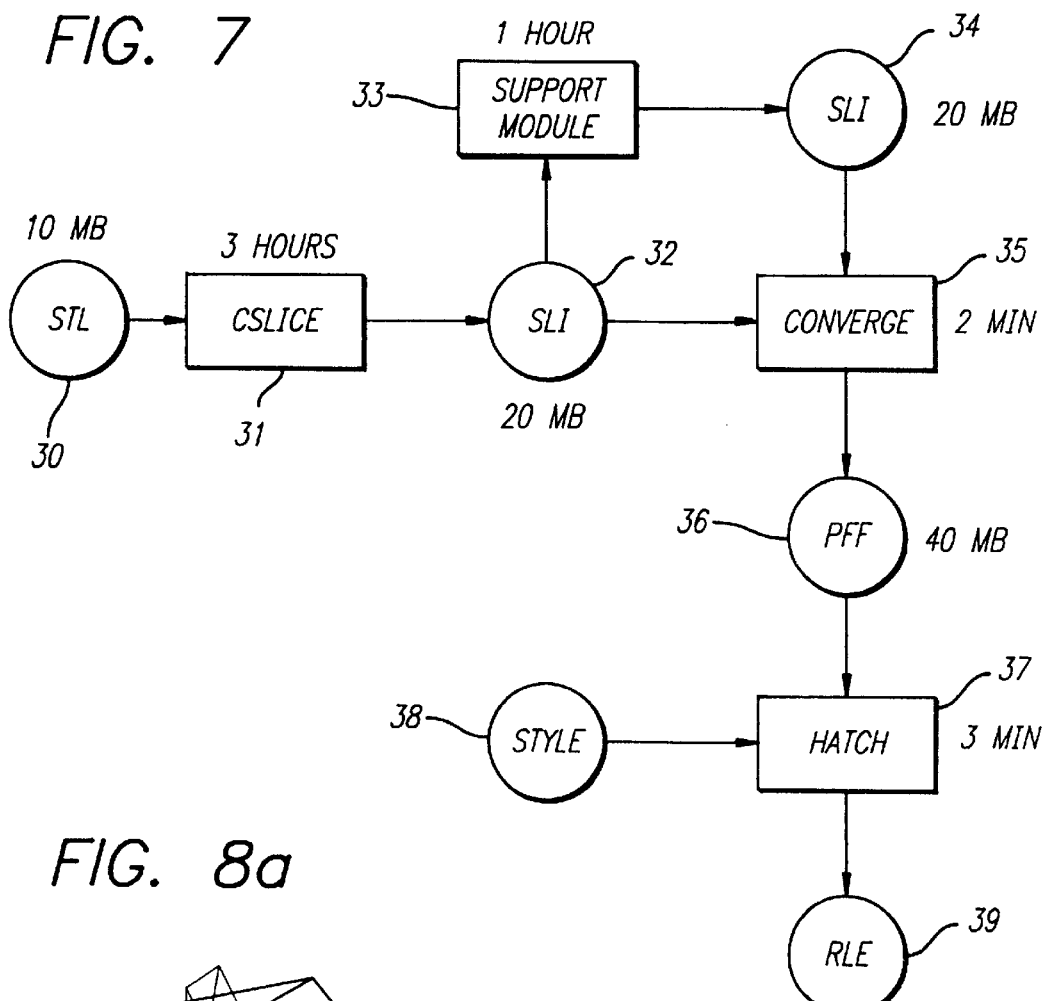
FIG. 7 illustrates a first embodiment of the subject invention.

A first preferred embodiment for producing data appropriate for part building in a Selective Deposition Modeling system (e.g. a Thermal Stereolithography System), including generating data representative of supports, is illustrated in FIG. 7. As shown, the method begins by using the Boolean Layer Slice process (represented by module 31) to convert .STL file 30 into .SLI file 32. The Boolean Layer Slice process, as well as the .STL and .SLI formats, are described in the above referenced U.S. patents and applications, (e.g. U.S Pat. No. 5,854,748 (hereafter '748)).

The .SLI file is then input to module 33 which produces support data in the .SLI format. The .SLI data representative of the supports, identified with numeral 34, is then converged with the .SLI data representative of the object, identified with numeral 32, in module 35. The result is .PFF file 36, representative of the object and support boundaries.

The .PFF file is then "hatched" in module 37 in accordance with the style determined by style file 38 using the hatching techniques described in the aforementioned '748 patent. The intersections between the hatch lines and the object and support boundaries are then used to prepare .RLE file 39.

Figure 8A:
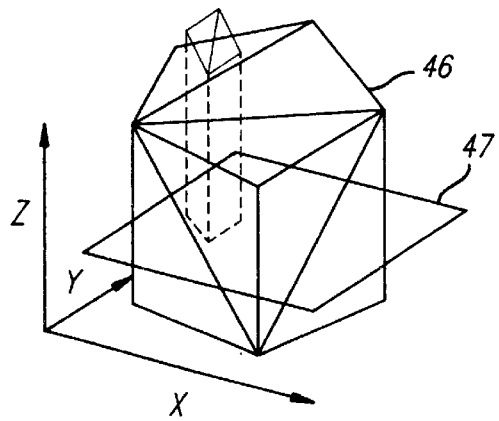
FIGS. 8a–8b illustrates intersecting an .STL file with slicing planes.
Figure 8B:
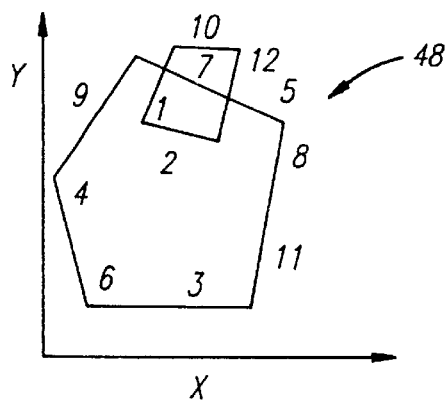

A problem with this embodiment is speed. As illustrated in FIGS. 8a–8b, the process involves intersecting an .STL file 46 with slicing planes, such as that identified with numeral 47 in FIG. 8a, to produce segment lists for each cross-section, such as that identified with numeral 48 in FIG. 8b. The segments are then ordered, internal segments are removed, and the appropriate end points are joined together to form polygons. In FIG. 9, for example, the segments 48 are processed in the manner described to form polygon 49.

The process is time-consuming because of the number of comparisons that must be performed to order the segments, and because of the time required to perform Boolean operations on the polygons. For a list of N segments, for example, the ordering step requires $N^2$ comparisons. Moreover, the process of performing a Boolean operation on a polygon comprising N segments also requires $N^2$ operations. For both these reasons, the process of forming the build data can be prohibitively long, typically several hours. However, one advantage to this approach is that since boundary segments are ordered into polylists, drop width compensation can be performed on these boundaries in a manner analogous to the compensation routines taught in the '748 patent.

A second preferred embodiment designed to overcome these problems is illustrated in FIG. 10. As shown, .STL file 40 is first compressed through module 41 into .CTL file 42. The process of compressing an .STL file into a .CTL file is described in the aforementioned U.S. Pat. No. 5,999,184. Second, based on Style information 43 provided as an input, in module 44, the .CTL file is sliced in a manner similar to that described in the '748 patent application except that only hatch or skin type data is output into an RLE (i.e. run length encoded) file.

First, as illustrated in FIG. 11a, the triangles making up the .STL file are sorted top-down in the z-direction. Specifically, as indicated by identifying numeral 50, the triangles are sorted in descending order of the maximum z value for each triangle. As shown, the order of the triangles is: A, B, C, D.

The top-down sort required should be contrasted with a bottom-up sort, such as the one indicated by identifying numeral 51 in FIG. 11a, in which the triangles are sorted in ascending order of the minimum z-values of the triangles. As indicated, the order which results is: B, C, A, D.

For each slicing level, a list of active triangles is then determined through use of a current level indicator, and an index pointer. An index pointer is advanced through the list of triangles for a given level, and any triangles completely above the current level are eliminated from consideration. If a triangle is intersected by the current level indicator, it is added to the list. The process continues until the index pointer points to a triangle completely below the current level. At this point, the list of active triangles for the level is complete. The level indicator is then changed to indicate the next lower level, and the process continues.

Figure 11B:
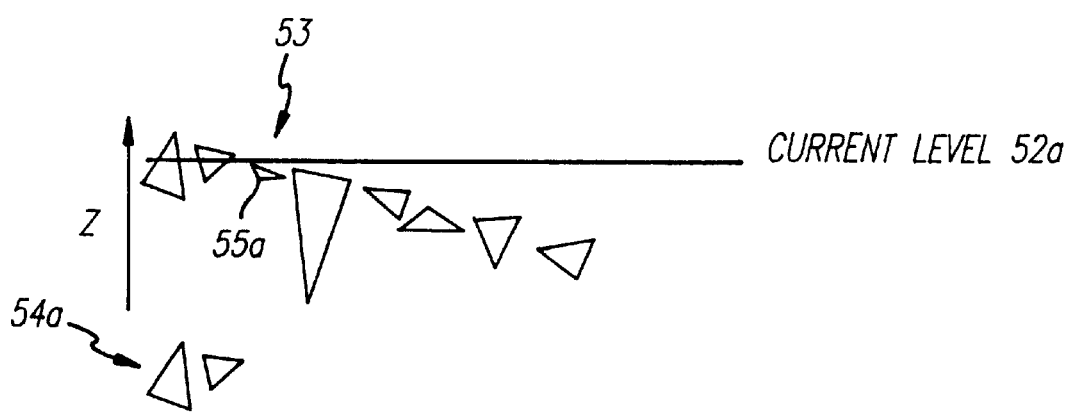
FIGS. 11b–11c illustrate the selection of active triangles.

FIG. 11b illustrates the process when the current level indicator is at level 52a. The index pointer 53 is advanced from left to right, and the two triangles intersected by the current level, identified in the figure with reference numeral 54a, are added to the list of active triangles. The process then continues until the index pointer is pointing at triangle 55a. Since that triangle is completely below the current level, the process stops with the index pointer 53 pointing at triangle 55a.

Figure 11C:
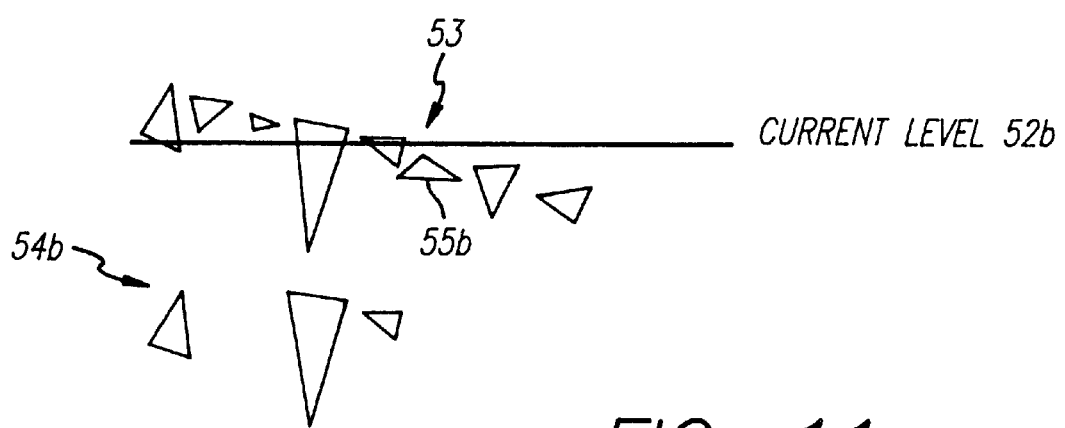

FIG. 11c illustrates the process when the level indicator is advanced to level 52b. The index pointer is reset to zero, and then advanced from left to right. Each triangle above the level is ignored, and each triangle intersected by the level is added to the list of active triangles. In the figure, these triangles are indicated with identifying numeral 54b. The process completes when the index pointer is pointing at triangle 55b since that is the first triangle encountered which is completely below the level.

The active triangles for each slicing level are intersected with that level to form a set of segments in the x-y plane. Since the triangles bound solid and are oriented so as to face away from the solid region (as explained in U.S. Pat. Nos. 5,059,359; 5,137,662; 5,321,622; and 5,345,391 which are hereby incorporated by reference), The resulting segments also have orientation. From these segments, without the need of ordering them into boundary loops, the .RLE data descriptive of the object cross-sections can be obtained by using the same hatching algorithms as described in the '748 patent.

Figure 12A:
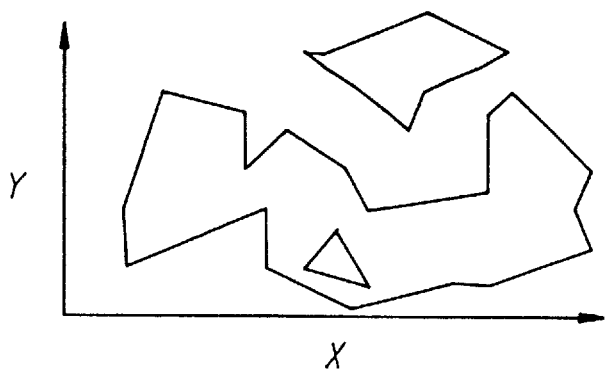
FIGS. 12a, 12b, and 12c illustrate alternate forms of representing cross-sectional data.
Figure 12B:
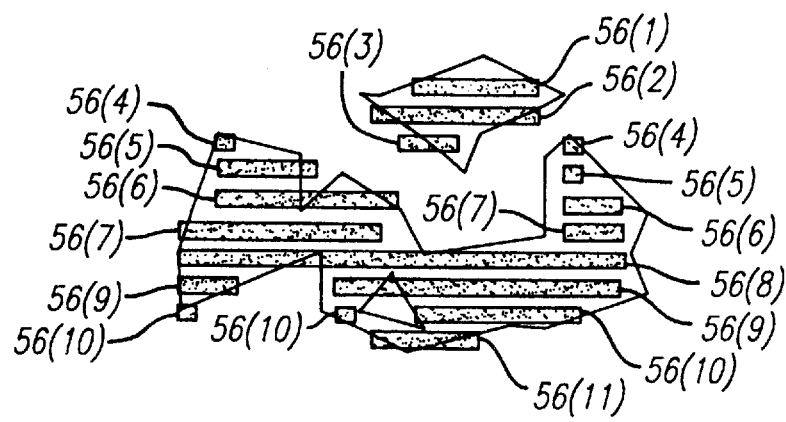

FIG. 12a illustrates a polygonal representation of a cross-section (segments ordered to form boundary loops), while FIG. 12b illustrates an .RLE (run-length encoded) representation of the same cross-section. To produce the data, the polygonal representation is overlaid with a plurality of raster or pixel scan lines, and then, a list of start/stop pairs is generated at the points where the raster or pixel lines intersect the polygonal representation, with each point of intersection being associated with an on/off indicator. For a given scan line, the on/off indicator for the points of intersection are alternated between on and off status to indicate whether the scan line is entering or exiting a solid. In FIG. 12b, for example, the "on" portions of the successive scan lines are identified with numerals 56(1), 56(2), 56(3), . . . , and 56(11).

Figure 12C:
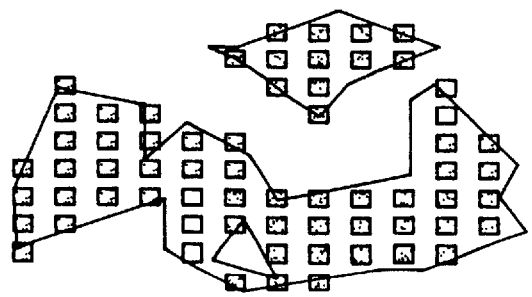

The .RLE format should be contrasted with the pixel format illustrated in FIG. 12c, in which each point inside the solid is represented by a separate data point. The problem with this form of data representation is size. At 300 DPI (dots per inch), for example, a 10 inch cross-section requires 9 million bits of information.

The process of generating the .RLE data for the object cross-sections is illustrated in FIG. 13a–13c. As shown in FIG. 13a, for each cross section, such as the cross-section identified with numeral 57 in the figure, an array of lists, identified with numeral 58, is created, in which each list in the array corresponds to a scan line extending at a given y-level in the x-direction. Then, considering in turn each segment in the cross-section, the intersections between each segment and the scan lines are noted, and data representative of these intersections is added to the respective lists in the array. FIG. 13b, for example, illustrates the additions, identified in the figure with numeral 59, to the lists through consideration of segment one.

The specific data items added to the list for each "y" location contain two pieces of information: a quantitative volume (QV) value, and the x-location of the intersection. An intersection at which the segment is increasing in the y-direction has a QV of 2. An intersection at which the segment is decreasing in the y-direction has a QV of –2. If the segment originates or terminates at a scan line, the intersection counts as a "half-hit", i.e., the associated QV is either 1 or –1 depending on whether the segment is increasing or decreasing in the y-direction. In FIG. 13b, for example, segment 1 is increasing in the y-direction. Thus, the QV values associated with the intersection of this segment with successive scan lines are respectively 1, 2, 2, 2, and 2 (assuming that the scan line does not meet the tip of segment 1). Moreover, the x-locations of the intersections between segment 1 and the successive scan lines are respectively 126, 124, 122, 120, and 118. As shown, the data added to the array incorporates these values.

FIG. 13c illustrates the additions to the array through consideration of segment 2. That segment increases in the y-direction, and originates and terminates at two successive scan lines. The x-location of the intersection of the first scan line is 144, while for the second, is 126. The two additions to the array which incorporate these values are identified with numerals 60(1) and 60(2).

The purpose of the half hits can be understood through consideration of FIG. 14. As shown, each scan line is associated with a running QV total which is updated every time the scan line crosses a segment using the QV value associated with the point of intersection with the segment. If the scan line is inside solid, the running QV value is 2, while if it is outside solid, the QV value is 0. Thus, when a scan line is outside solid, and crosses a boundary, the necessary implication is that the scan line is now inside solid. The running QV total should then be updated with a value of 2 to indicate that it is now inside solid. Conversely, if the scan line is inside solid, and crosses a boundary, the necessary implication is that the scan line is now outside solid or has entered a second solid object which is overlapping the first object. A value of −2 or 2 should then be added to the running total to indicate the transition.

If the scan line crosses a vertex, such as indicated at point A in FIG. 14, the scan line actually intersects two segments when entering solid. Each segment should thus only contribute a value of 1 to the running QV total. That is why the QV value associated with these vertices is kept to either 1 or −1.

It should be noted that it is possible for a scan line to cross a vertex without the running QV value changing state. As illustrated by point B of FIG. 14, the segments forming the vertex have respectively QV values of −1 and 1 at the point of intersection. The result is that the running QV total associated with the scan line is unchanged. Additional information about quantative volume (QV) can be found in the previously referenced '748 patent.

After the scan line intersections for all the segments have been added to the list, the list for each scan line is then sorted in ascending x-order. A Boolean extraction routine is then applied to extract the correct Booleanized segments for each scan line.

The preferred extraction routine involves maintaining a running QV count in which the QV value of each successive data point in the list is added to the running total. Any data point which has a QV of 2, i.e., a "start" point, when the running QV total is 0 (i.e. transitions from 0 to 2), and any data point which has a QV of —2, i.e., a "stop" point, when the running total is 2 (i.e. transitions from 2 to 0), is kept. The process is illustrated in FIG. 15 in which successive steps thereof are identified with numerals 61, 62, 63, 64, 65, 66, and 67. A current item pointer, identified with numeral 68, is used to point to successive items in the original list. A "Kept" list, identified in the figure with numeral 70, is also used to retain the start and stop points which meet the prescribed conditions described above. As shown, through this process, only the first start point, i.e., (start 20), and the last stop point, i.e., (stop 89), are retained. The result is the .RLE data descriptive of a line of a cross-section of the object. Applying the technique to all lines for all cross-sections results in an .RLE description for the object.

It should be appreciated that it is not necessary to sort the segments, formed by intersecting the triangles with the slicing planes, into polylists (as described in the '622 patent) in order to form polygonal representations of the object cross-sections. As discussed, the sorting of segments into polylists is a time-consuming operation. Moreover, it should also be appreciated that the .RLE data formed is successfully unioned even when the .STL file has not been properly unioned or separated (i.e., the .STL file contains overlapping object elements).

A benefit of the .RLE representation over the polygonal representation is that Boolean operations are much simpler and faster. The Boolean extraction algorithm has already been discussed. Several others are Boolean addition, subtraction, and intersection operations.

Figure 16:
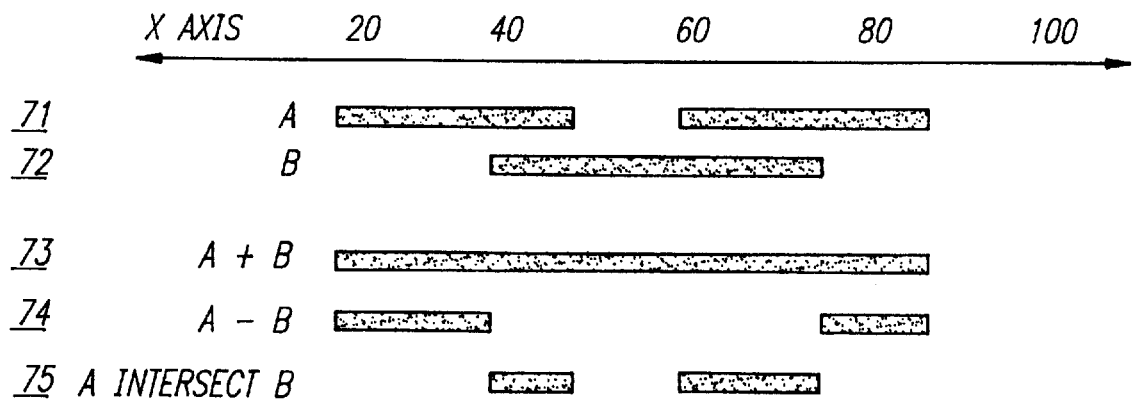
FIGS. 16–17 illustrate the Boolean addition, subtraction, and intersection operations.

To perform these operations most efficiently, it is advantageous to express the .RLE data in absolute terms as opposed to relative terms. For example, a line starting at x-position 100 and staying on for 30 pixels should be represented in terms of a pair of start/stop points, in which the start is at position 100, and the stop is at position 130. Thus, with reference to FIG. 16, the .RLE data for line A, identified with numeral 71 in the figure, and that for line B, identified with numeral 72 in the figure, are represented as follows: A=[(start 20), (stop 48), (start 60), (stop 89)], B=[(start 37), (stop 78)].

Computing the Boolean addition of these two lines involves merging the two sets of data, while keeping the merged list sorted in the x-direction. The result is [(start 20), (start 37), (stop 48), (start 60), (stop 78), (stop 89)]. The merged list is then subjected to the Boolean extraction algorithm discussed earlier wherein, for example, the start locations are assigned QV values of 2 and stop locations are assigned QV values of −2 and only those locations resulting in QV transitions from 0 to 2 (start) or from 2 to 0 (stop) are kept. The result is the data pair [(start 20), (stop 89)], representing the Boolean addition A+B, which is identified with numeral 73 in FIG. 16.

To compute the Boolean subtraction of two lines involves the identical steps discussed above in relation to the Boolean addition operation except that before the two lists are merged, the signs of the QV values of the list which is being subtracted is reversed such that start transitions become stop transitions and vice-a-versa. The result of the operation A−B is identified in FIG. 16 with numeral 74.

To compute the Boolean intersection of two lines involves the identical steps as the addition operation except that the extraction routine is performed starting with an initial QV value of −2. The intersection between A and B is identified in FIG. 16 with numeral 75.

Figure 17:
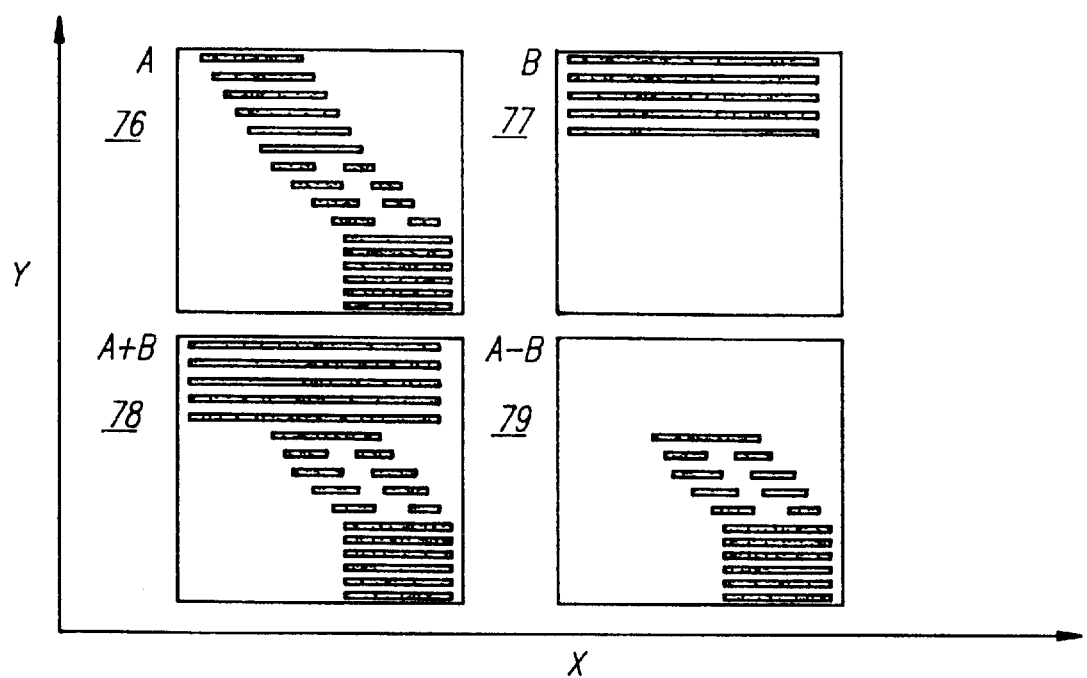

Two-dimensional Boolean operations can also be easily performed. For two-dimensional areas, each represented by a plurality of .RLE lines expressed preferrably in absolute terms, Boolean operations are performed by performing successive Boolean line operations on each successive pair of corresponding lines in the respective areas. FIG. 17 illustrates the process. The set of lines identified with numeral 76 represents area A, while the set of lines identified with numeral 77 represents area B. The Boolean addition, A+B, of these two areas is identified with numeral 78, while the Boolean subtraction of these two areas, A−B, is identified with numeral 79.

A drawback of using .RLE data in relation to polygonal data, on the other hand, is the amount of memory required. To store every layer in .RLE form at high resolution might require over 100 MB of storage for a typical part. This is too large for main memory, and even having to store such large files on disk is problematic. The problem is compounded by the divergence between the order of part building, which proceeds from the bottom up, and the order of constructing support structures, which, as described herein after, proceeds from the top down.

As discussed hereinafter, an output file is required for constructing supports in which, for each cross-section, an .RLE description is provided for that cross-section, as well as the Boolean summation of every cross-section above the current cross-section. Basically, the technique involves computing the Boolean subtraction between the .RLE description of a cross-section and the .RLE representation of the "current total" for that cross-section, i.e., the Boolean union of all layers above the current layer. Pseudo-code for this basic technique is shown in FIG. 18, in which get_part (level) refers to a function which provides the .RLE representation of the cross-section at the prescribed level; boolean_subtract (current_total area A, part_for_layer= area B) refers to a function which provides the result of Boolean subtracting area A from area B; and boolean_add (area A, area B) refers to a function which provides the Boolean addition between area A and area B.

An algorithm for performing memory management which permits supports to be constructed without requiring the entirety of the part and current total data to be simultaneously stored in memory will now be described. The preferred algorithm proceeds in two stages.

In the first stage, the layers of the part are successively considered starting from the top of the part while maintaining a running total of the Boolean summation of the layers of the part. Upon encountering a layer, the current total for the layer (i.e. updated running total) is computed by calculating the Boolean addition between the area of the running total from the previous layer and the area of the current layer. However, instead of storing the current total data for all the layers, only the current total data for intermediate layers, i.e., every Nth layer where N might be 100, are stored. The rest of the current total data is discarded.

This first stage is illustrated in FIG. 19 in relation to part 80 and the associated supports, identified in the figure with numeral 81. The top-down generation of the current totals for the respective layers is identified with numeral 82, and the intermediates of these are identified with numeral 83. Pseudo-code for this first stage is illustrated in FIG. 20 in which the get_part function is that described earlier in relation to FIG. 18, and the boolean_addition function is that described earlier in the discussion of Boolean operations.

The second stage involves selecting an intermediate layer and performing a top-down computation, in the manner described previously, of the current totals for all the layers between that intermediate layer and the next intermediate layer. The data, consisting of the part and current total data for each layer, is then output from the bottom-up. When this has been accomplished, the current intermediate layer, and the data between it and the next lower intermediate layer can be deleted, and the process repeated for the next higher intermediate layer.

Figure 21:
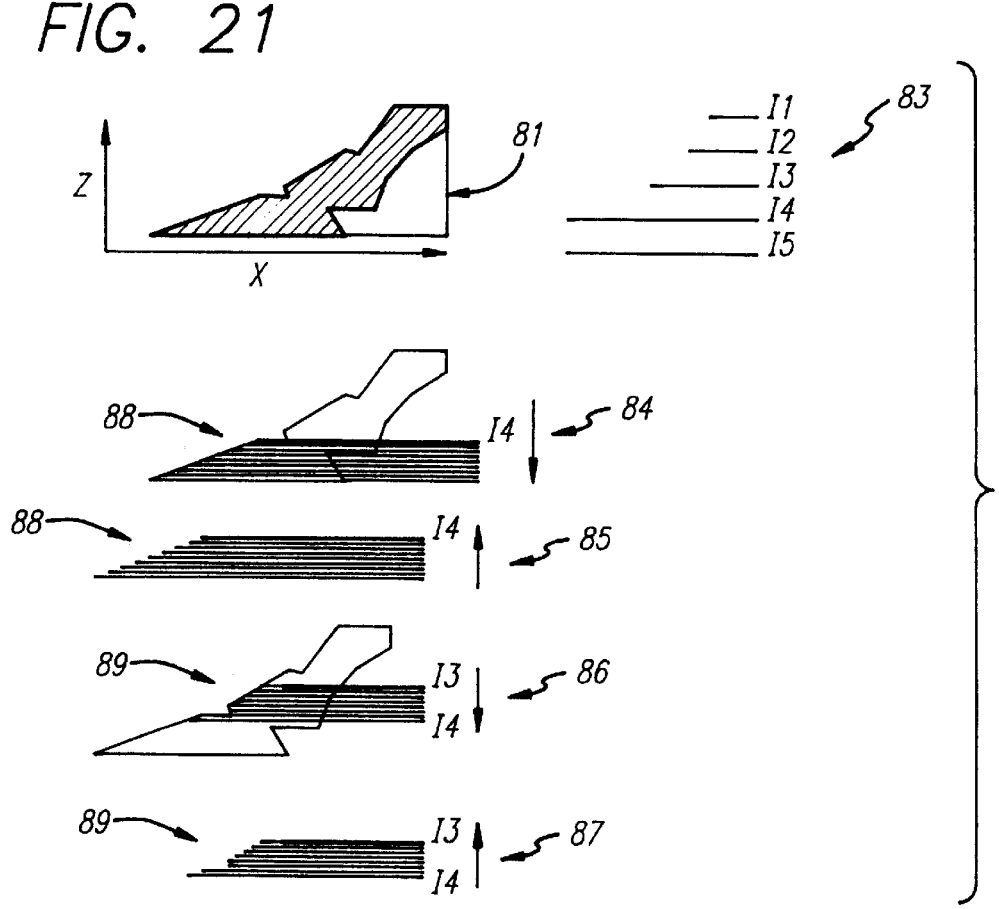

This second stage is illustrated in FIG. 21, in which compared to FIG. 19, like elements are referenced with like identifying numerals. Four steps, identified with numerals 84–87, of this second stage are shown. In step 84, the current totals for all the layers between intermediate layers 14 and 15 (e.g. the bottom of the part or object), identified in the figure with numeral 88, are determined and stored. Next, in step 85, the supports for these layers are determined using the methods described hereinafter, and then output. The part and total data between 14 and 15 is then deleted. Then, in step 86, the part and total data for each layer between 13 and 14, identified with numeral 89 in the figure, is determined and stored. Finally, in step 87, the supports for these layers are determined and output for building. The data for these layers is then deleted. The process then repeats itself for every intermediate layer.

It should be appreciated that this algorithm drastically reduces the memory requirements for the support generation process. If N is the number of layers between two successive intermediate layers, then the number of layers which is stored at a time is equal to the number of intermediate layers plus 2N (since part and total is required). If T is the total number of layers, the number of stored layers is equal to T/N+2N. Optimal memory usage is then obtained when N=the square root of (T/2). Thus, for a total of 5000 layers, the optimal number of intermediate layers N is 50. The total number of layers that must be stored at any time is thus 200.

Figure 22:
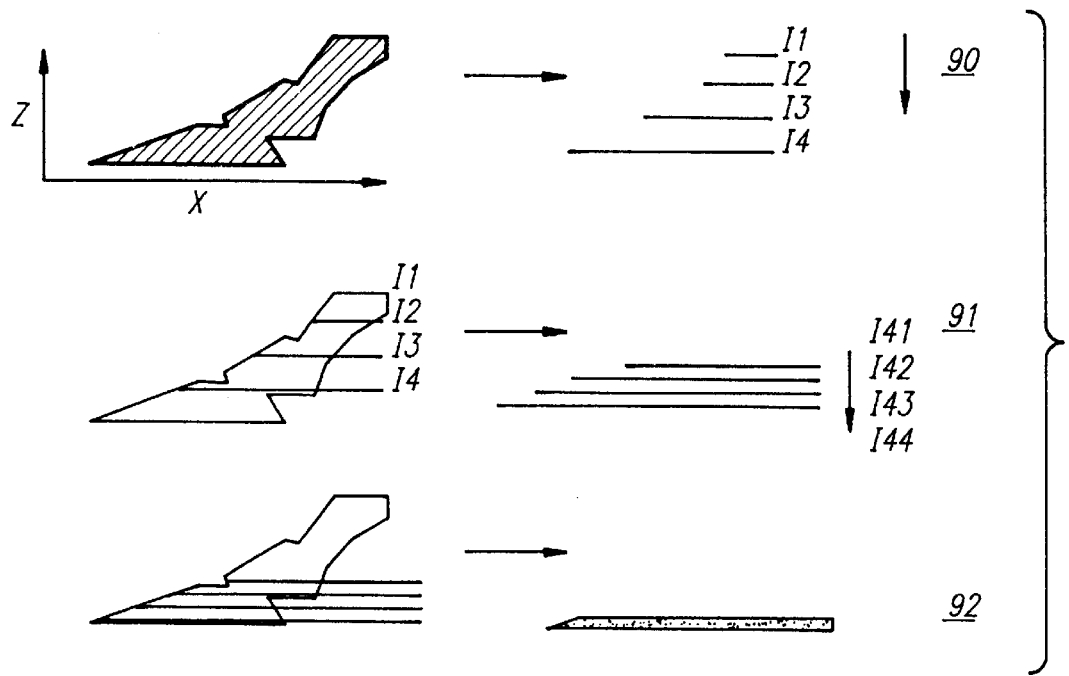
FIG. 22 illustrates a three-stage process for generating supports.

Memory requirements can be reduced further by extending the aforementioned algorithm to two levels of intermediate layers. As shown in FIG. 22, the algorithm proceeds in three stages, depicted in the figure with identifying numerals 90, 91, and 92. In the first stage, identified with numeral 90, the first level of intermediate layers is determined. In the second stage, depicted with numeral 91, a second level of intermediates is determined between two of the first level of intermediates. Then, in stage three, depicted with numeral 92 in the figure, the current totals for all the layers between two successive second level intermediates is determined and stored. After computing supports for these layers, the data is discarded, and the process is repeated for the next second level intermediate. When all the second intermediates associated with the current first level intermediate have been processed, the next first level intermediate is processed.

If the number of first level intermediates is N, and the number of second level intermediates is M, then the memory requirements for this three-stage process is (T/N)+(N/M)+ 2M. If T=5000, N=288, and M=14, then the number of layers that must be stored at a time is 66. Since this three-stage process increases computation time, the two-stage process is preferred unless very thin layers or large numbers of layers are involved, in which case the three-stage process may be preferable.

As discussed, the .RLE data for a given layer consists of a set of start and stop transitions, with an x-location associated with each transition. The data depicted in FIG. 23, for example, corresponds to the following start and stop locations and raster lines: raster line A=[(start 20), (stop 48), (start 60), (stop 89)], indicated by reference numerals 102, 104, 106 and 108 respectively, and raster line B=[(start 35) (stop 72)], indicated by reference numerals 112 and 114. One method for storing this data consists of a linked list of start/stop transitions, such as is depicted in the pseudo-code of FIG. 24. Compared to an array, a linked list is preferred because it easily allows for flexibility and variability in the number of transitions required per scan line. The problem is that it results in the use of large numbers of dynamically allocated small memory chunks which can significantly degrade performance for at least three distinct reasons. First, dynamic memory allocation is time consuming since it requires systems calls. Second, each chunk of dynamic memory has a hidden storage overhead associated with it which is used for book-keeping. Third, logically-adjacent pieces of information are located in non-contiguous memory leading to a large number of cache misses.

To overcome these problems, another form of data structure is more preferred. At a resolution of 1200 DPI, a transition in a typical part can be represented with 15 bits. Thus, a 32-bit word (with two spare bits) can be used to represent a start/stop pair. This data structure is depicted in psuedo code of FIG. 25. The "last" flag is utilized to indicate whether the start/stop pair is the last in the set for a particular scan line. If so, the "last" bit is set to a logical "1." If not, the bit is set to a logical "0." In this case, the next start/stop pair in the sequence is stored in the immediately adjacent memory location. This scheme enables large numbers of transition points to be stored in contiguous blocks of memory, with 2 bytes provided per transition. An example of this scheme is provided in FIG. 26 wherein like elements are identified with like numerals as used in FIG. 23. As shown, line A consists of two transition pairs: [(start 20), (stop 48)] and [(start 60), (stop 89)], elements 102, 104, 106 and 108 respectively, and stored in contiguous 32-bit words as shown. The "last" bit 122 in the first word is reset to a logical "0" to indicate that additional data for the scan line follows, while the "last" bit 124 for the second word is set to a logical "1" to indicate that no additional data follows. Line B consists of only a single pair of start/stop locations as indicated: [(start 37), (stop 78)], refered to with numerals 112 and 114 respectively, and wherein the last bit 126 is set to logical 1 so as to indicate that no additional data for line B follows. Reference numerals 132, 134 and 136 refer to other used bits associated with each 32-bit word.

The .RLE data is not created initially in the above described packed format. Instead, as discussed in relation to FIG. 13a–13c, it is initially created in an unpacked format, and then converted to the packed format.

In summary, a memory block is allocated for storing transitions. Pointers are used to indicate where data associated with each raster line starts ("current raster line" pointer or "current list" pointer) and a pointer indicating where unallocated memory begins ("next location available" or "next free location pointer). Each four byte (32 bit) word in this memory block is defined such that the first 15 bits are used to store the x-location of the transition, and the second 15 bits are used to store the qv of the transition. The 31st bit is used to define a "used" flag which indicates whether the word has been allocated and used. The 32nd bit is used to define an end flag which indicates whether the entry in that word is or is not the last transition entry for given scanning line for which the word is associated. Initially each raster line may be allocated one or more words for storing data. As transitions for each boundary segment are entered into the memory block, they are added to the lists associated with the raster lines from which they are derived.

In adding each new transition point to the raster line lists, several situations can be encountered. First, If there is no transition data in the memory block associated with a a given raster line, the transition data is added to the word associated with the "current list pointer" for that raster line. Second, if transition data exists at the word assoicated the current list pointer for the given raster line, the word following (i.e. "following word") the last recorded transition point for that raster line (i.e. for that current list pointer) is checked to see if it has been used. If not used the new transition data is entered there. Third, if the "following word" is occupied, then the word before the current list pointer (i.e. "prior word") is checked to see if it is being used. If not, the current list pointer and all recorded transition data (for the raster line) is shifted by one word and the new transition point data is added to the end of the shifted list. Fourth, if the "prior word" is occupied all the transition data for the raster line (including the current list pointer for that line) are moved to the word marked by the "next location available" pointer, the new transition data added, the original word locations of the transitions marked as being available for adding new data, and the "next location available" pointer moved to the location following the just moved words and added word.

Various modifications to the above outlined procedure can be made. For example, different sized words can be used, bit allocations can be varied, initial allocation amounts for each raster line can be varied, initial allocations for each raster line can be avoided and memory locations allocated as additional raster lines are needed to completely process the input segments, additional steps can be added to better control memory use, and the like.

Figure 27A:
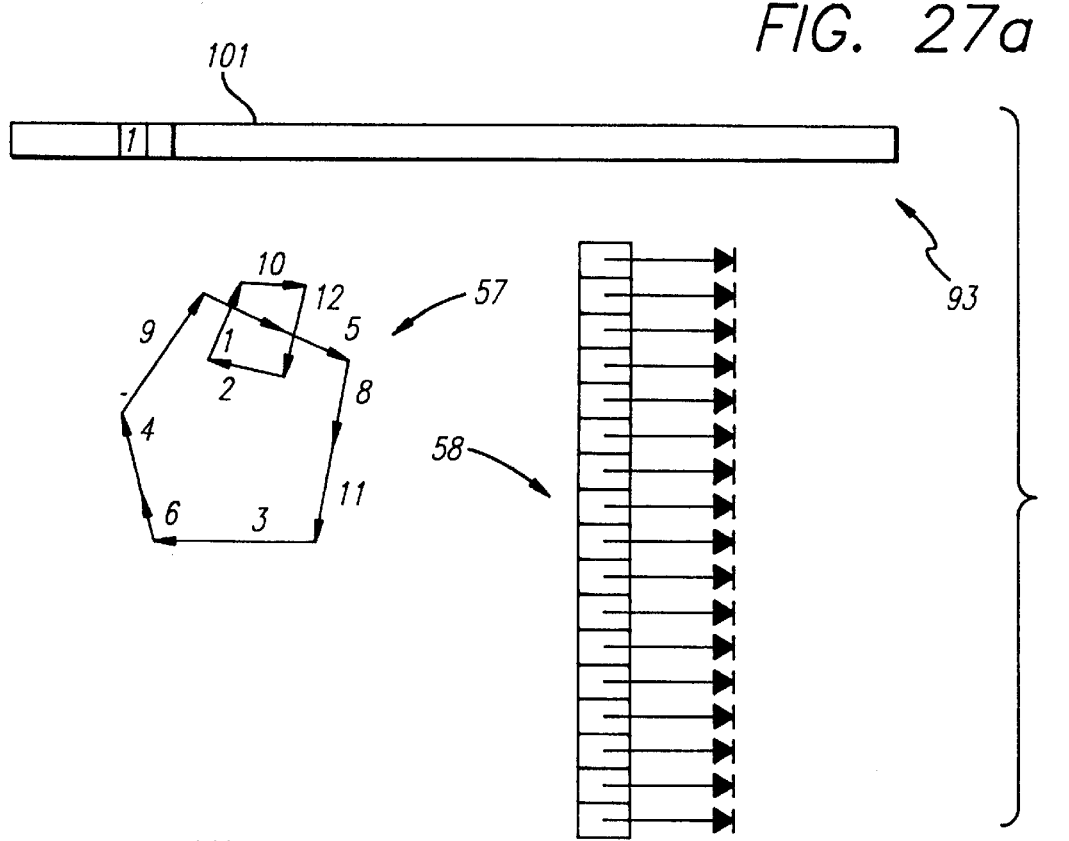

The above decribed process is exemplified in the description to follow and associated figures. FIGS. 27a & b are based on the same data found in FIG. 13 and as such like elements are referenced with like identifying numerals, illustrate the process. A large area of memory 93 is allocated to hold the .RLE transitions, and pointer 101 is used to indicate the next available memory word (32 bits). In this example, the word format includes the following bit designation: the first 15 bits 142 record the valueused to store the x-location of the transition, the second 15 bits 144 record the value of the qv of the transition. The 31st bit 146 is the "used" flag which indicates whether the word has been allocated and used. The 32nd bit 148 is last flag or "end" flag which indicates A nether or not the transition is the last recorded transition for the raster line.

Figure 27B:
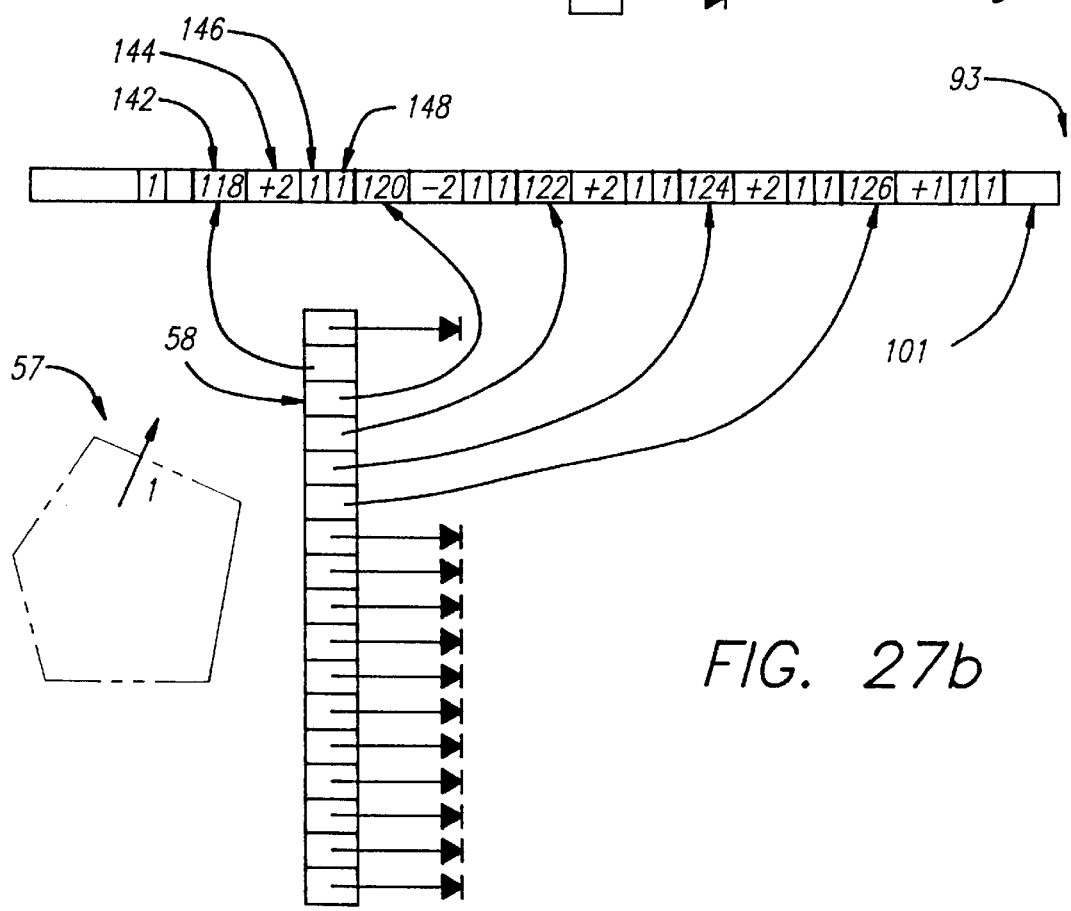

FIG. 27a depicts the situation before any transition data is added to memory 93. For procedural reasons, as will be made clear hereinafter, the first word in area 93, as shown, is marked as used. The "next free location" pointer 101 points to the second word in the area. Next, an array 58 of pointers is set up with all the pointers initialized with their "used" bits set to zero. As discussed above, each pointer is associated with a scan line and is used to locate the memory location for the first word (i.e. for the first transition) associated with that scan line. This pointer is called the "current list" pointer since it points to the first word in the list of transitions associated with the current scan line being considered. To add a transition for a particular scan line to the array, if the pointer in the array is on a word with a "used" bit set to logical 0, the location of the pointer is considered to be free and the transition is allocated to that word of memory. FIG. 27b depicts the situation wherein a first transition has been entered into memory for five scan lines.

Figure 28A:
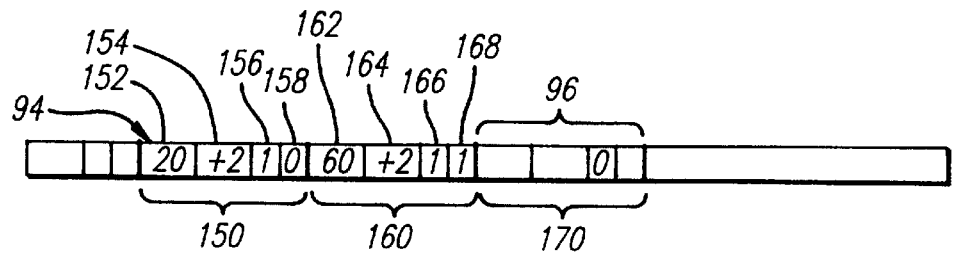
Figure 28B:
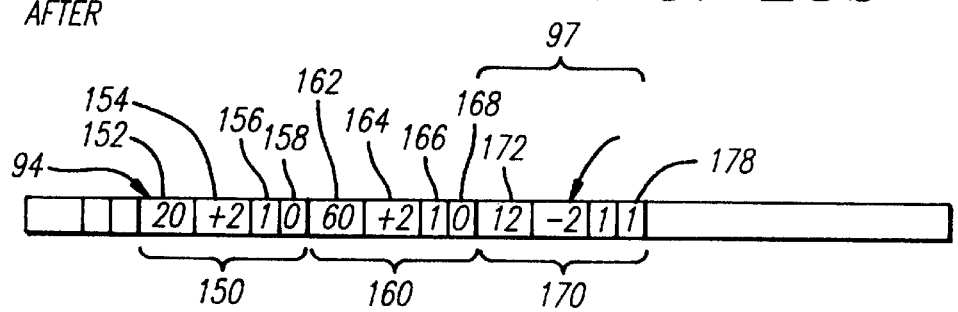

The process of adding a transition for a scan line that has a non-zero "used" flag in the position of the "current list" pointer 94 is illustrated in FIG. 28a & b. FIG. 28a depicts two words 150 and 160 which are already entered as belonging to the scan line associated with current lister pointer 94. Word 150 includes bit allocations 150, 154, 156, and 158 having the same definitions assocated with bits 142, 144, 146 and 148 of FIG. 27b. Similarly word 160 includes bit allocations 162, 164, 166, and 168. Elements 156 and 166 give the value of the "used" flag. Elements 158 and 168 indicate whether or not the word (i.e. transition) is the last transmission thus far recorded in the current list. As can be seen element 158 indicates that word 150 is not the last word, whereas 168 indicates that 160 is the last used word in the current list. First, the "used" flag in the next word 170 after the end of the current transition list, which flag is identified with numeral 96 in FIG. 28a, is checked to see if the word is available. If the "used" flag is set to logical 0 the word is available for storing new transition details. If it is set to logical 1 the word is not available. If available, as shown in FIG. 28a, then the new transition details can be placed into this word. The current list as modified by the addition of a new transition is depicted in FIG. 28b In FIG. 28b the new transition details 97 are added to word 170, the value of "end" flag element 168 is changed from "1" to "0", and end flag element 178 of word 170 is given the value "1" as 170 is now the end word of the current list.

Figure 29A:
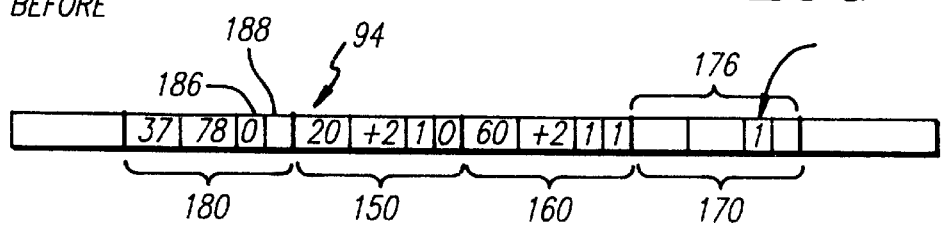
Figure 29B:
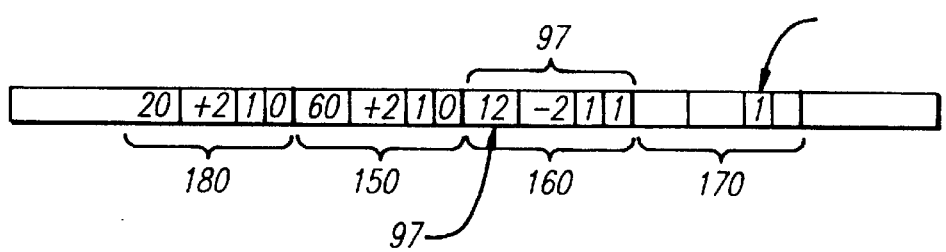

If the next word after the end of the current transition list is not available, then the availability of immediately preceding word before the beginning of the current transition list is checked. This checking occurs by evaluating the value of the "used" flag of this immediately preceding word. If available (as indicated by a "0" value), then the entire list is shuffled back one word, and the new transition is placed in the word which has just been cleared. This process is illustrated in FIGS. 29a–29b, in which, compared to FIGS. 28a–28b, like elements are referenced with like identifying numerals. As shown in FIG. 29a, the "current list" pointer is associated with word 150, the list ends with word 160 and the next word after the end of the current list, identified in the figure with numeral 170, is unavailable (due to the value "1" in element 176), while the word just before the beginning of the list, identified with numeral 180, is available (due to the value "0" in element 186). The consequences of these evaluations are shown in FIG. 29b, wherein the transition values previously associated with words 150 and 160 are shifted to be associated with words 180 and 150 respectively. The "current list" pointer is also shifted to word 180 and the new transition information is added to now available word 160. As a further result, the "end" flag remains associated with word 160 though it is no longer associated with the transition at x-value 60 (previous element 162, new element 152) but instead is associated with the transition at x-value 12 (previous element 172, new element 162). In other words, the entire current list is shuffled back by one word, and the new transition 97 is stored in the cleared location.

If there is no room in front of or behind the current transition list (i.e. the word immediately preceding the current list pointer and word immediately following the word containing the true end of list flag), the entire current list is copied into the space beginning with the word indicated by the "next available location" pointer, and the new transition is added to the end of this copied list. The "used" flags of the original memory words in which the list was stored are then reset to indicate that these original memory words are now available for use by scan line lists immediately preceding and imediately following these original locations. This process is illustrated in FIGS. 30a–30b, in which, relative to FIGS. 28a–28b, 29a–29b, like elements are referenced with like reference numerals.

FIG. 30a illustrates that the word 170 after the end 160 of the current list, as well as the word 180 preceding the word 150 containing the current list pointer, are both unavailable due to "used" flags 176 and 186 be set to "1". FIG. 30a further illustrates the word 200 where the "next availiable location" pointer is found. Word 200 follows the already entered transition points for all scan lines. Consequently, no new transitions for the instant scan line can be entered in consective memory locations to those locations 150 and 160 already containing transitions associated with the scan lines. As illustrated in FIG. 30b, the entire current list (transitions originally located inwords 150 and 160) is copied into the area beginning with the word 200 pointed to by the next free location pointer 101. The "used" flags in the old memory, identified with numeral 100 in FIG. 30b, are reset to indicate that this memory is now available. The current list pointer 94, is updated to point to word 200, the new transition 97 is added to the end of the list at word 220. The "next available location" pointer, identified with numeral 101, is then updated to point to the word 230 immediately following the word 220 containing the last entered transition 97 (i.e.the end of the list). Of course, if desired, one or more empty words can be left between the last entered transition 97 at word 220 and word pointed to by the "next available location" pointer.

This scheme is particularly efficient due to the nature of .RLE data. Because the data is used to describe solid geometrical objects, the number of transitions on a particular scan line is usually the same as the number of transitions on a neighboring line. This property is illustrated in FIG. 31. An object cross-section is depicted from the top wherein spaced raster or scan lines are shown. At the right of each scan line the number of transitions associated with that scan line is shown. Thus, if it is desired to add a transition to a particular scan line, it is likely that a transition will be added to a neighboring scan line. When an area of memory gets freed, as described in FIGS. 30a–30b and the accompanying text, it is likely that neighboring list will have transitions that canbe stored in this area, as illustrated in FIGS. 28a–28b, and 29a–29b, and the accompanying text. Thus, large arrays of memory develop fewer gaps than would occur with random data. Also, there will be fewer misses from the data stored in cache.

When all the segments have been processed, the resulting lists are then sorted in the x-direction. The correctly booleanized lines are then extracted in the manner previously described, and the extracted lines are stored in the packed format previously described.

Figure 32:
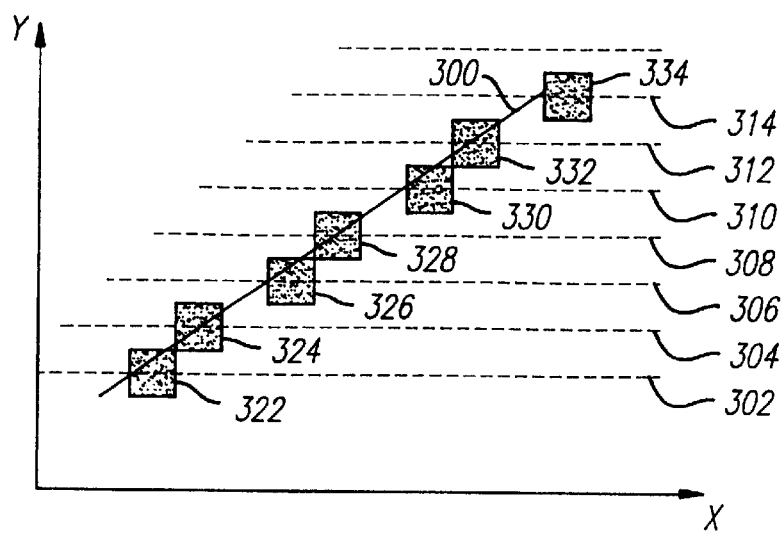
FIG. 32 illustrates the quantization error introduced by the pixelization of start/stop data.

This embodiment operates directly on an .STL file without requiring rounding of vertices to slicing planes, and thus avoids at least some quantization error. Some vertical and horizontal quantization error is introduced, however, through the generation of .RLE data since slicing planes will only be located at discrete levels in the vertical direction and since horizontal transitions will be limited to pixel boundaries. An example of these issues is depicted in FIG. 32 which represents quantization decisions associated with representing the on/off transition points 322, 324, 326, 328, 330, 332, and 334 for raster lines 302, 304, 306, 308, 310, 312, and 314. The center line of eacn raster line is depicted by respective dashed lines assoicated with boundary segment 300 which crosses through a plurality of pixels. In the figure, the region to the right of the line is considered to be within the object and the region to the left is considered to be outside the object. For each raster line only a single transition pixel can selected to represent the edge of the object regardless of how many pixels on that line are intersected by the boundary. Though there are many ways to determine which pixels will form the boundary of the object, the depicted approach selects the boundary pixel for a given raster line as the pixel which contains both the line segment and the center line of the raster line. In the event that the center line of the raster line meets at exactly the boundary between two pixels, a decision is made as to whether or not to emphasize object (i.e. solid) or non-object (i.e. hollow). As depicted for raster lines 302, 306, 310 and 314 the decision to emphasize hollow was made.

A number of transition selection alternatives exist. For example, one may elect to emphasize solid by selecting the transition to occur such that any pixel through which the line passes is counted as part of the object. Oppositely, one may elect to emphasize hollow by selecting the transition to occur such that only those pixels which are completely within the object boundary are included as part of the solid region. As an intermediate alternative, one may take an average of the transitions from the previous two alternatives. Other schemes for determining transition locations may involve determinations of area percentages of the solid or hollow for boundary region pixels, and the like. Implementation of some of these techniques may be aided by use of the techniques described in previously referenced patents and applications expecially those involving slicing techniques. As a final example, an alternative may involve subdividing a pixel and basing a decision based whether the segment intersects one or more of the subpixels. Whatever approach is used, however, consistency is desired in the approach used in relation to both the part and supports.

Data Compensation Techniques

Compensation is easily performed by moving the endpoints of the transitions in or out keeping in mind that endpoints from adjacent segments should not cross. To avoid having a support touch a part, for example, the .RLE data for the part could be expanded, and then Boolean subtracted from the current total data to get the .RLE data descriptive of the support region. Alternatively, the current total data could be expanded, and the support data computed as the Boolean difference between the expanded current total data and the part data. Or, the support data could be computed as the Boolean difference between the current total data and the part data. Then, the support data is expanded. The actual support data is then computed as the Boolean difference between the expanded support data and the original part data.

Compensation to adjust for drop size along the scan direction is easily performed as long as the DPI is at a higher resolution than the drop diameter. Compensation in the y-direction is more difficult, but can also be accomplished by stepping in smaller increments than 300 DPI.

Figure 33:
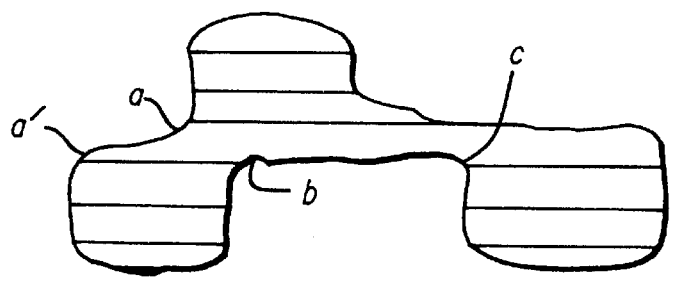
FIG. 33 illustrates the conversion of .RLE data to conversion data.

It is useful to be able to convert .RLE data into vector data. As shown in FIG. 33, the technique involves connecting two consecutive "on" points or consecutive "off" points to form vectors unless there is an intermediate point between the two, in which case the connection is impermissible. In FIG. 33, for example, it is permissible to connect point a and point a' but it is impermissible to connect point a to point c. The reason is that point b is between the two.

Support Data Generation

A preferred process of creating data for support structures will now be described. The process begins with data provided from the above described data manipulation techniques. As described above, the Data Manipulation Subsystem provides object (i.e. part) data and "total" data for each layer. The part data for a given layer is a series of start and stop points in adjacent raster lines which define the XY locations of the part at that layer. The "total" data for a given layer is a series of start and stop points in adjacent raster lines which define the Boolean union between the XY locations of the part at that layer and any desired support at that layer.

Figure 34A:
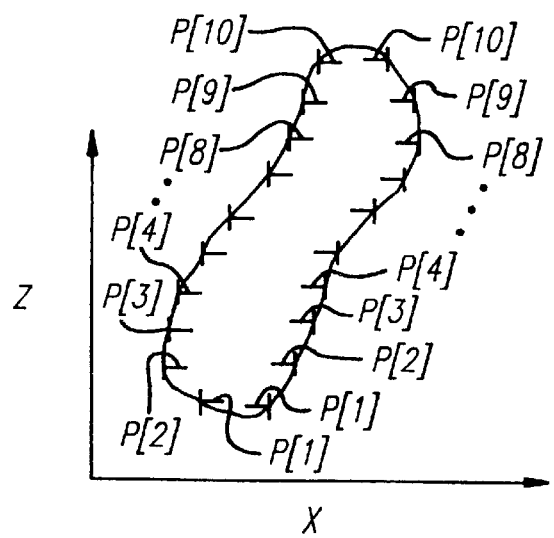
FIGS. 34a–34c illustrates data for use in building supports.
Figure 34B:
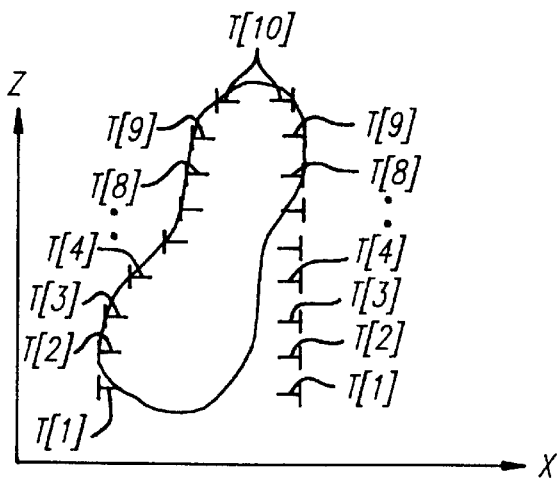
Figure 34C:
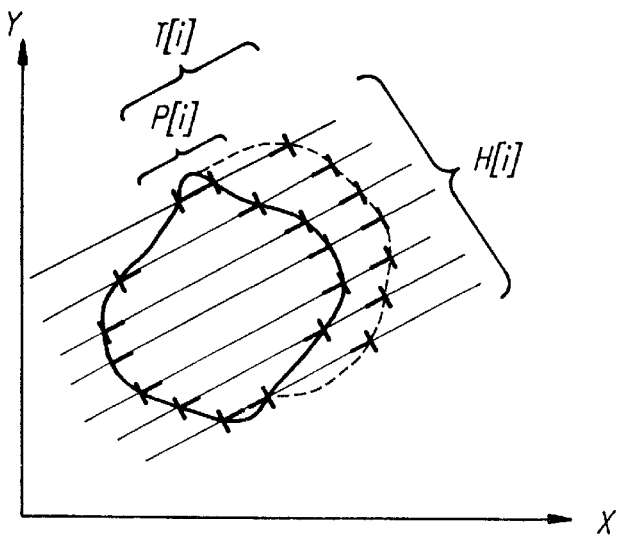

Such data is illustrated in FIGS. 34a–34c. FIG. 34a illustrates the part data P[1] to P[10] for each layer (i.e. cross-sections, lamina) 1 to 10, respectively, for a "peanut" shaped part shown floating in the z-x plane. In FIG. 34a only a single RLE line for each of cross-sections P[1] to P[10] is shown. The start transitions are identified with the "•" symbol, while the stop transitions are identified with the "·" symbol. As can be seen, the part data tracks the boundary (i.e. extents) of the part.

FIG. 34b illustrates the "total" data T[1] to T[10] for each layer 1 to 10, respectively, for the part. It is also defined in terms of start and stop transitions. However, unlike the part data, it does not necessarily track the boundary of the part. As discussed above the "total" data for a given layer is the Boolean union of the part data for all the layers above the given layer.

FIG. 34c illustrates a cross-sectional view (in the X-Y plane) of both the part and total data for a given layer. This data, identified as P[i] and T[i], respectively, comprises a plurality of start and stop transitions which are arrayed along hash lines H[i] in the X-Y plane. In a preferred embodiment the hash lines would be oriented parallel to the x-axis. However, as indicated other orientations of hash lines are possible.

In a preferred embodiment, the combined object and total data is used to determine the start and stop transitions for the supports, one layer at a time. If a single type of support is to be used in all regions requiring supports, a single support style can be defined which can be applied to each layer in the region defined as the difference between the total data for a layer and the part data for that layer. On the other hand, as discussed in U.S. patent application Ser. No. 08/534,813, now abandoned, it may be advantageous to use different types of support structures for different locations depending on how close or far away any up-facing andor down-facing surfaces of the object are. Furthermore, it may be advantageous to use different support styles depending on how far the region is from object boundaries on the same layer. Techniques for performing horizontal comparisons are described in above referenced U.S. Pat. No. 5,999,184 which are applicable to the current invention to aid in defining support regions. For example, it may be advantageous to utilize two different support styles one for use when a region is a few layers below a down-facing surface and one for use elsewhere. Alternatively, two physical support styles can be used in combination with a third "no-support" style wherein the no-support style might be applied to the region that is within 1 or 2 pixels of the boundary regions of the part or wherein the part surface above the object as a normal to the vertical which is greater than some critical angle. Many additional embodiments utilizing multiple support styles are possible and they can be readily implemented by the teachings herein and those incorporated by reference (particularly U.S. patent application Ser. No. 08/428,950, now abandoned, and U.S. Pat. Nos. 5,854,748; 5,870,307; and 5,999,184). Additionally, the teachings herein can be applied to what might be termed interior object supports, wherein single or multiple supports styles may be used in the process of forming interior portions of objects. Examples of such techniques, as applied in stereolithography for the purpose of making investment casting patterns are described in U.S. patent application Ser. No. 08/428,950, now abandoned, previously incorporated.

To further explain how one might define data for different support regions the following example is given which corresponds to the hybrid support example described in U.S patent application Ser. No. 08/534,813, now abandoned. In terms of this example, three categories of supports are recognized: (1)thin, fiber-like columns spaced in a checkerboard pattern; (2) more substantial 3×3 pixel columnar supports; and (3) intermediate or transitional layers.

Assuming layer "n" is about to be built, the technique involves determining how close each portion of layer "n" is to an up-facing and/or a down-facing surface of the object. In the present embodiment, if a portion of layer "n" is within "r" layers (e.g. 5–10 layers) of a down-facing surface or within "u" layers (e.g. 5–10 layers) of an up-facing surface, the checkerboard category of supports is to be built for that portion; if between "s" (s=r+1)and "t" layers from a down-facing surface (e.g. 6–10 or 11–15 layers) and more than "u" layers (e.g. 5–10 layers) from an up-facing surface, the intermediate or bridge category of supports is to be built; and if more than "u" layers (e.g. 5–10 layers) from an up-facing surface and more than "t" layers (e.g. 10–15 layers) from a down-facing surface, the 3×3 columnar support is to be built.

Figure 46A:
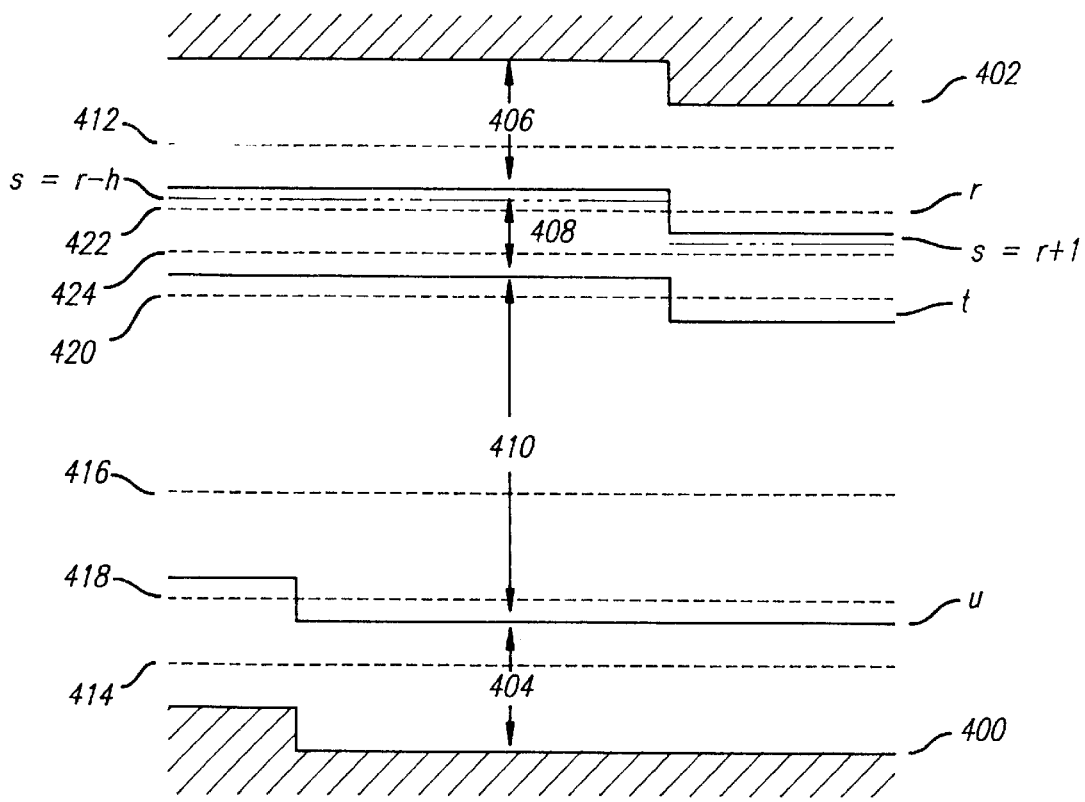
FIG. 46a depicts a side view of an object containing a gap along with hypothetical levels and regions upon which formation of different support structures can be based.
Figure 46B:
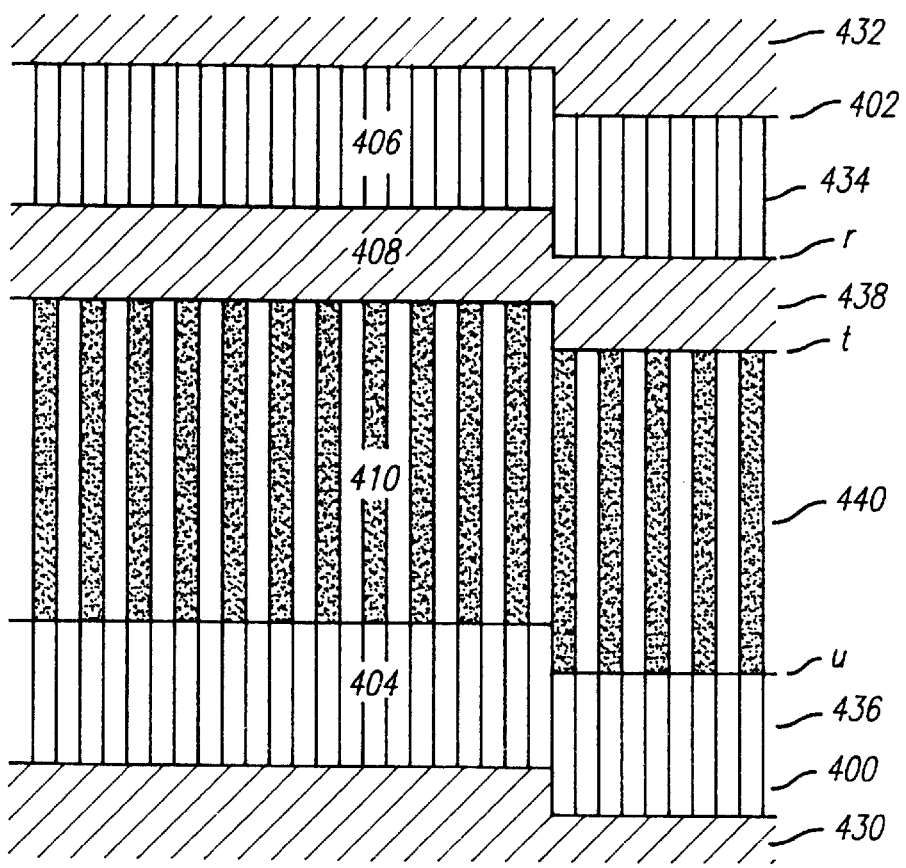
FIG. 46b depicts a side view of the object of FIG. 46a wherein the gap is filled with various types of support structures.

The above example is illustrated in FIGS. 46*a* and 46*b* which depict identical side views of an object with a gap between an up-facing surface and a down-facing surface of an object. FIG. 46*a* depicts the side view along with hypothetical levels and regions upon which formation of different support structures will be based. FIG. 46*b* depicts the side view wherein the gap is filled with various types of support structures according to the layout of the hypothetical levels and regions of FIG. 46*a*.

More specifically, FIG. 46*a* depicts a down-facing object surface 402 and an up-facing object surface 400 which are separated by a spacing comprising the regions 404, 410, 408 and 406. Region 404 is located within "u" layers of up-facing surface 400 and region 406 is located with "r" layers of down-facing surface 402. Region 408 is located between "r" and "t" layers from down-facing surface 402 and is simultaneously located more than "u" layers from up-facing surface 400. Region 410 is located simultaneously more than "u" layers from up-facing surface 400 and more than "t" layers from down-facing surface 402. Region 404 and 406 are to be formed with checkerboard type supports, region 408 is to be formed with transition type supports (e.g. completely solidified) and region 410 is to be formed with 3 by 3 column supports. Layers 414, 412, 424, and 416 are shown to be completely within regions 404, 406, 408, and 410 respectively. Therefore these layers will be formed with a single type of support structure over their entire area. On the other hand layers 418, 420, and 422 are shown to be partially located within regions 404 and 410, 410 and 408, and 408 and 406, respectively. Therefore, these layers will be formed with different types of support structure dependent upon XY location of each portion of the layers.

FIG. 46*b* depicts solid object regions 432 and 430, above and below down-facing surface 402 and up-facing surface 400, respectively. The region 404 and 406 are indicated as being filled in with checker board (one pixel on, one pixel off) supports. Region 410 is indicated as being filled by 3 by 3 column supports (3 pixels on, one pixel off) supports. Region 408 is indicated as being filled in by a solid region of supports.

This embodiment may be presented in equation form. In presenting these equations, the following terminology is used:

$C_n(D)$: the area elements of layer n over which the "checkerboard" category of supports should be built as determined from down-facing surfaces.
$C_n(U)$: the area elements of layer n over which the "checkerboard" category of supports should be built as determined from up-facing surfaces.
$B_n(D)$: the area elements of layer n over which the "bridge" category of supports should be built as determined from down-facing surfaces.
$S_n$: the area elements of layer n over which the 3×3 pixel column category of supports should be built.

$P_i$: the area elements of the part at cross-section "I".
$P_n$: the area elements of the part at cross-section "n".
$T_n$: the area elements of the total data at cross-section "n".
$\Sigma$: Boolean summation of area elements.
+: Boolean union of area elements.
−: Boolean difference of area elements.
$\cap$: Boolean intersection of area elements.
r: the number of layers below a down facing feature which are formed with checker board supports.
u: the number of layers above an up-facing feature which are formed with checker board supports.
s: r+1=the number of layers below a down-facing surface at which transition-type supports end.
t: the number of layers below a down-facing surface at which transition-type supports begin.

With this terminology in mind, the following equations define the preferred method of determining supports for layer "n" according to this embodiment:

$$C_n(D) = \sum_{i=n+1}^{n+r} P_i - P_n \quad (1)$$

$$C_n(U) = \sum_{i=n-1}^{n-u} (P_i - P_n) \cap T_n \quad (2)$$

$$B_n(D) = \sum_{i=n+s}^{n+t} P_i - C_n(D) - P_n - C_n(U) \quad (3)$$

Equation (1) indicates that the area of layer "n" over which the checkerboard category of supports should be built, as determined from down-facing surfaces, is calculated by taking the Boolean union of the part data of the "r" layers above layer "n", and then calculating the Boolean difference between the data representing this unioned area, and the part data for layer "n".

Equation (2) indicates that the area of layer "n" over which the checkerboard category of supports should be built, as determined from up-facing surfaces, is calculated by taking the Boolean union of the part data of the "u" layers below layer "n", calculating the Boolean difference between the data representing this unioned area, and the part data for layer "n", and then calculating the intersection between this data and the total data for layer "n". The purpose of this last calculation is to avoid building supports when in fact there are no part layers above layer "n".

Equation (3) indicates that the area on layer "n" over which the bridge supports should be built, as determined from down-facing surfaces, is calculated by 1) taking the Boolean summation of the part data from layers "s" through "t" above layer"n", and 2) then differencing from the summed data of step 1,t the data representative of the areas over which the checkerboard supports will be built on layer n (below down-facing and above up-facing surfaces) and data representative of the areas over which the part itself will be built on layer "n". Essentially, this equation establishes a priority between bridge and checkerboard supports. It requires that in areas which are both within "u" layers of an up-facing surface, and within "s" to "t" layers of a down-facing surface (such as an area below a continuously curved surface), that priority will be given to the building of checkerboard supports.

Finally, equation (4) provides that the area on layer "n" over which the 3×3 pixel columnar supports are to be built is determined by taking the total data for layer "n" and determining the Boolean difference between this data and 1)

the part data for layer "n", 2) the data representative of the area or areas of layer "n" over which the checkerboard supports are to be built, and 3) the data representative of the area or areas of layer "n" over which the bridge supports are to be built.

Figure 37:
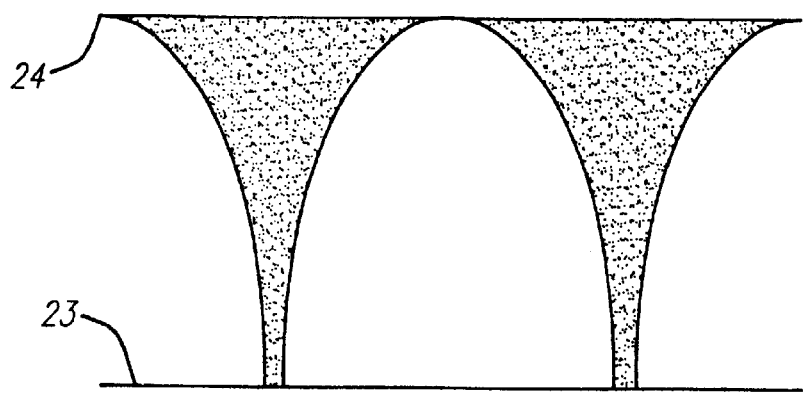
FIG. 37 illustrates a hybrid support structure.

As is apparent from the above discussion, equations can be defined for various regions where different types of support structures may want to be formed. FIG. 37 depicts an arch type support structure which requires a different build pattern as one gets progressively closer to a down facing surface 24. As indicated, the arch-type support starts at surface 23 which may be the surface of a build platform, an up-facing surface of the object, or a surface assocated with previously formed supports. As such this support structure is a hybrid support with many (e.g. 10 or more) different support styles required for its formation. Of course it would be possible to add a number of layers of checkerboard supports between the tops of the arches and the down-facing surface being supported.

Once this data has been determined, the next step in the process is to format the data for output to the control computer. As discussed, the control computer will load this data as well as object data in the bit map to drive the print head, as well as the X-, Y-, and Z-stages.

Figure 38A:
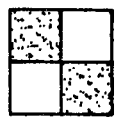
FIGS. 38a–38b illustrate two sample Style types.
Figure 38B:
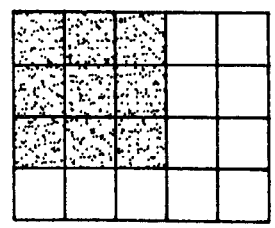

Style files are used for this purpose, one for each category of object structure and support structure. A Style file for a given object or support type is the core pattern which is repeated throughout the area in which the category of object or support is to be built. Style files are used to modulate the build pattern associated with a given region. This data modulation technique simplifies data manipulation and storage requirements. For example, the Style file associated with the "checkerboard" category of supports in the present embodiment is the 2×2 pixel pattern shown in FIG. 38a. As a second example, the Style file associated with the 3×3 pixel column supports in the most preferred embodiment is the 4×5 pixel pattern shown in FIG. 38b. Of course many other style patterns are possible. These Style patterns are repeated one after another, starting typically at (x,y) location (0,0) so as to define a repetitive pattern in XY space. This overall pattern is associated with the corresponding start and stop transitional data for object and support regions. The combination of Style file information and object information may occur before transfer of data to the control computer or may occur after transfer. Typically object and style information are combined into a single data set after both are transferred to the control computer. At present, the preferred Style file associated with the part is simply a 1×1 solid pixel pattern, indicating that the interior of the part is always solid.

Figure 39A:
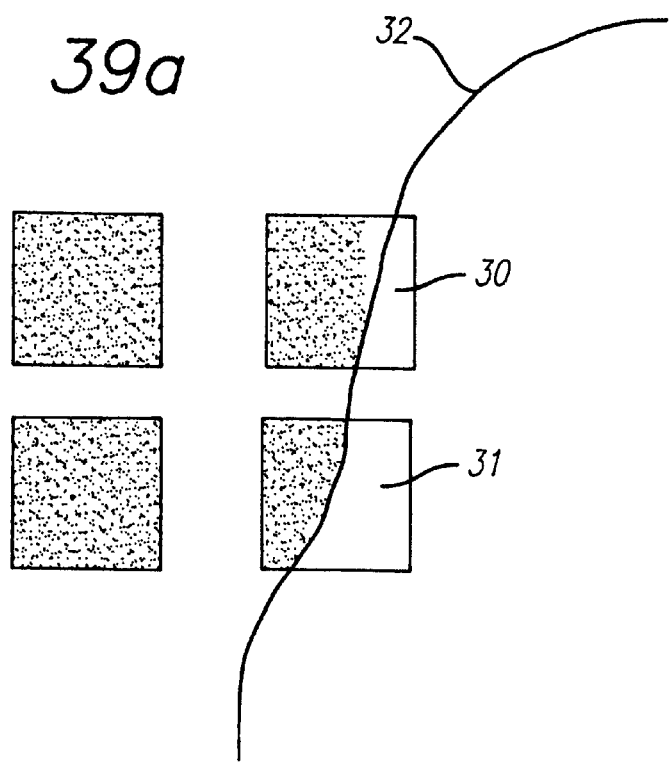
FIGS. 39a, 39b, and 39c illustrate part/support encounters that sometimes occur.

At present, the most preferred replication of patterns is fixed in the X-Y plane. With regard to the most preferred 3×3 support patterns, the result is that some of the 3×3 pixel columns may get diminished at part boundaries. This effect is illustrated in FIG. 39a. As shown, portions 30 and 31 of the 3×3 pixel columns are not built because of their proximity to part boundary 32. The result is that these two supports have diminished surface areas. If the columns are not retracted from the part boundary this presents little problem since the formation of the part will form the other portion of each partially formed column. However, building supports in contact with the part tends to damage object surface finish, thereby resulting in another problem.

Figure 39B:
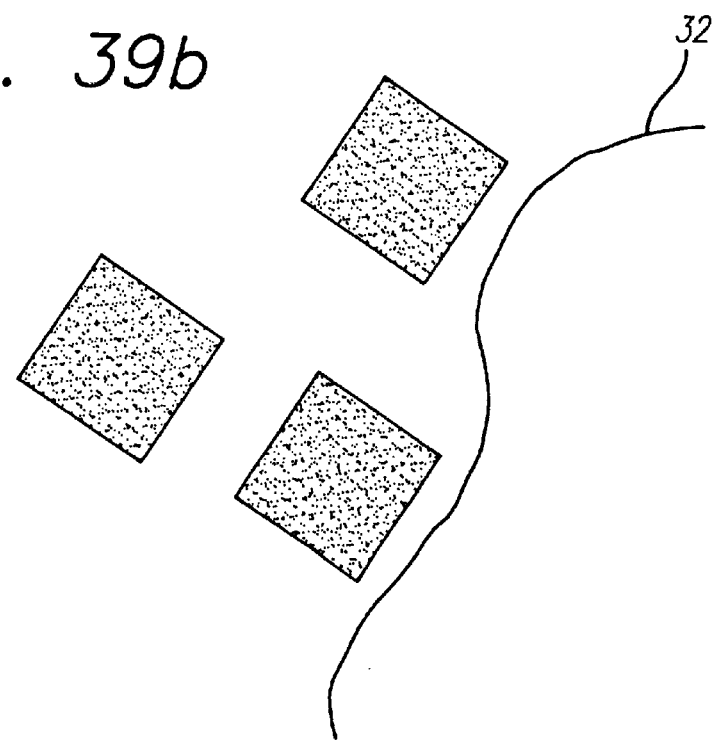

In the event the supports are retracted from the part, a solution to this problem is to allow the pattern of replication to vary to allow the 3×3 supports to track the part boundary. This approach is illustrated in FIG. 39b. Gradual changes in support column position can be achieved using offset pixel patterns as described in U.S patent application Ser. No. 08/534,813, now abandoned.

Figure 39C:
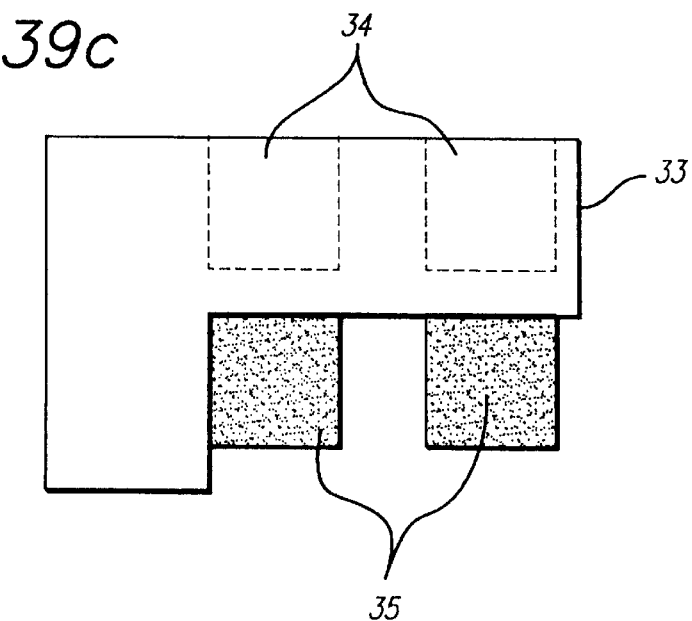

As mentioned above, another problem that sometimes occurs is that the 3×3 support columns are sometimes built in direct contact with the part. This problem is illustrated in FIG. 39c. As shown, supports 33 have been built in direct contact with part 33 (the supports 34 shown in phantom are below the part and illustrated solely for purposes of completeness). A solution to this problem is to move back these supports by 1 pixel or more to space the supports from the part. This can be accomplished simply by adjusting the start and stop transitional data for the supports. In the present embodiment, this adjustment is optional because of the trade-off involved: by backing off the support by one pixel, the surface area of the columns will be diminished, possibly causing an accumulation problem.

A few caveats are in order about the preferred method of performing the Boolean calculations. As has been discussed, the data involved in these calculations is formatted as a series of start and stop transitions. It has been discovered that this format facilitates the Boolean calculations by allowing them to be performed as a series of arithmetic calculations. For example, to perform a Boolean differencing operation between two sets of transitional data, it is only necessary to arithmetically subtract corresponding start and stop transitions from one another. The result is a significant improvement in computational speed. The reason is that Boolean operations involving N data points based on polygonal data are essentially $N^2$ operations whereas arithmetic operations using start and stop transitional data are essentially proportional to N.

Another point is that the intermediate Boolean union data calculated for layer "n", i.e., the Boolean union of the part data "r" and "u" layers above and below layer "n", and between "s" and "t" layers above layer "n", cannot be used in any subsequent processing. The reason is the lack of "memory" associated with the Boolean union operation as illustrated by the following equations:

$$\sum_{n}^{n+L} 1 = L (arithmetic) \tag{5}$$

$$\sum_{n}^{n+L} = 1 (Boolean) \tag{6}$$

As indicated, with the arithmetic operation, the nth item in the summation has an effect on the final sum which can be subtracted out when the calculations are performed for the next layer. With the Boolean operation, on the other hand, the nth item does not necessarily have any impact. Thus, the effect of this item cannot necessarily be subtracted out when the calculations are performed for the next layer.

Figure 35A:
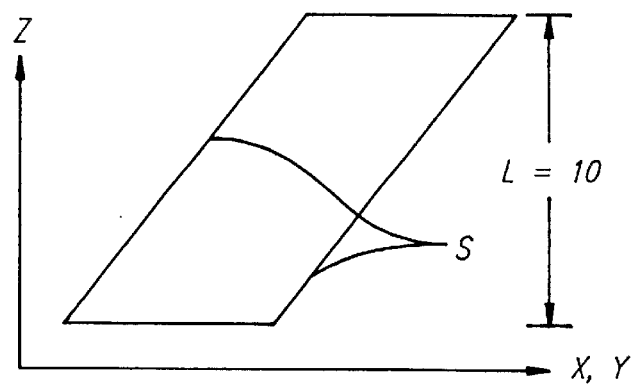
FIG. 35a illustrates an assumption about part slope made in the preferred embodiment of the subject invention.
Figure 35B:
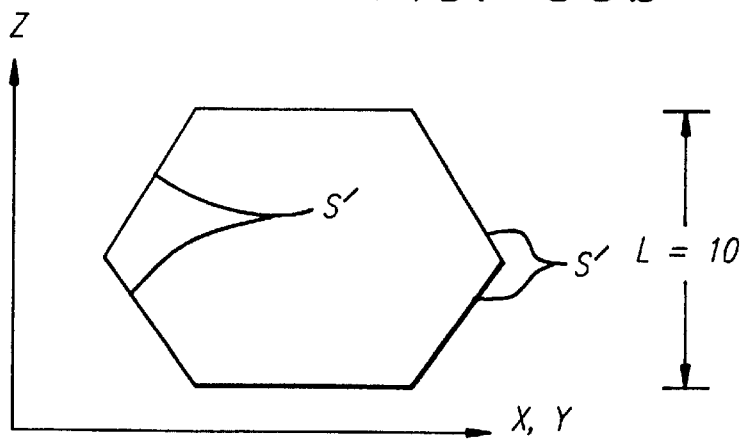

Though equations (1) to (4) above produce exact results, they may lead to excessive computation time. As such, in some circumstances, it may be desireable to utilize equations that may give approximate results but involve fewer computations. Excessive calculations can be avoided by making the assumption that the slope of a part surface does not change sign in a given number of layers (e.g. 10 layers, about 10–20 mils) or that any change in direction represents a negligible variation in cross-sectional position. In other words, the assumption is that the part surface does not change rapidly or drastically. This point is illustrated in FIGS. 35a–35b. FIG. 35a illustrates a part which is consistent with the assumption. As can be seen, the slope of the part surface, identified as S in the figure, does not change sign over or direction over a given number of layers, for example 10 layers. FIG. 35b, on the other hand, shows a part which is inconsistent with the assumption that direction of the slope of the surface does not change sign. However, depending on the amount of variance in XY position of the surface, the change in direction may result in a negligible variation in cross-sectional position. As can be seen, the slope of the part surface, identified as S' in the figure, changes sign over, for example, 10 layers. For a given number of layers, the thinner the layers the more likely the assumption will hold.

If these above assumptions are made, the following formulas can be used to reduce the mathematical calculations required:

$$C_n = (P_{n+t} + P_{n-u} - P_n) \cap T_n \quad (7)$$

$$B_n = P_{n+t} P_{n+s} - C_n - P_n \quad (8)$$

$$S_n = T_n - P_n - C_n - B_n \quad (9)$$

Instead of being based on the boolean summation of the area of every cross-section within a region, as original equations (1) to (4), these equations utilize the cross-sectional information from only the top and bottom cross-sections of the region. If the assumptions always hold true, these formulas yield exact results. In any case, in practice, they have been shown to be very good approximations.

It should be appreciated that to perform the aforementioned calculations, it is necessary to have available simultaneously the data from (t+u+1) layers (for example for t=10, u=5, we need data for 16 layers). That is because the support data for layer "n" is dependent upon the part and total data for layers "n+1" through "n+t", layers "n−1" through "n−u", and of course for layer "n".

Figure 36A:
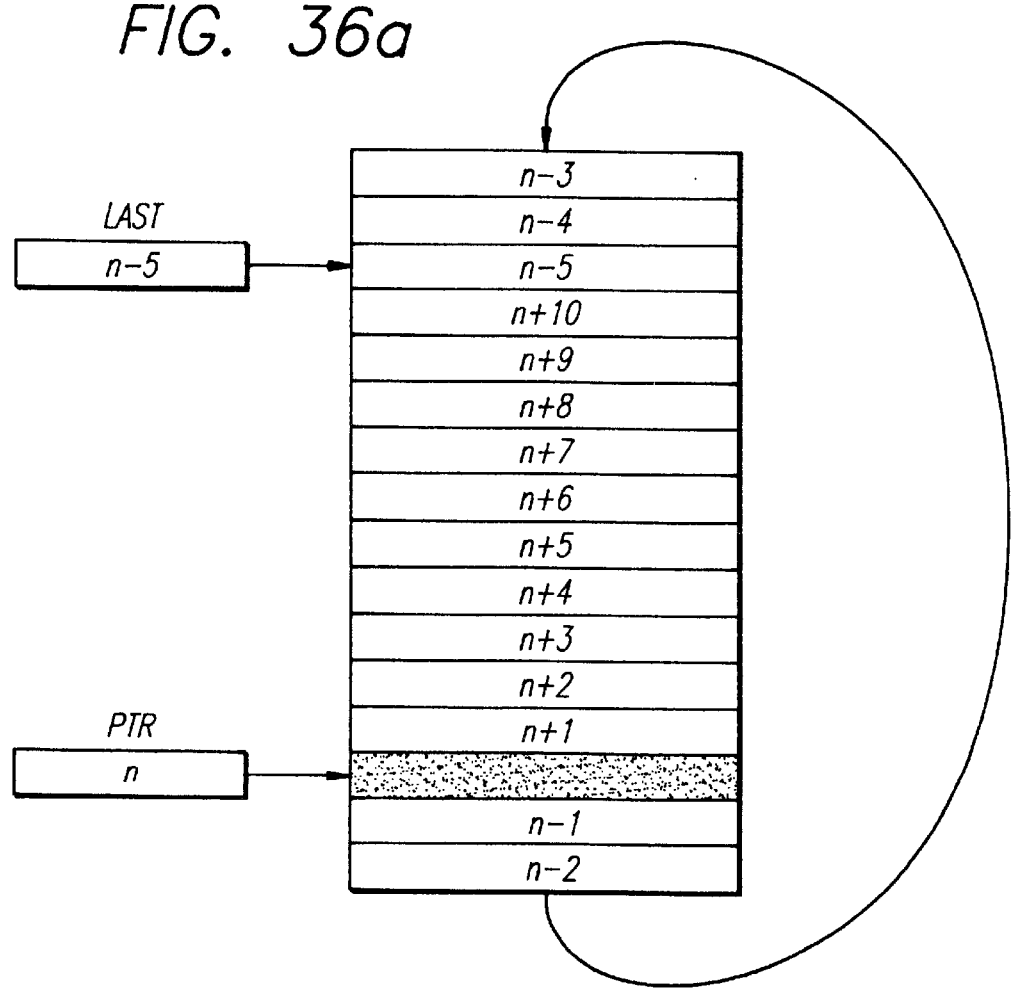
FIGS. 36a–36c illustrate a ring buffer used in the present implementation of the subject invention.

To maintain such data in immediately accessible form, it is advantageous to use a ring buffer. As shown in FIG. 36, a ring buffer is a circular buffer in which is stored the part and total data for t+u+1 layers (e.g. 16 layers). FIG. 36a illustrates the state of the buffer in terms of a 16 layer (t=10, u=5) example when the calculations for layer n are about to be performed. A pointer, identified as PTR in the figure, is used to point to the current layer under consideration. As indicated, the data for layers "n+1" through "n+10", "n", and "n−1" through "n−5" is stored in the buffer. A second pointer, identified as LAST in the figure, is used to point to the last entry in the buffer, in this case, the entry is for layer n−5.

Figure 36B:
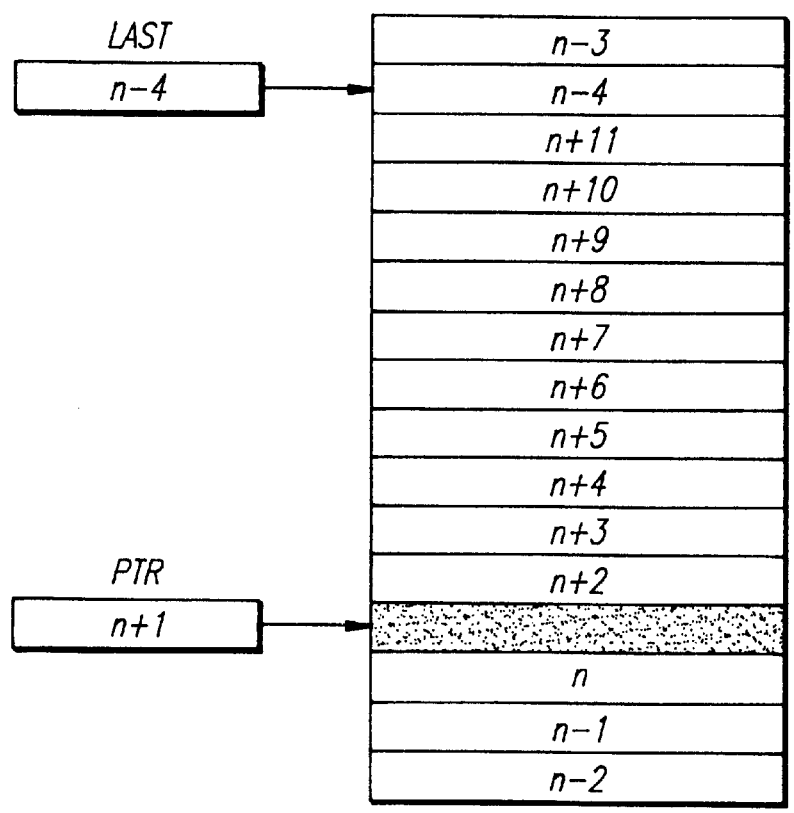
Figure 36C:
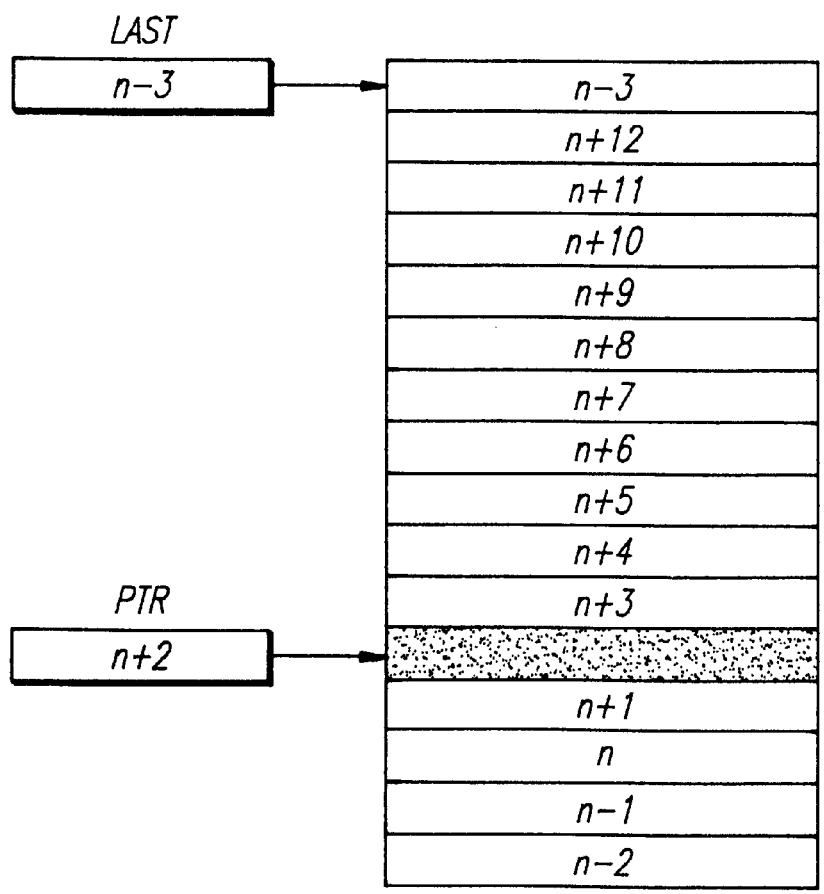

After the computations for layer "n" have been completed, it is necessary to update the buffer in preparation for performing the computations for layer "n+1". To accomplish this, PTR is first updated so that it points to the data for layer "n+1". Then, the data pointed to by LAST is overwritten by the data for the next layer to be added to the buffer, in this case layer "n+11". Finally, LAST is updated to point to the data which is now the last entry in the buffer, in this case, the data is for layer "n−4". The result of these three computations is illustrated in FIG. 36b. FIG. 36c illustrates the status of the buffer at the point when the computations for layer n+2 are about to be performed. This process then repeats until the computations for all the layers have been completed.

A number of alternative embodiments are possible for manipulating 3D object data into data useful for driving an SDM apparatus. For example, in one alternate embodiment, the aforementioned calculations are performed using Boolean operations on polygonal data instead of on transitional data. In another, the data for all the layers of the part is stored simultaneously in a memory instead of in a ring buffer. In still another, it is possible to equalize the rates of accumulation of the thin, fiber-like supports and the part by employing multiple passes of the print head.

It should also be appreciated that it is possible to compute bridge data or transitional support data from up-facing surfaces, i.e., $B_n(U)$. This data could be used to form transitional supports between the thin fiber like column supports starting at an up-facing surface of the object and the 3×3 column supports sitting thereon. Moreover, it should also be appreciated that it is not necessary to compute $C_n(U)$ data separately from $C_n(D)$ data if the Style file for the two is the same. Of course, if the two Style files are intended to be different, then both categories of data should be maintained.

It should also be appreciated that it is possible to build an arbitrary number of support types or categories on a given layer using the subject invention instead of the three that have been discussed. This can be accomplished simply by adding additional Style files and equations for determining the areas in which the new categories of supports are to be built.

Build Styles and Support Styles

For optimum data handling it is advantageous not to embed regular pattern formations into the RLE data since this would make the RLE files excessively large and make data handling in a timely manner impractical. As such it is advantageous to maintain object and support cross-section information independent of exact exposure: patterns (i.e. deposition patterns) until layer printing is to occur. As mentioned above, at an appropriate time, the cross-sectional data (e.g. in the form of RLE information) is boolean intersected with the appropriate build style patterns to define the exact pattern that will be used to define the deposition detail.

Figure 40A:
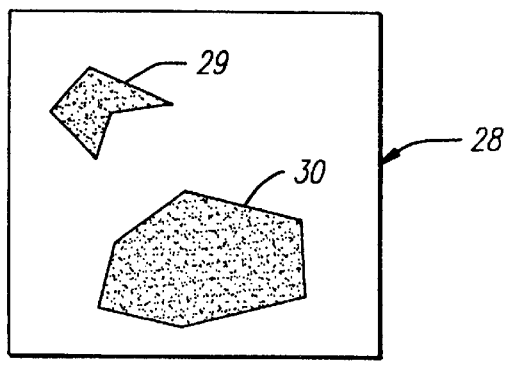
FIGS. 40a–40c represent an example of how style files are used.
Figure 40B:
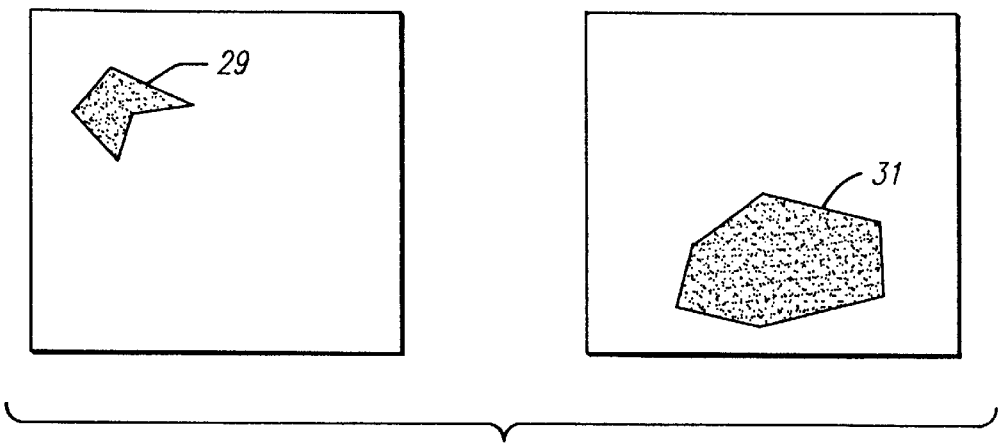
Figure 40C:
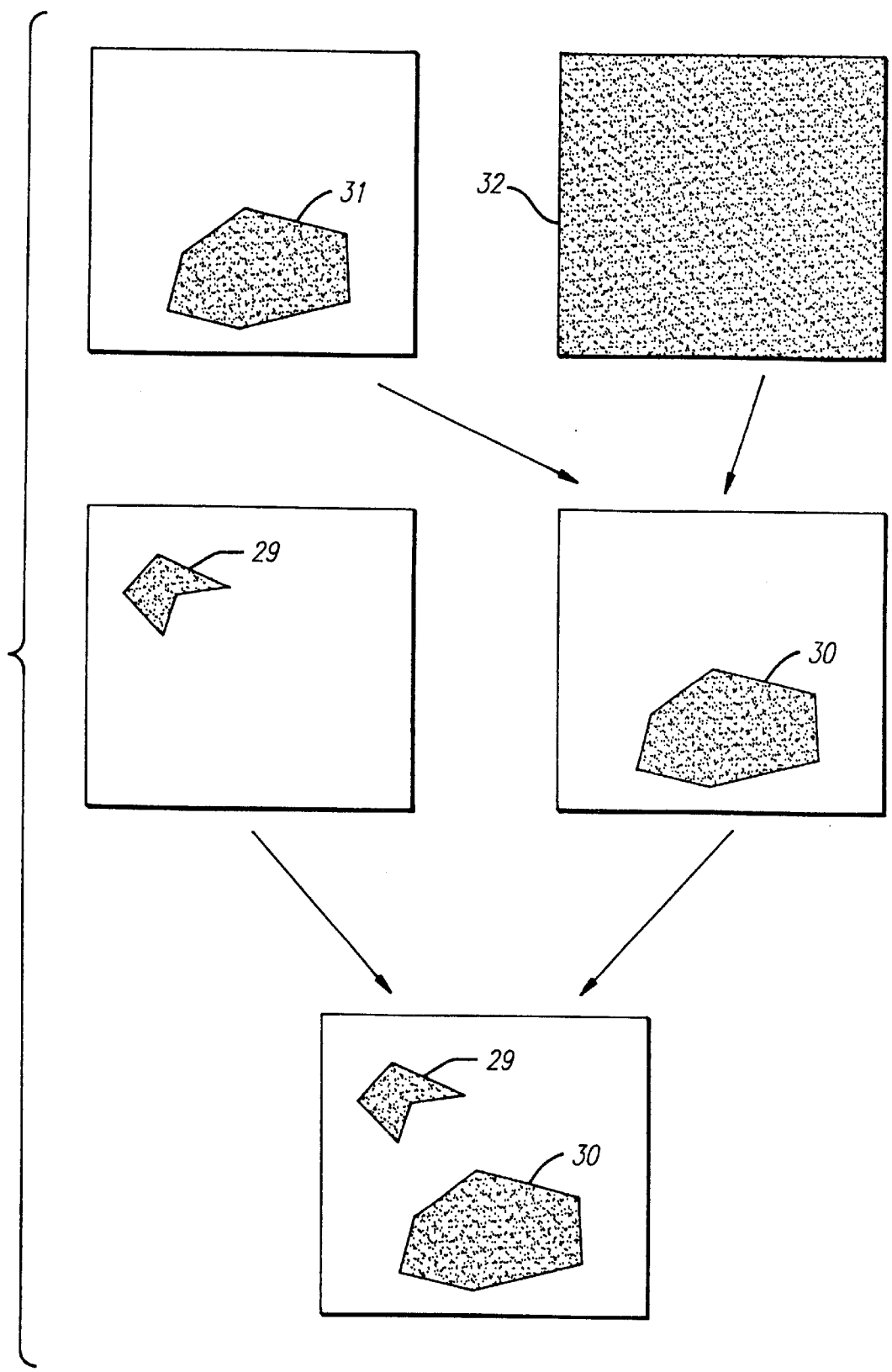

For example, this can be used to create checkerboard patterns on a rapid basis. An example of this is illustrated in FIGS. 40a–40c, in which like elements are referenced with like identifying numerals. FIG. 40a illustrates the desired image 28 to print. As shown, the desired image consists of two components. The first component, identified with numeral 29, is a solid. The second component, identified with numeral 30, is desired to be formed with an on-off checkerboard pattern. For the reasons discussed, it may be prohibitively slow and memory intensive to convert the image 30 to a honeycomb pattern on a pixel by pixel basis. Further manipulations of the data for image 30 may be unduly complicated and slowed by putting it in a honeycomb pattern too early. Transfer of data to a storage device (i.e. a hard disk or tape drive) may also be unduly encumbered by holding it in such a detailed format. Thus, as shown in FIG. 40b, the data for both patterns is maintained or converted into solid form (minimum transitions) for further manipulation whereafter it is transmitted to a digital signal processor which is responsible for controlling jetting and X,Y,Z motion. Then, as shown in FIG. 40c, the data 31 associated with component 30, which is in solid form, is logically "ANDed" (i.e. boolean intersected) with honeycomb/checkerboard pattern 32 in order to change the solid data into the desired modulated form representative of the modulated cross-sectional pattern to be jetted. Once in this final modulated form it is preferred that no further storage of the data occur but instead be used to control the firing of jets with or without further manipulation. In this example the data for component 29 and 30 must now be "ORed" together to yield the a single bit map containing the entire desired set of data. It is this combined data which is then used to drive the firing of the printhead.

Data provided with the RLE file to the modeler includes building/support pattern style information for use as discussed above. As discussed above the association of RLE data with modulation data is accomplished through the use of Style files, each of which stores a particular "style" or building pattern. Examples of building patters are shown in FIGS. 41*a*, 41*b*, and 41*c*. FIG. 41*a* illustrates a checkerboard building pattern appropriate for use in building a category of supports as described in U.S. patent application Ser. No. 08/534,813, now abandoned. FIG. 41*b* illustrates a pattern appropriate for use in building a second category of supports as also described in U.S. patent application Ser. No. 08/534, 813, now abandoned. FIG. 41*c* illustrates a pattern which specifies that solid be build.

Figure 41E:
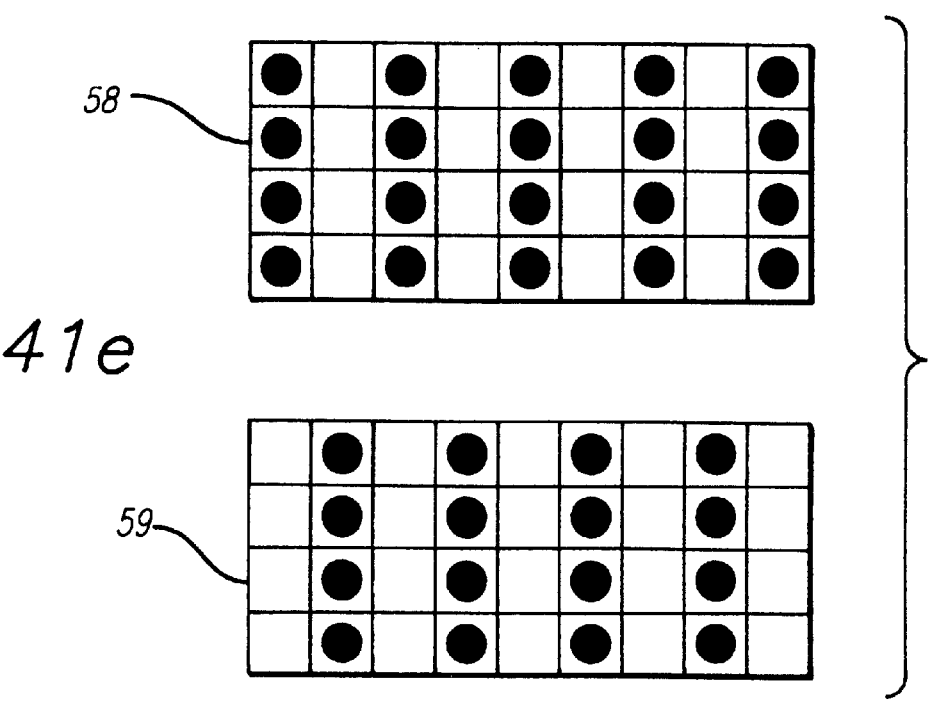
Figure 41F:
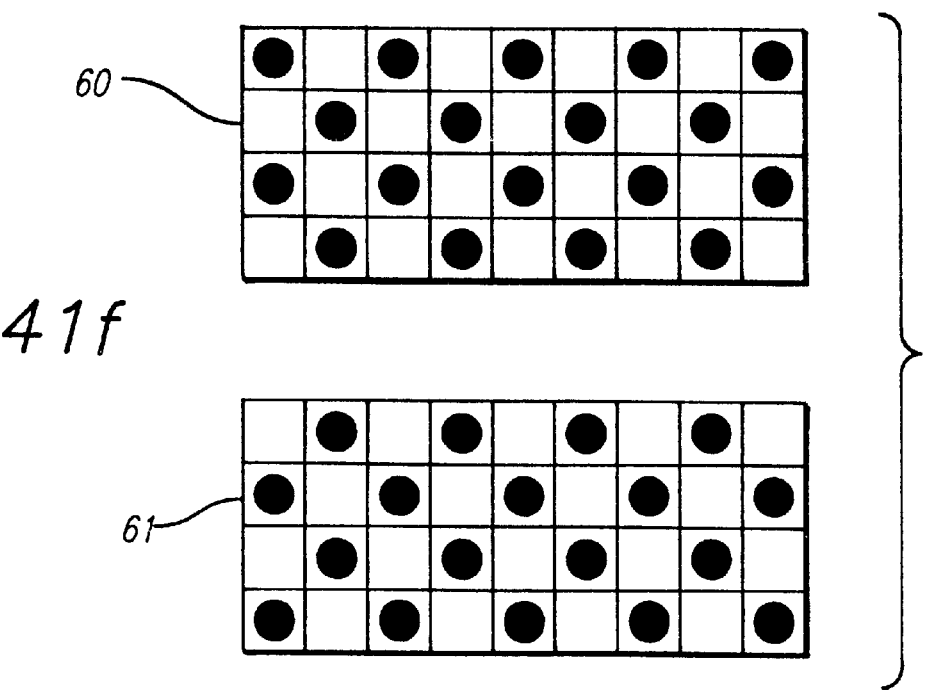

Many other build styles are possible including multiple exposure build styles. Such as the examples depicted in FIG. 41*d*, in which alternate spaced scan lines are solidified in successive passes. In this example pattern 56 is exposed during a first pass and pattern 57 is exposed in a second pass. Another example is shown in FIG. 41*e*, in which alternate spaced columns are solidified on successive passes. In this example pattern 58 is exposed during a first pass and pattern 59 is exposed during a second pass. A third example is illustrated in FIG. 41*f*, in which non-overlapping checkerboard patterns are solidified on successive passes. Pattern 60 is exposed in a first pass and pattern 61 is exposed in a second pass.

To associate different style files with different object and support regions, the .RLE format is made to include a build pattern designation for each different sets of raster line transition information passed to the modeler. The conceptual format of the .RLE file is depicted in FIG. 47.

Through this file format, a user can specify virtually any building pattern for a given pair or pairs of transitional points.

Data Skewing

In addition to providing a bit map containing the correct pixel information for controlling the firing of jets, the data must be readily extractable from the bit map and provided to the firing mechanism in the right order. This need to place the data in an extractable form brings us to the next step in the data manipulation process. This next step is called skewing. For example, the data can be processed so that the necessary information is available to allow the jets to simultaneously fire even though adjacent jets may not be located on adjacent raster lines or even simultaneously located, on their respective y raster lines, above the same X-coordinate. As such skewing refers to a data realignment process which is required, for example when the scan head is placed at an angle to the scanning direction (as depicted in FIG. 2*b*), when multiple heads are used and are to be fired simultaneously or in sequence, or simply due to the jets not being spaced over adjacent raster lines.

In FIG. 2*b*, for example, orifices 10(3) and 10(4), which are aligned in FIGS. 2*a*, become displaced in the scan direction by a distance d", as shown in FIG. 2*b*, when the scan head is angled relative to the scan direction. However, the data used in relation to the configuration of FIG. 2*a* would require that jets 10(3) and 10(4) fire at the same time to hit similar X locations. With the configuration of FIG. 2*b*, a distortion would be caused by use of such data. Consequently, the data must be skewed, in this example, to correct for this relative displacement.

The problem is that the amount of data involved is relatively large, and the skewing must be performed in real time. For example, an ink jet in a typical configuration might take only 500 nS. to pass over a given pixel. Thus, any skewing process that operates on individual pixels cannot take longer than this time per pixel (on average) in order to keep up with the data consumption rate.

A typical digital signal processor,, e.g. a C31 processor, running at 40 MHz, has a cycle time on the order of 50 nS. Therefore, if the time over any pixel location is on the order of 500 nS, there are only 10 cycles available to operate on a given pixel. Each processor instruction, on the other hand, requires a minimum of 1 cycle. Often, several cycles are required to contend with bus conflicts, pipeline conflicts, and memory wait states. Thus, each instruction may effectively require 2–4 cycles. Thus, only about 3 instructions can realistically be devoted to each pixel.

The problem is that to perform a typical operation, such as setting an individual pixel to a logical "1", requires about 6 instructions. Thus, it is not feasible to perform operations on a pixel by pixel basis. Instead, operations that operate on multiple pixels at a time, such as 32 pixels, are required. Some typical operations might include clearing the image, moving the image, outputting the image, "AND"ing two images together, or "XOR"ing two images together. These types of instructions typically require fewer instructions (2 or 3 instead of 6) and operate on 32 pixels at one time. Overall, they operate about 100× faster than operations on individual pixels.

As discussed above, a control computer performs the functions of slicing an .STL or .CTL file, and computing .RLE data for the various cross-sections. A Digital Signal Processor (DSP) coupled to the print head must take this .RLE data, decompress it, skew the data according to the jet arrangement, and then output the data to the jets. As discussed, "skewing" refers to the process of manipulating the image data to compensate for the jet arrangement and possibly other factors. Since the data, once decompressed, may not be able to be manipulated rapidly enough, it is advantageous to be able to manipulate the data while it is still in compressed form (e.g. while it is still in the .RLE format). Another critical time-saving preference is that the data be stored in memory such that a 2-byte or 4-byte word contains pixels that are each desired to be output at the same time.

The process of skewing the data then involves simply shifting the start and stop transitions in the scan direction by an appropriate amount while keeping the data associated with pixels to be output at the same time in the same word. The data is then decompressed, and individual words are sent to the print head when the appropriate location in the X-direction is encountered.

Figure 42A:
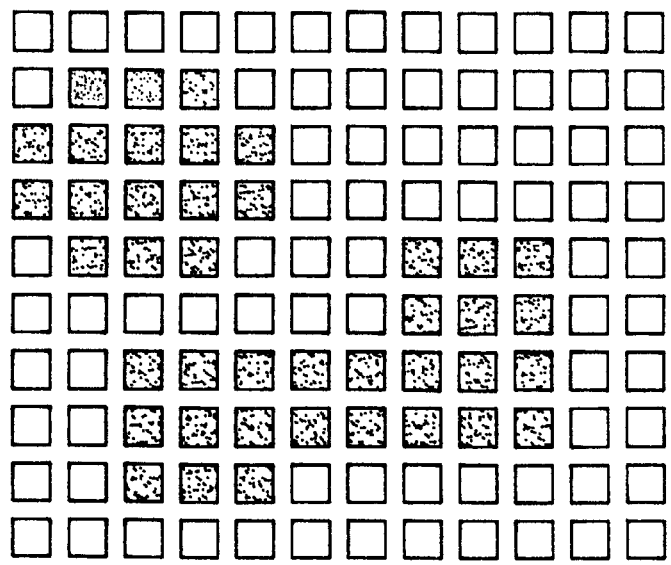
FIGS. 42a–42e illustrate skewing.
Figure 42B:
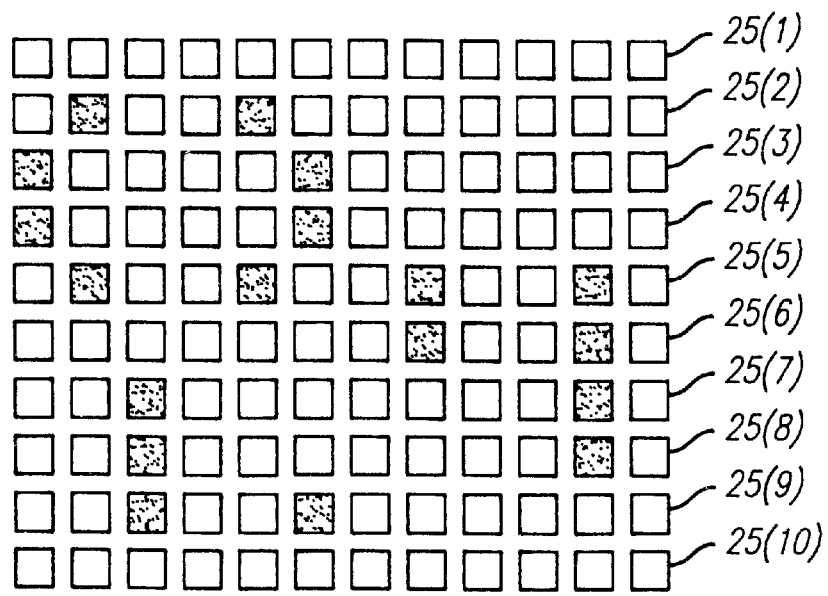
Figure 42C:
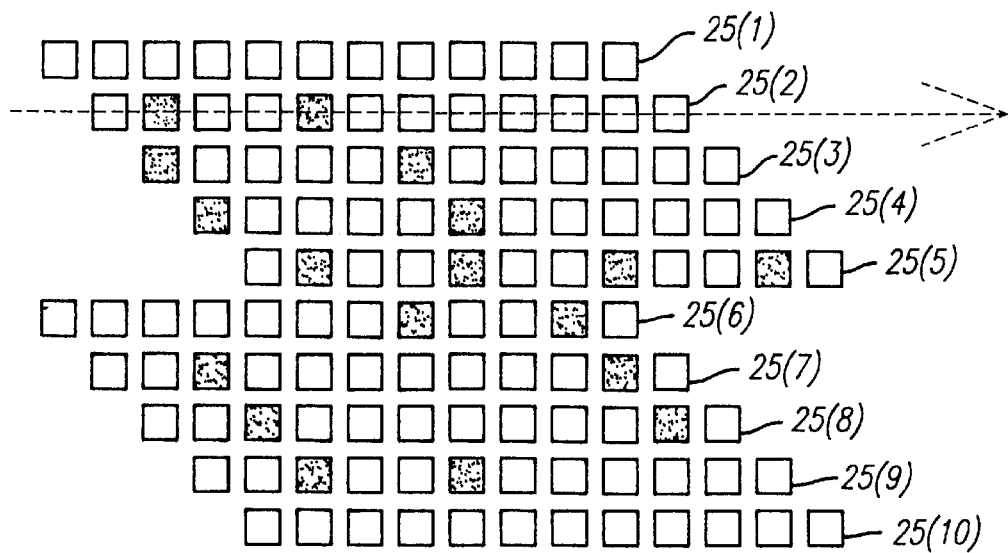

The technique is illustrated in FIGS. 42*a*, 42*b*, 42*c*, 42*d*, and 42*e*, in which like elements are referenced with like identifying numerals. FIG. 42*a* illustrates the pixelized image of the original cross-section. FIG. 42*b* illustrates this data in .RLE format. As shown, the data for the individual scan lines, identified in the figure with numerals 25(1), 25(2), 25(3), . . . , 25(10), has been compressed into data representative of start and stop transitions. FIG. 42*c* illustrates the process of skewing this data to adjust for a print head which is angled relative to the scan direction. In this figure, it is assumed that the print head has 5 jets, and is angled such that the individual jets are relatively displaced from successive jets by one pixel. Thus, the data for scan line 25(2) is displaced 1 pixel in relation to scan line 25(1); the data for scan line 25(3) is displaced 1 pixel in relation to scan line 25(2), etc. The process continues until scan line 25(6) is encountered. Since that is the sixth scan line, and will not be scanned on the same pass as the first 5 lines, that line is not displaced relative to the others. Instead, scan line 25(7) is displaced 1 pixel relative to scan line 25(6). Scan line 25(8) is displaced 1 pixel relative to scan line 25(7). Scan line 25(9) is displaced 1 pixel relative to scan line 25(8), etc.

Figure 42D:
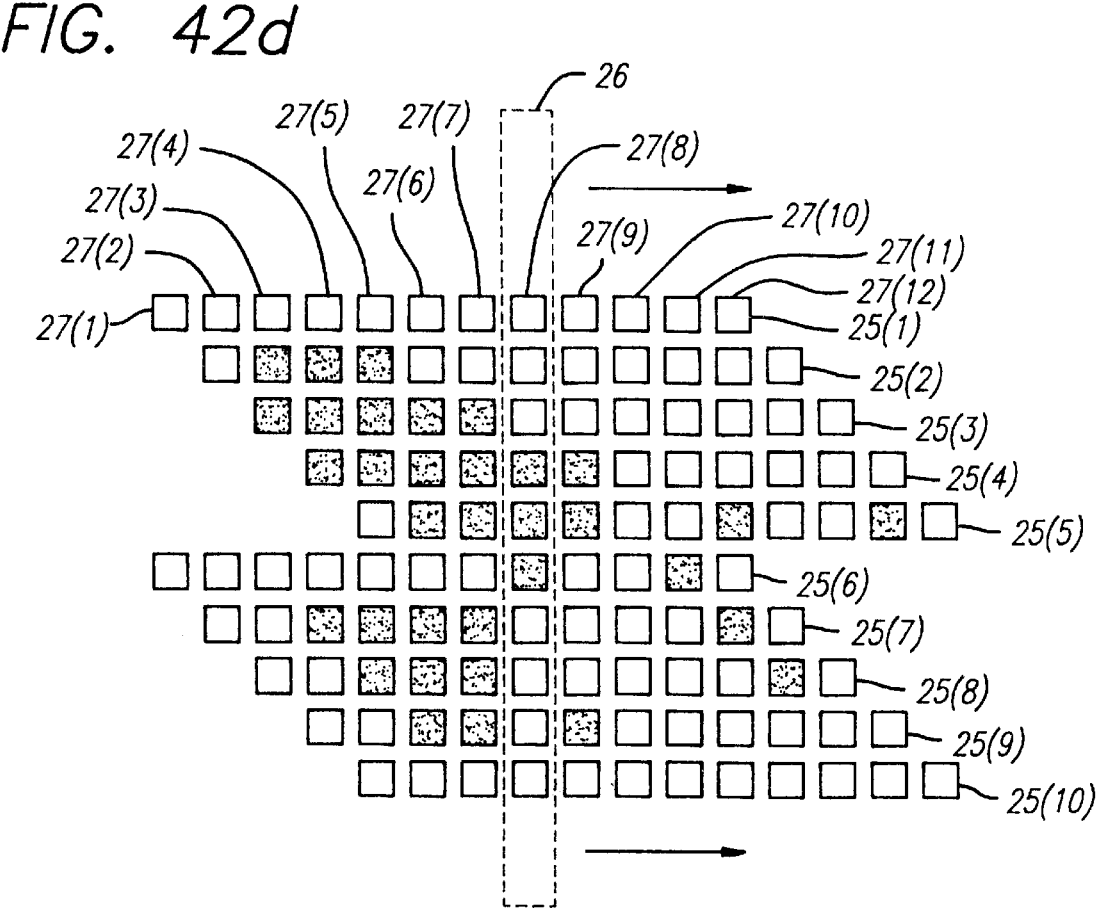

During this process, the skewed data is "banded" such that data associated with firings which are to occur at the same time is collected into a single word. This data is then successively decompressed one band at a time. The process is illustrated in FIG. 42d. The data for the pixels in each of the columns 27(1), 27(2), 27(3), . . . , 27(12), each represent data which is to be fired at the same time. Accordingly, each of these columns of data is stored in individually accessible words, and is thus simultaneously accessible. A banding index 26 is also maintained to step through the data one column at a time. As each column is encountered, it is decompressed in turn (i.e. each transition is converted to an on/off bit, e.g. 32 bits at a time). With reference to FIG. 42d, for example, the banding index is located at column 27(8). Accordingly, as shown, the data in that column is decompressed. The remaining data in columns 27(9) to 27(12) is still in compressed format. However, as discussed, that data will be decompressed as it is encountered by the banding index.

Figure 42E:
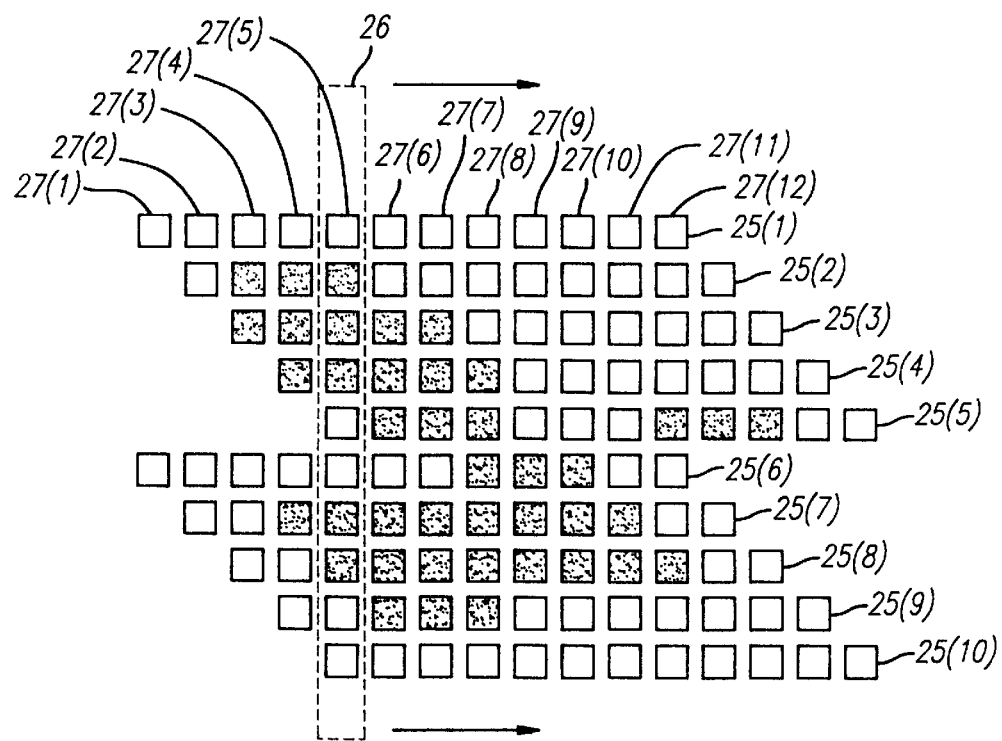

Next, the data is sequentially output to the print head, one column at a time. The process is illustrated in FIG. 42e. As shown, the banding index has been reset and then used to successively step through the columns 27(1)–27(12) a second time. As shown, the index is currently situated at column 27(5). Accordingly, the data in that column is output to the print head. The data in the remaining columns 27(6)–27(12) will be output in turn.

Time of flight and Jet Firing

Before the above generated data results in the deposition of droplets of material at the desired locations one critical function remains to be performed. As the data is loaded into the ink jet head for firing, the system must determine when the ink jet head has reached the proper location to drop its material. The proper firing time, as discussed in previously referenced U.S. patent application Ser. No. 08/534,813, now abandoned, actually occurs sometime before the head is positioned over the proper deposition location. This early-firing compensation is called the time of flight correction. However, the system still must determine when it is at the appropriate location to issue the early firing signal. The details of this determination process are given below.

To enable building with desired scan line resolution it is important to be able to fire the jets at any desired position along the scan direction. This can be problematic when using an encoder to indicate actual X position wherein the encoder may not have fence triggers at the required positions. In fact the encoder may be of lower resolution than that which is desired for printing. As higher resolution encoders are more expansive and it is desired to keep equipment costs down and as it is a disadvantage to be limited to a single resolution or resolutions which are multiples of the fence spacing. Other means are desirable for determining accurate firing positions. Accurate firing positions as explained below are determined by performing a distance interpolation between fence lines based on a calculated average velocity and a known elapsed time since the last fence was passed. The firing locations are then determined using the known desired firing point and the interpolated estimate of actual position.

Figure 43:
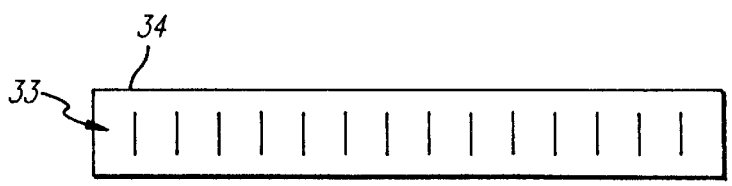
FIG. 43 illustrates the prescribed sequence of encoder lines.

The X-stage 12 (see FIG. 1) has associated with it an encoder for use in determining the position of the print head in the X-direction so that the firing pulses for the print head can be initiated at the appropriate time. In a preferred embodiment, to perform this function, a glass plate, identified with numeral 34 in FIG. 43, is employed on which lines 33 are etched which are spaced from one another by 10 microns. A light and photodiode detector (not shown) are also employed to determine when these lines are passed and to interrupt the DSP every time the print head passes one of these lines. A pair of detectors (not shown) is also employed to indicate whether the print head is moving left or right. To avoid bothering the DSP with signals caused by vibration and the like, a digital hysteresis circuit (not shown) is employed to shield the DSP from spurious interrupts caused by vibrations and the like. From this circuitry, it is possible for the DSP to determine the position of the print head within 10 microns, and also to determine the direction of movement.

In order to print at a finer resolution than 10 microns, a counter is provided within the DSP to start counting whenever the DSP passes one of the aforementioned lines. When the counter reaches a certain value, the DSP causes a firing signal to be generated to trigger the print head.

Figure 44:
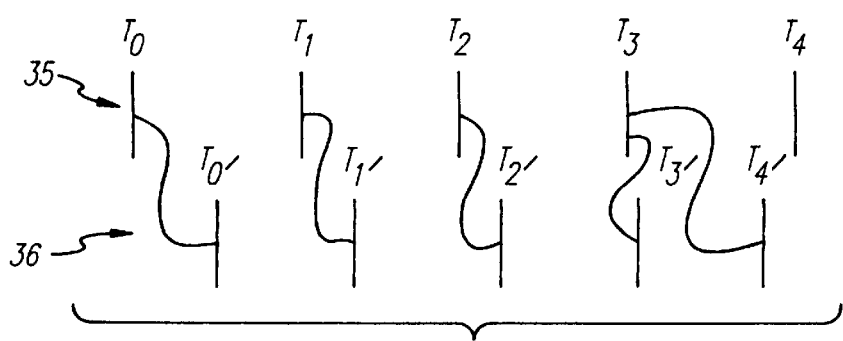
FIG. 44 illustrates a resolution problem which can occur through only one firing counter.

A second counter is also provided to deal with the situation illustrated in FIG. 44. The signals $T_0$, $T_1$, $T_2$, $T_3$, and $T_4$, identified with numeral 35, represent signals generated by the encoder from passage of the print head past the lines 33 illustrated in FIG. 43. The lines identified by numeral 36, in contrast, indicate the desired firing positions. For the signals $T_0'$, $T_1'$, $T_2'$, $T_3'$, these signals all follow corresponding signals, $T_0$, $T_1$, $T_2$, $T_3$, respectively. Thus, a single counter can be used in the generation of these signals in the manner described. The problem that occurs is illustrated by signals $T_4$ and $T_4'$. Since $T_4'$ actually precedes its corresponding signal $T_4$, a second counter must be provided for generating this signal in response to the occurrence of signal $T_3$.

Figure 45A:
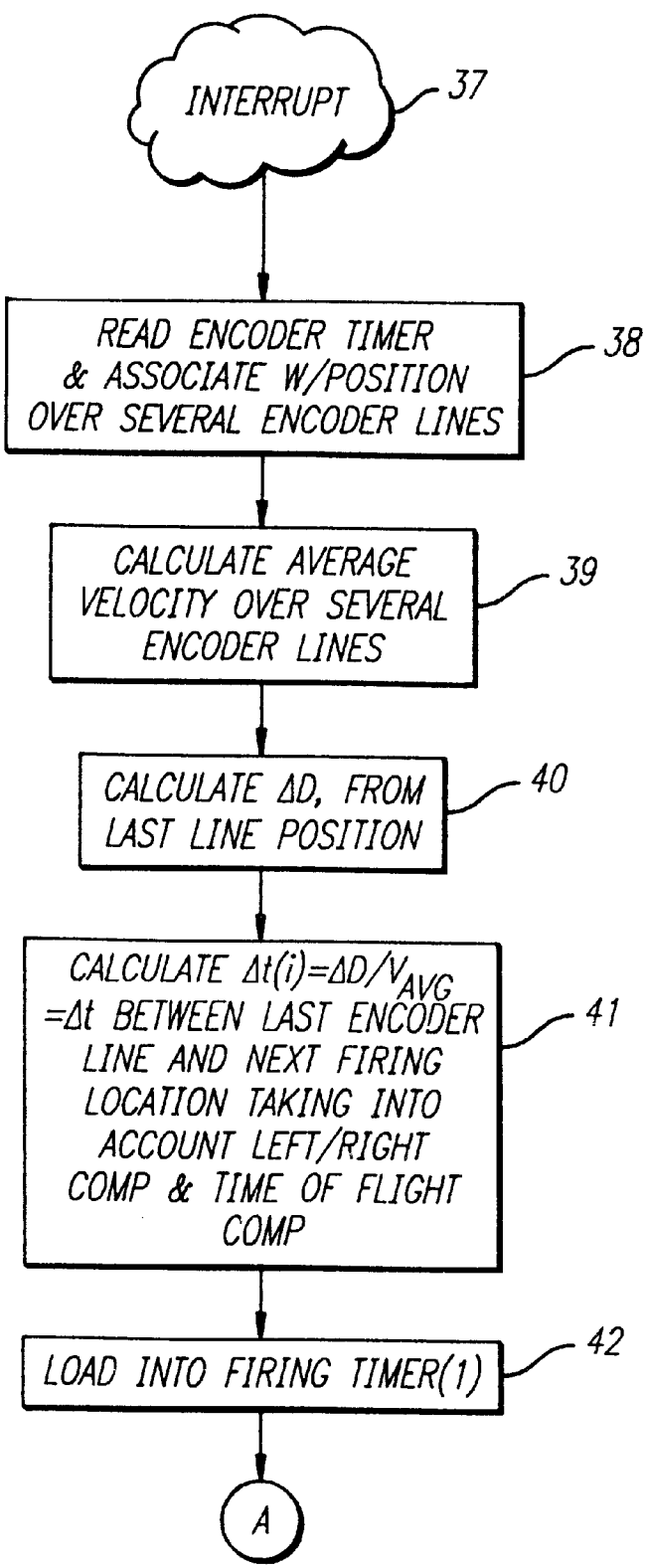
FIGS. 45a–45b illustrate an algorithm for increasing resolution in the scan direction through use of two counters.
Figure 45B:
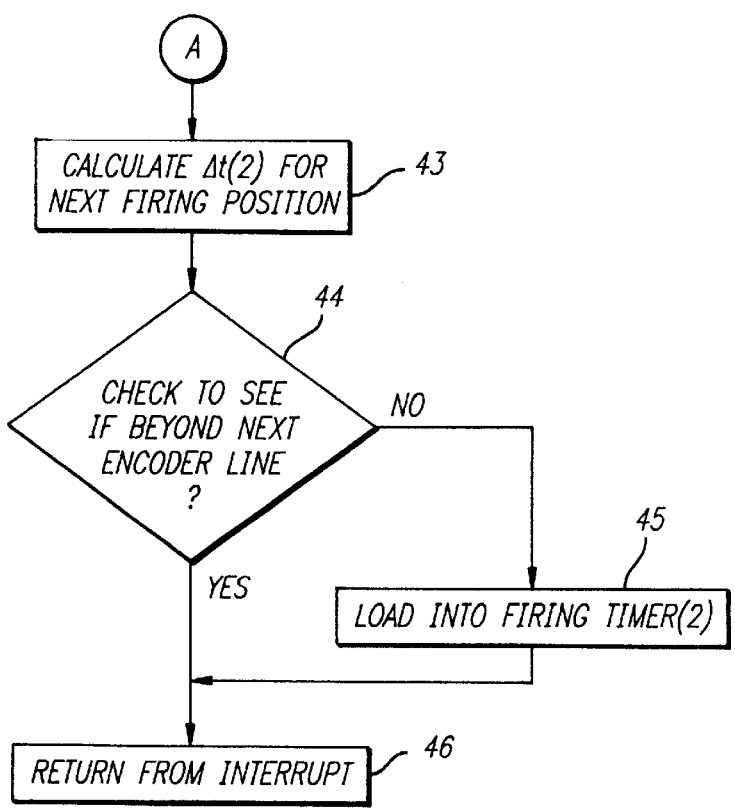

An algorithm for generating the firing signals is illustrated in FIGS. 45a–45b. As shown, an interrupt, identified in FIG. 12a with numeral 57, is generated as the print head passes by one of the encoder lines. Then, in step 38, an encoder timer (not shown) is read and associated with the print head position. This step is performed over several encoder lines. The resulting data is stored.

In step 39, the average velocity of the print head is calculated from the stored data by dividing the change in position by the change in time over the prescribed encoder lines. In step 40, the distance, ΔD, between the next firing location and the last encoder line is determined. In step 41, this value is used to calculate the time differential, Δt(1), from the last encoder line until the next firing location taking into account left/right compensation and time of flight compensation.

Then, in step 42, this value is loaded into a first firing timer which, as discussed, initiates a firing pulse when the same has expired. In step 43 (FIG. 45b), the time differential, Δt(2), for the next firing position is calculated in the manner described in relation to Δt(1). In step 44, this value is checked to see if the next firing position is located beyond the next encoder line. If so, then that firing pulse can be initiated off of the next encoder line. If not, in step 45, that value is loaded into a second firing timer. In step 46, a return from interrupt is then initiated.

Alternative embodiments may be used for linking encoder position to the issuing of firing commands. One such alternative uses multiple encoder fence location time signals to derive a more accurate representation of the average velocity of the scanning head. In this preferred embodiment, the last 8 encoder fence locations time signals are averaged to yield a time signal which can be associated with the position of the 4th encoder fence back. The previous 8 encoder fence locations time signals are averaged to yield a time signal which can be associated with the 12th encoder fence back. These two averaged time signals are used to derive an averaged velocity value for the scanning of the print head. From a determination of the distance between the 4th encoder back and the next firing location, the average velocity, the elasped time since the 4th encoder fence back was crossed, a time when the jet will reach the correct firing location is estimated, a timer is started using the estimated time, and the jet is fired when the time interval has elapsed.

This completes a discussion of the basic firing position enhancement algorithm. It should be appreciated that various enhancements or modifications are available, including compensation based on acceleration of the print head, or the use of more than one firing counter to further increase print resolution relative to the increase achievable through two counters.

While embodiments and applications of this invention have been shown and described, it should be apparent to those skilled in the art that many more modifications are possible without departing from the inventive concepts herein. The invention, therefore, is not to be restricted, except in the spirit of the appended claims.

What is claimed is:

1. A method of forming a three dimensional object, on a layer-by-layer basis, from an ink jettable solidifiable material, comprising the steps of:
    (a) providing data corresponding to a plurality of polygons that define an outer surface of a three dimensional object, wherein each polygon is defined by a set of points, wherein each point is comprised of x, y, and z coordinates;
    (b) defining a plurality of z-coordinates, wherein for each z-coordinate there is an associated layer of the object lying in an x-y plane at the z-coordinate;
    (c) determining for each given z-coordinate the layer associated with the given z-coordinate, by performing the steps of:
        (i) determining, from the plurality of polygons, a set of polygons, wherein each polygon in the set defines a region including at least one point that has a z-coordinate equal to the given z-coordinate, wherein a first and second polygons in the set define outer boundaries of the layer at the given z-coordinate;
        (ii) providing a set of x-coordinates at the given z-coordinate; and
        (iii) determining, for each given x coordinate the set of x-coordinates, a first y-coordinate where the given x-coordinate intersects the first polygon and a second y-coordinate where the given x-coordinate intersects the second polygon, wherein the layer associated with the given z-coordinate is bounded by the points comprising the given z coordinate, a given x-coordinate that is a member of the set of x-coordinates, and the first and second y-coordinates for the given x-coordinate; and
    (d) processing the determined layers associated with the given z-coordinates to jet from an inkjet print head solidifiable material to form a three dimensional object.

2. The method of claim 1, wherein the three dimensional object is formed by depositing material in the region defined by each determined layer on a layer-by-layer basis.

3. The method of claim 1, wherein the x and y axes form a plane horizontal to the z-axis, and wherein the z-axis defines a vertical dimension of the object.

4. The method of claim 1, wherein the step of determining the set of polygons for a given z-coordinate comprises the steps of:
    determining for each polygon a maximum z-coordinate in a set of points that define the polygon; and sorting the polygons in descending order from the polygon having a greatest maximum z-coordinate to a polygon having the smallest maximum z-coordinate.

5. The method of claim 1, wherein the step of determining the first and second y-coordinates further comprises the step of determining an associated directional value, wherein the directional value is one of a first value indicating that the y-coordinate defines a first end of the layer and a second value indicating that the y-coordinate defines a second end of the layer.

6. The method of claim 5, wherein the first y-coordinate has a directional value equal to the first value and the second y-coordinate has a directional value equal to the second value, wherein the step of forming the three dimensional object comprises the steps of:
    determining, for each given z-coordinate, a deposition line for each given x-coordinate that is a member of the set of x-coordinates, wherein the deposition line is formed between a point comprising the given z-coordinate, the given x coordinate, and the first y-coordinate for the given x-coordinate and a point comprising the given z-coordinate, the given x-coordinate, and the second y-coordinate for the given x-coordinate; and
    depositing, for each given z-coordinate, material along the deposition line for each given x-coordinate.

7. The method of claim 5, wherein the step of determining the layer associated with a given z-coordinate further comprises determining a third and fourth y-coordinates for a given x-coordinate and associated directional values.

8. The method of claim 7, wherein the third y-coordinate has a directional value equal to the first value and the fourth y-coordinate has a directional value equal to the second value, wherein the step of forming the layer at the given x-coordinate including the third and fourth y-coordinates comprises determining a deposition line comprised of a first portion between a point comprising the given z-coordinate, the given x coordinate, and the first y-coordinate for the given x-coordinate and a point comprising the given z-coordinate, the given x-coordinate, and the second y-coordinate for the given x-coordinate and a second portion between a point comprising the given z-coordinate, the given x-coordinate, and the third y-coordinate for the given x-coordinate and a point comprising the given z-coordinate, the given x-coordinate, and the fourth y-coordinate for the given x-coordinate; and
    depositing material long the first and second portions of the deposition line.

9. The method of claim 5, wherein the directional value is one of: (a) a third value equal to the half-the first value if the associated y-coordinate is at a vertex of the polygon and indicates a first end of the layer and (ii) a fourth value equal to half the second value if the associated y-coordinate is at a vertex of the polygon and indicates a second end of the layer.

10. A method of forming a three dimensional object, on a layer-by-layer basis, from an ink jettable solidifiable material, comprising the steps of:

(a) providing data corresponding to a plurality of polygons that define outer surfaces of a plurality of tree-dimensional components, wherein the components overlap to form a three-dimensional consolidated object;

(b) defining a plurality of z-coordinates, wherein each z-coordinate is associated with a layer in an x-y plane that forms the consolidated object;

(c) determining layers for each given z-coordinate, comprising the steps of:
   (i) determining, from the plurality of polygons, a set of polygons, wherein each polygon in the set defines a region including at least one point that has a z-coordinate equal to the given z-coordinate, wherein polygons in the set define outer boundaries of given components intersecting the given z-coordinate, wherein the outer boundary of each given component at a given z-coordinate is defined by a first polygon and a second polygon;
   (ii) providing a set of x-coordinates at the given z-coordinate; and
   (iii) determining, for each given x coordinate in the set of x-coordinates a y-coordinate pair for each given component, wherein each y-coordinate pair includes a first y-coordinate where the given x-coordinate intersects the first polygon of the given component and a second y-coordinate where the given x-coordinate intersects the second polygon of the given component;
   (iv) for each y-coordinate in the first set of y-coordinates, determining a directional value, wherein the directional value is one of a first value indicating that the y-coordinate defines a first end of a layer of the given component and a second value indicating that the y-coordinate defines a second end of the layer of the given component;
   (v) for each given y-coordinate in the first set of y-coordinates, calculating a counter value equal to the sum of the directional value of the given y-coordinate and the directional values of all y-coordinates for the given x-coordinate and given z-coordinate having a y-coordinate value less than the given y-coordinate directional value;
   (vi) generating a second set of y-coordinates comprising the first set excluding each y-coordinate from the first set that has a counter value that is not equal to one of the first value and the sum of the first value and the second value, wherein the second set includes at least one pair of a first and second y-coordinates, wherein the layer associated with the given current level indicator is bounded by the points comprising the given z-coordinate, a given x-coordinate that is a member of the interval of x-coordinates, and a y-coordinate that is one of the first and second y-coordinates for the given x-coordinate; and (d) processing the determined layers associated with the given z-coordinates to jet from an ink jet print head solidifiable material to form a three dimensional object.

11. The method of claim 10, wherein the step of forming the three dimensional object comprises the steps of:

determining, for each given z-coordinate, a deposition line for each given x-coordinate that is a member of the set of x-coordinates, wherein the deposition line is formed between a point comprising the given z-coordinate, the given x coordinate, and the first y-coordinate in the second set of y-coordinates and a point comprising the given z-coordinate, the given x-coordinate, and the second y-coordinate in the second set of y-coordinates; and depositing, for each given z-coordinate, material along the deposition line for each given x-coordinate.

* * * * *